United States Patent [19]

Watanabe et al.

[11] Patent Number: 5,165,009
[45] Date of Patent: Nov. 17, 1992

[54] NEURAL NETWORK PROCESSING SYSTEM USING SEMICONDUCTOR MEMORIES

[75] Inventors: Takao Watanabe, Inagi; Katsutaka Kimura, Akishima; Kiyoo Itoh, Higashikurume; Yoshiki Kawajiri, Hachioji, all of Japan

[73] Assignee: Hitachi, Ltd., Tokyo, Japan

[21] Appl. No.: 634,046

[22] Filed: Dec. 26, 1990

[30] Foreign Application Priority Data

Jan. 24, 1990 [JP] Japan .................................. 2-12538
May 11, 1990 [JP] Japan .................................. 2-119828

[51] Int. Cl.⁵ ............................................. G06F 15/18
[52] U.S. Cl. ....................................... 395/27; 307/201
[58] Field of Search ....................... 364/513, 807, 602; 307/201; 395/26, 27

[56] References Cited

U.S. PATENT DOCUMENTS 4,611,299 9/1986 Hori et al. ............................ 365/219
4,974,169 11/1990 Engel .................................... 364/513
4,994,982 2/1991 Duranton et al. .................... 364/513

OTHER PUBLICATIONS

Suzuki et al., "A Study of Regular Architectures for Digital Implementation of Neural Networks", *1989 IEEE Internatl. Symposium on Circuits and Systems*, 5/8-11/89, pp. 82-85.

Advanced Micro Devices, *Memory Products Data Book*, Jan. 1989, pp. 4-80-4-81.

Eberhardt et al., "Design of 3 Parallel Hardware Neural Network Systems from Custom Analog-VLSI 'Building Block' Chips", *Internat. Joint Conf. on Neural Networks*, 6/18-22/89, pp. II-183-II-190.

Holler et al., "An Electrically Trainable Artificial Neural Network (ETANN) with 10240 'Floating Gate' SYNAPSES", Proc. Internat. Annual Conf. on Neural Networks, 1989, pp. 50-55.

Terrence J. Sejnowski, et al., "Parallel Networks that Learn to Pronounce English Text", Complex Systems 1, (1987), pp. 145-168.

"Neural Network Processing" (Chapter 2), published by Sangyo Tosho and edited by Hideki Asou, pp. 39-68.
"Neural Network Processing" (Chapter 3), published by Sangyo Tosho and edited by Hideki Asou, pp. 69-93 and 118-123.
David E. Rumelhart, et al., "Learning Representations by Back-Propagating Errors", Nature vol. 323, Oct. 9, 1986, pp. 533-536.
Nikkei Microdevices, Mar. 1989, pp. 123-129.

*Primary Examiner*—Allen R. MacDonald
*Attorney, Agent, or Firm*—Fay, Sharpe, Beall, Fagan, Minnich & McKee

[57] ABSTRACT

Herein disclosed is a data processing system having a memory packaged therein for realizing a large-scale and high-speed parallel distributed processing and, especially, a data processing system for the neural network processing. The neural network processing system according to the present invention comprises: a memory circuit for storing neuron output values, connection weights, the desired values of outputs, and data necessary for learning; and input/output circuit for writing or reading data in or out of said memory circuit; a processing circuit for performing a processing for determining the neuron outputs such as the product, sum and nonlinear conversion of the data stored in said memory circuit, a comparison of the output value and its desired value, and a processing necessary for learning; and a control circuit for controlling the operations of said memory circuit, said input/output circuit and said processing circuit. The processing circuit is constructed to include at least one of an adder, a multiplier, a nonlinear transfer function circuit and a comparator so that at least a portion of the processing necessary for determining the neutron output values such as the product or sum may be accomplished in parallel. Moreover, these circuits are shared among a plurality of neurons and are operated in a time sharing manner to determine the plural neuron output values. Still moreover, the aforementioned comparator compares the neuron output value determined and the desired value of the otuput in parallel.

10 Claims, 42 Drawing Sheets

$$V_{j_{s+1}} = g\left(\sum_i T^s_{ji} \cdot V_{is} + \Theta_{j_{s+1}}\right)$$

$$V_j = g\left(\sum_i T_{ji} \cdot V_i + \Theta_j\right)$$

FIG. 8(d)

| SELECTED WORD LINE | | WRITE ADDRESS |
|---|---|---|
| ARRAY A s | ARRAY B (s,j) | ARRAY A (s,i) |
| 1 | (1,1) | (2,1) |
| 1 | (1,2) | (2,2) |
| ⋮ | ⋮ | ⋮ |
| 1 | (1,n) | (2,n) |
| 2 | (2,1) | (3,1) |
| 2 | (2,2) | (3,2) |
| ⋮ | ⋮ | ⋮ |
| 2 | (2,n) | (3,n) |
| m−1 | (m−1,1) | (m,1) |
| m−1 | (m−1,2) | (m,2) |
| ⋮ | ⋮ | ⋮ |
| m−1 | (m−1,m) | (m,n) |

FIG. 12

| MODE SIGNAL | MEMORY MODE | | | | ARITHMETIC MODE | |
|---|---|---|---|---|---|---|
| | AR | AW | BR | BW | NR | NW |
| $\overline{CSA}$ | L | L | H | H | L | L |
| $\overline{CSB}$ | H | H | L | L | L | H |
| $\overline{WE}$ | H | L | H | L | H | L |
| $\overline{NE}$ | H | H | H | H | L | L |
| ADDRESS | ADDA | ADDA | ADDB | ADDB | ADDA ADDB | ADDA |

| ENCODER INPUT | | | | | | ENCODER OUTPUT | | | | | |
|---|---|---|---|---|---|---|---|---|---|---|---|
| NA1 | NA2 | NA3 | NA4 | --- | NAz | NV1 | NV2 | NV3 | NV4 | --- | NVp |
| L | L | L | L | --- | L | L | L | L | L | --- | L |
| H | L | L | L | --- | L | H | L | L | L | --- | L |
| H | H | L | L | --- | L | L | H | L | L | --- | L |
| H | H | H | L | --- | L | H | H | L | L | --- | L |
| H | H | H | H | --- | L | L | L | H | L | --- | L |
| ⋮ | ⋮ | ⋮ | ⋮ | ⋮ | ⋮ | ⋮ | ⋮ | ⋮ | ⋮ | ⋮ | ⋮ |
| H | H | H | H | --- | H | H | H | H | H | --- | H |

NEURAL NETWORK PROCESSING SYSTEM USING SEMICONDUCTOR MEMORIES

BACKGROUND OF THE INVENTION

The present invention relates to a data processing system having a memory packaged therein for realizing a large-scale and fast parallel distributed processing and, more specifically, to a neural network processing system.

The parallel distributed data processing using the neural network called the "neuro-computing" (as will be shortly referred to as the "neural network processing") is noted in the field of acoustics, speech and image processing, as described in either on pp. 145-168, "Parallel networks that learn to pronounce English text. Complex Systems 1 by Sejnowski, T. J., and Rosenberg, C. R. 1987, "Neural Network Processing" published by Sangyo Tosho and edited by Hideki Asou. In the neural network processing, a number of processing elements called the "neurons" connected in a network exchange the data through transfer lines called the "connections" for high-grade data processing. In each neuron, the data (i.e., the outputs of the neurons) sent from another neuron are subjected to simple processing such as multiplications or summations. Since the processing in the individual neurons and the processing of different neurons can be carried out in parallel, the neural network processing is advantageous in principle in its fast data processing. Since algorithms (or learnings) for setting the connection weights of the neurons for a desired data processing have been proposed, the data processing can be varied for the objects, as described in either pp. 533-536, "Learning representations by back-propagation errors.", Nature 323-9 (1986a) by Rumelhart, D. E., Hinton, G. E. and Williams, R. J., or in 2nd Section of "Neural Network Processing" published by Sangyo Tosho and edited by Hideki Asou.

SUMMARY OF THE INVENTION

First of all, the operating principle of the neural network will be described in connection with two representative kinds: the multi-layered network and the Hopfield network. FIG. 2(a) shows the structure of the multi-layered network, and FIG. 3(a) shows the structure of the Hopfield network. Both of these networks are constructed of the connections of neurons. Here are used the terminology of "neurons", which will be called the "nodes" or "processing elements", as the case may be. The directions of the connection arrows indicate those of transferring the outputs of neurons. In the multi-layered network, as shown in FIG. 2(a), the neurons are stacked in multiple layers so that the neuron outputs are transmitted in the direction from the input to output layers only. Input signals $IN_1, ---,$ and $IN_n$ are inputted to the input layer, and output signals $OUT_1, ---,$ and $OUT_n$ are outputted from the output layer. In the Hopfield network, on the other hand, the neuron outputs are fed back to an identical neuron and are transferred in two ways between arbitrary two neurons. The feedback to the identical neuron may be omitted.

FIGS. 2(b) and FIG. 3(b) show the processing principle to be accomplished in the neurons. This processing principle is similar in any network and will be described in connection with the multi-layered network with reference to FIG. 2(b). FIG. 2(b) shows a j-th neuron in the (S+1)th layer in an enlarged scale. This neuron is fed through the connection with the output values $V_{1S}$, $---, V_{iS}, ---,$ and $V_{nSS}$ of the neurons in the preceding layer, i.e., the S-th layer. Here, letters ns indicate the number of neurons in the S-th layer. In the neuron, the products $V_{1S}T^S_{ji}, ---, V_{iS}T^S_{ji}, ---,$ and $V_{nSS}T^S_{jnS}$ of the inputted output values $V_{1S}, ---, V_{iS}, ---,$ and $V_{nSS}$ of the neurons and the connection weights $T^S_{ji}$ and so on are calculated by means of a multiplier MT. Next, the sum of these products and an offset $\Theta_{jS+1}$ is calculated by means of an adder ADD. The offset $\Theta_{jS+1}$ may be omitted, as the case may be. Moreover, the result is inputted to a circuit D for nonlinear transfer function to obtain the output value $V_{jS+1}$ of the neurons. The nonlinear transfer function circuit D has characteristics, as shown in FIGS. 2(c) or 2(d), and outputs an output g(x) for an input x. FIG. 2(c) shows an example of the nonlinear transfer function for outputting a binary output g1 or g2 in dependence upon whether or not the input x exceeds a predetermined threshold value xth, and FIG. 2(d) shows an example using a sigmoid function for issuing continuous outputs. The nonlinear transfer function circuit D is given other characteristics, if necessary. As the case may be, on the other hand, the circuit D may be given linear characteristics.

The processing principle described above is also similar in the Hopfield network, as shown in FIG. 3(b). In the Hopfield network, however, not only the output of the neuron of the layer preceding by one but also the outputs of all neurons are inputted to one neuron. In the multi-layered network, as seen from FIGS. 2(a) and 2(b), one processing is ended by feeding the output values of the neurons of the input layer at first and by updating the output values of the neurons in the next layer and then by the outputs values of the neurons of the secondary next layer. In the Hopfield network of FIG. 3(a), on the other hand, the output values of the individual neurons can be updated at suitable timings because of lack of any layer. In this Hopfield network, all the neuron output values are suitably given, and their updating is continued till they come to an equilibrium state. The network, in which the output values of all neurons are simultaneously updated, is called the "synchronized Hopfield network", whereas the network, in which the output values are updated at arbitrary timings, are called the "unsynchronized Hopfield network" so that they are distinguished.

One method used for accomplishing the aforementioned neural networks has employed the software whereas the other the hardware. According to the method employing the software, the processing of neurons is carried out with a program written in computer languages so that the number or structure of the neurons can be easily changed. Since, however, the processing is sequentially performed, the former method is disadvantageous in that the data processing time is abruptly elongated for an increased number of neurons. In the Hopfield network using an n number of neurons, an n times of products have to be calculated for updating the output of one neuron. In order to update the output values of all neurons at least once, therefore, and $n^2$ times of products need to be calculated. In other words, the number of calculations will increase in the order of $n^2$ with the increase in the neuron number n. As a result, the data processing time will increase in the order of $n^2$ if the multiplications are sequentially accomplished.

According to the method employing the hardware, the processing time can be shortened by changing the neurons to be multiplied into the hardware. Another trial for speeding up the processing has been made by executing the processing in parallel with a number of hardware neurons. If, however, the number of neurons is enlarged, the number of wiring lines acting as the signal lines between the neurons will increase in the order of $n^2$, thus making it difficult to realize a large-scale network.

The method of solving the wiring problem is exemplified on pp. 123-129 of Nikkei Microdevice, March, 1989, as will be described in principle in FIG. 4. FIG. 4 shows an example, in which a multi-layered network composed of three layers each having three neurons is constructed of analog neuro-processors ANP and SRAM. The ANP is made by integrating one multiplier Mt and one adder ADD of FIG. 2(b) and a non-linear transfer function circuit D into one chip. Another chip SRAM is stored with the connection weight belonging to each neuron. The neurons of different layers are connected through one signal line called the "analog common bus". Since the neuron output value of an input layer is inputted from the outside, the ANP and SRAM corresponding to the neurons of the input layer are omitted.

The operations are as follows. First of all, the connection weight for each ANP necessary for a desired data processing is read in each SRAM from the outside. Next, an input analog signal corresponding to the output value of one neuron in the input layer is inputted. The input signals are inputted in parallel directly to the ANPs corresponding to the neurons of the middle layer. The weight data are read out from the SRAM to each ANP in synchronism with the input signal. Next, the product of two signals is calculated, and the result is stored in each ANP. Next, the input analog signals corresponding to the output values of other neurons of the input layer are inputted, and their product is calculated. The calculation result is added to the value which is stored in each ANP of the middle layer. After similar calculations have been accomplished for the input analog signal corresponding to the output value of the last neuron of the input layer, the neuron output values $V_{12}$, $V_{22}$ and $V_{32}$ of the middle layer are consecutively outputted to the analog common bus of the middle layer by the non-linear transfer function circuit in the ANP so that calculations similar the foregoing ones are continued. Finally, the neuron output values $V_{13}$, $V_{23}$ and $V_{33}$ of the output layer are consecutively outputted to the analog common bus of the output layer by the nonlinear transfer function circuit in the ANP of the output layer.

According to the example of the prior art described above with reference to FIG. 4, the wiring problem can be avoided by driving the common bus in the time sharing manner. Since, moreover, the multiplications of the number of neurons in one layer can be carried out in parallel, the data processing rate can be drastically raised, as compared with the method according to the software, as a result of the speed-up of the processing by the hardware.

Since, however, the ANPs and the SRAMs are formed in different chips, it is difficult to realize the large-scale network in high density. Even if thirty two neurons could be integrated over a square chip of 10 mm, as described on pp. 129 of the above-specified Nikkei Micro Device, March, 1989, one adder, one multiplier and one nonlinear transfer function circuit need be prepared for each neuron. Hence, it is difficult to integrate several hundreds or thousands neurons over one chip.

Moreover, the examples of the prior art described above is accompanied by the following problems when they are applied to practices. An application of the multi-layered network is exemplified by outputting the pronunciations and accents of English letters inputted to a three-layered network, as described on pp. 145-168 of Complex Systems 1 (1987) entitled "Parallel networks that learn to pronounce English text" and edited by Sejnowski, T. J., and Rosenberg, C. R. Seven English letters are encoded as the neuron output values of the first layer, and the codes corresponding to the pronunciations and accents of the central one of the aforementioned seven letters are outputted as the output values of the twenty six neurons of the third layer. In this example, in dependence upon the inputs, the output values of the neurons of the output layer may fail to coincide with the codes of the predefined pronunciations and accents but may give fuzzy values. It is, therefore, necessary, to find out the codes closest to those of all the pronunciations and accents compared and to make then as the correct answer. These comparisons between the output values and the desired values (i.e., the codes of the pronunciations and accents in the aforementioned example) of the outputs are likewise required for the pattern recognition by the neural network. This point is not taken into consideration in the aforementioned examples of the prior art so that the examples are inconvenient when applied to the practical problem.

In the aforementioned examples of the prior art, moreover, the connection weight necessary for the desired data processing is determined by an external computer, and the result is written in the SRAMs of FIG. 4. As a result, the learning is wholly performed by the software so that it is difficult to carry out at a high speed.

In order to solve the problems thus far described, according to the present invention, there is provided a neural network processing system which comprises: a memory for storing neuron output values, connection weights, the desired values of outputs, and data necessary for learning; an input/output circuit for writing or reading data in or out of said memory; an arithmetic circuit for performing a processing for determining the neuron outputs such as the product, sum and nonlinear conversion of the data stored in said memory, a comparison of the output value and its desired value, and a processing necessary for learning; and a control circuit for controlling the operations of said memory, said input/output circuit and said arithmetic circuit. The arithmetic circuit is constructed to include at least one of an adder, a multiplier, a nonlinear transfer function circuit and a comparator so that at least a portion of the processing necessary for determining the neuron output values such as the product or sum may be accomplished in parallel. Moreover, these circuits are shared among a plurality of neurons and are operated in a time sharing manner to determine the plural neuron output values. Still moreover, the aforementioned comparator compares the neuron output value determined and the desired value of the output in parallel.

Since the adder, the multiplier and the nonlinear transfer function circuit are shared among the plural neurons, as described above, the system for calculating the neuron output values in the neural network using the numerous neurons can be realized by using a small number of circuits. Since, moreover, at least a portion of the neuron processing such as the product and sum is performed in parallel by the aforementioned arithmetic circuit, the data processing can be accomplished at a high speed. Since, still moreover, the output value obtained and the desired value of the output can be compared in parallel by the aforementioned comparator, the distance (i.e., the similarity between the obtained output value and the expected value, e.g., the humming distance) between the obtained output value and the desired value can be determined at the high speed. Since, furthermore, at least a portion of the processing necessary for the learning is accomplished by the hardware of the system, the learning can be speeded up.

An object of the present invention is to solve the problems owned by the aforementioned prior art.

Another object of the present invention is to provide a system for carrying out the calculations of neuron output values at a high speed with a small number of circuits in the network containing a number of neurons.

Still another object of the present invention is to give the aforementioned system a function to compare the neuron output value and the desired value at a high speed.

A further object of the present invention is to give the aforementioned system a function to process at least a portion of the processing necessary for the learning.

These and other objects and many of the attendant advantages of the present invention will be readily appreciated as the same becomes better understood by reference to the following detailed description when considered in connection with the accompanying drawings.

BRIEF DESCRIPTION OF THE DRAWINGS

FIG. 8(d) shows one embodiment of the method of selecting the word lines and the memory cells in the arithmetic mode in the embodiment of FIG. 8(a);

FIG. 12 shows one embodiment of the relations between the arithmetic modes and the external signals;

FIG. 14(a) shows one embodiment of the nonlinear transfer function circuit D which is suitable for the embodiment of FIG. 11 or the like;

FIG. 14(c) shows one embodiment of the input/output circuit 10 which suitable for the embodiment of FIG. 11 or the like;

FIG. 14(e) shows one embodiment of the read circuit OUT which is suitable for the embodiment of FIG. 11 or the like;

DETAILED DESCRIPTION OF THE INVENTION

Figure 1:
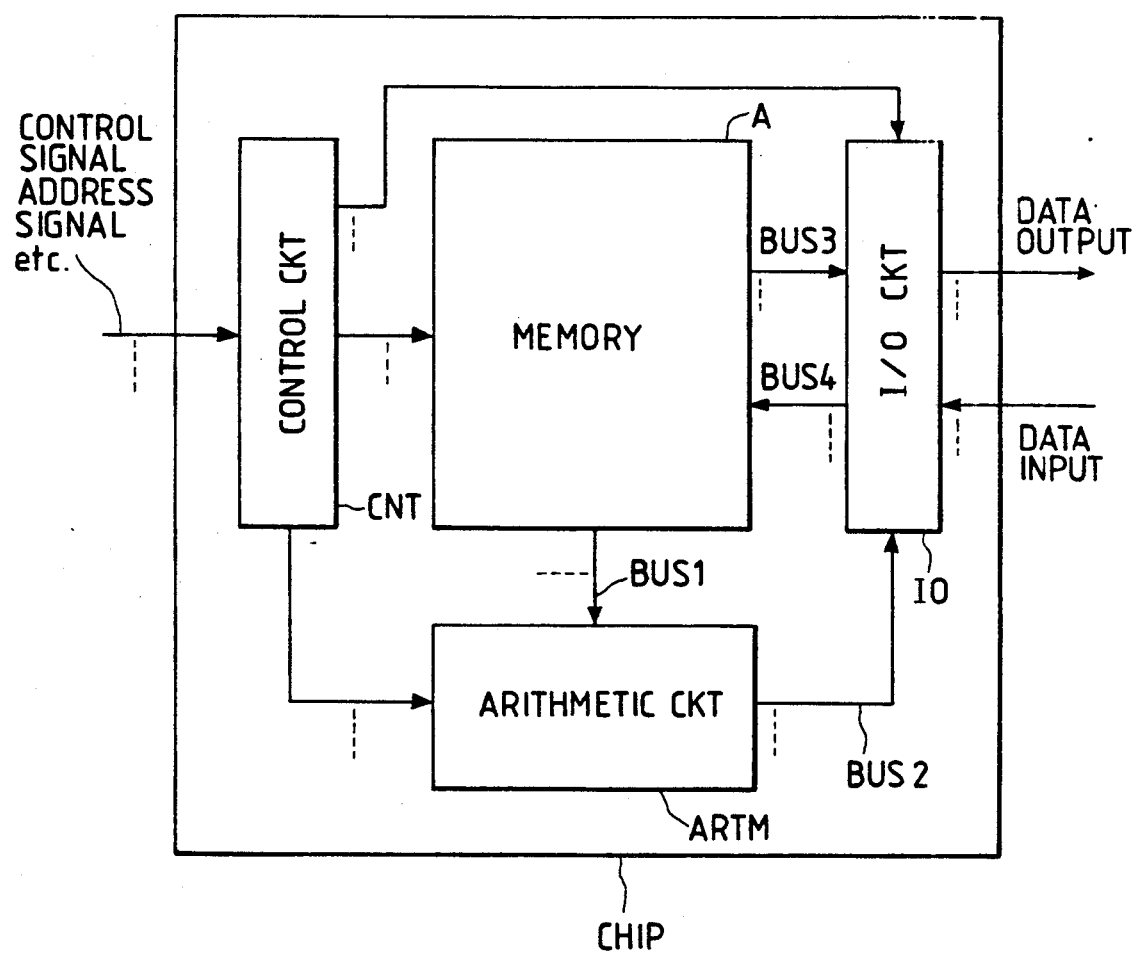
FIG. 1 shows one embodiment of the structure, in which the data processing system according to the present invention is embodied over a single semiconductor chip.

FIG. 1 shows one embodiment in case the data processing system according to the present invention is integrated over a semiconductor chip.

There are integrated over a semiconductor chip (CHIP): a memory (A) for storing data; an input/output circuit (I/O) for performing at least one of the writing operation and reading the data in and from said memory; an arithmetic circuit (ARTM) for performing the arithmetic for determining neuron output values, the comparison (i.e., the similarity of the obtained output values and the desired values, e.g., the calculation of the humming distance) of the output values and the desired values or the arithmetic necessary for the learning by using the data stored in said memory; and a control circuit (CNT) for controlling the operations of said memory, said input/output circuit and said arithmetic circuit. Each of buses (BUS1, BUS2, BUS3, BUS4, etc.) connecting the individual blocks is made of not only one wiring line but also a necessary number of wiring lines. The aforementioned memory can be stored with the connection weights and the neuron output values necessary for the neural network processing, the desired values of the outputs or the data necessary for the learning. According to the present embodiment, the nonlinear network processing such as the calculations of the neuron output values, the comparisons of the desired values and the desired values, or the calculations necessary for the learning can be performed in the following manners.

First of all, the method of calculating the neuron output values will be described in the following. At first, the connection weights necessary for the calculations for the neural network processing, and the neuron output values, or the offsets are read out in parallel from the memory to the arithmetic circuit through a bus 1. Next, the arithmetics such as the product and sum or the nonlinear transfer necessary for determining the neuron output values are accomplished by the arithmetic circuit, and the obtained results are written in the memory through the input/output circuit. The operations described above are continued by a necessary number of times to determine the neuron output values. The arithmetic circuit may either determine one of plural neuron output values by a single operation or perform a portion of calculations for determining the neuron output values. Thus, the data processing can be accomplished by the various networks such as the multi-layered network or the synchronized or unsynchronized Hopfield network. Incidentally, in order to update the output values of all the neurons synchronously, the synchronized Hopfield network needs to be stored with the output values of all the neurons till the end of updating the output values of all the neurons. In this case, the output values of all the previous neurons may be stored in the memory so that they may be used for updating the output values of the neurons.

Figure 4:
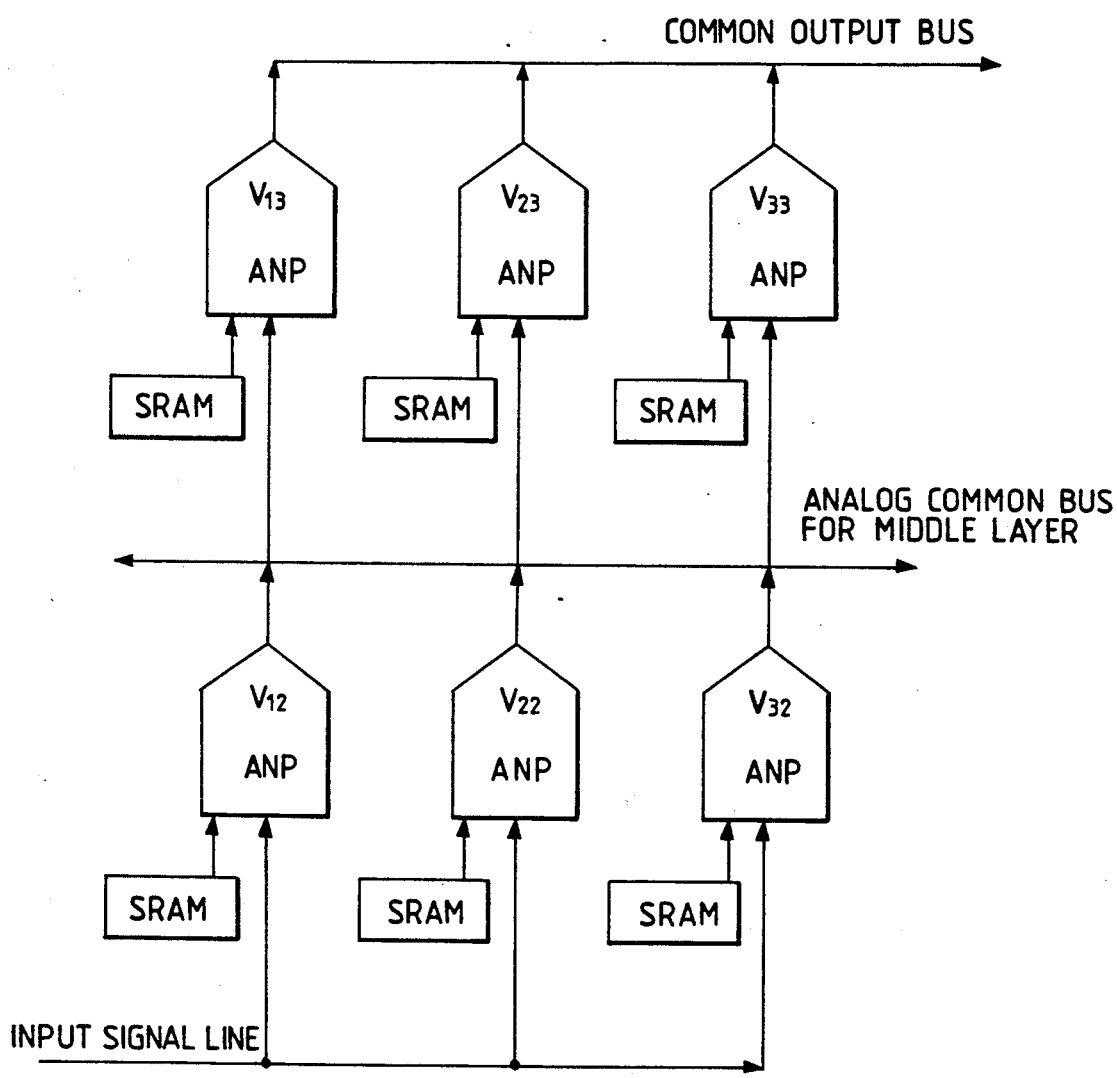
FIG. 4 shows an example of the neural network processing system using the plural chips according to the prior art.

According to the present embodiment, a desired number of multipliers, adders and nonlinear transfer function circuits necessary for calculating the neuron output values may be provided in the arithmetic circuit so that they may be repeatedly used. This makes it possible to make the number of circuits far smaller than that of the case in which those circuits are prepared for each of the neurons. The example of the prior art of FIG. 4 is required to prepare two hundreds multipliers, adders and nonlinear transfer function circuits for realizing the multi-layered network having three layers each composed of one hundred neurons. In the present embodiment, on the contrary, it is sufficient to prepare at least one multiplier, at least one adder and at least one nonlinear transfer function circuit. Even if the multiplications necessary for updating one neuron output value to speed up the operations should be accomplished in parallel, it would be sufficient to prepare one hundred multipliers, one adder and one nonlinear transfer function circuit. According to the present embodiment, therefore, the number of circuits can be drastically reduced, as compared with that of the prior art. Incidentally, the above-specified different will become the larger for the larger scale of the network. Similar situations will apply to another network such as the Hopfield network.

Not only the arithmetic speed such as multiplications but also the amount of arithmetics to be carried out in parallel makes high contribution to the data processing speed in case the neuron output values are to be determined. In the Hopfield network using an n number of neurons, for example, the products of $n^2$ times have to be calculated for updating the output values of all the neurons, as has been described hereinbefore. If the multiplications are sequentially accomplished, therefore, the updating of the output values of all the neurons takes at least a time period of $n^2$ times as long as that required for one multiplication. As a result, the time period required for the multiplications will abruptly increase in the order of square of the neuron number with the increase in the number of neurons. Similar circumstances will also apply to the multi-layered network. This makes it desirable to calculate the numerous multiplications in parallel. Here will be described in the following an example of the arithmetic system for raising the data processing speed by making the multiplications in parallel so as to determine the neuron output values in the embodiment of FIG. 1.

Figure 5A:
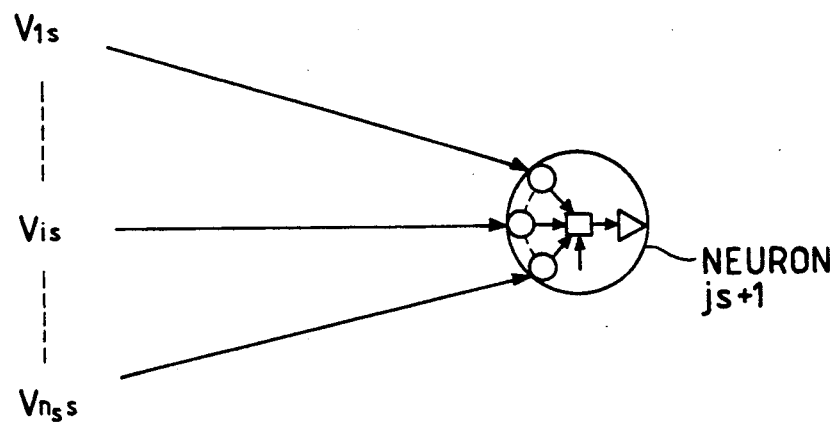
FIGS. 5(a) and 5(b) show embodiments of the method for parallel processing of the multi-layered neural network and the Hopfield neural network, respectively.
Figure 5B:
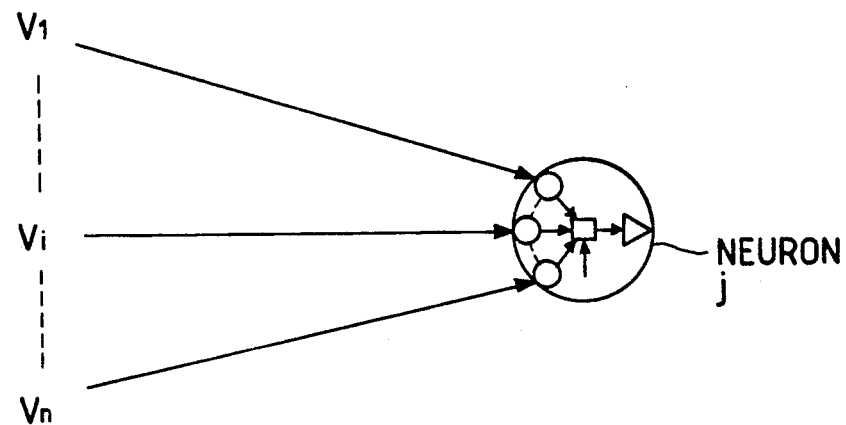

FIG. 5 illustrates the multi-layered network at (a) and the Hopfield network at (b) of one system for the parallel arithmetics. In the present embodiment, the products necessary for determining one neuron output value are calculated, as shown. Specifically, the output value of the neuron of the preceding layer, which is inputted to one neuron, and the connection weight for said output value of the neuron under consideration are read out in parallel from the memory, and their products are calculated in parallel. Thus, the time period required for the multiplications will increase in the order of the neuron number with the increase in the neuron number. As a result, the data processing time can be drastically shortened, as compared with the case in which the multiplications are sequentially accomplished. In FIG. 5, only the multiplications necessary for updating the output value of one neuron are accomplished in parallel. However, the embodiment of FIG. 1 should not be limited thereto but may naturally add the arithmetic circuits within a range allowed by the degree of integration, to update the output values of the plural neurons in parallel. In this case, the data processing can be accomplished at a higher speed. In addition, the parallel arithmetics can also be accomplished by another system, as shown in FIGS. 6(a) and 6(b).

Figure 6A:
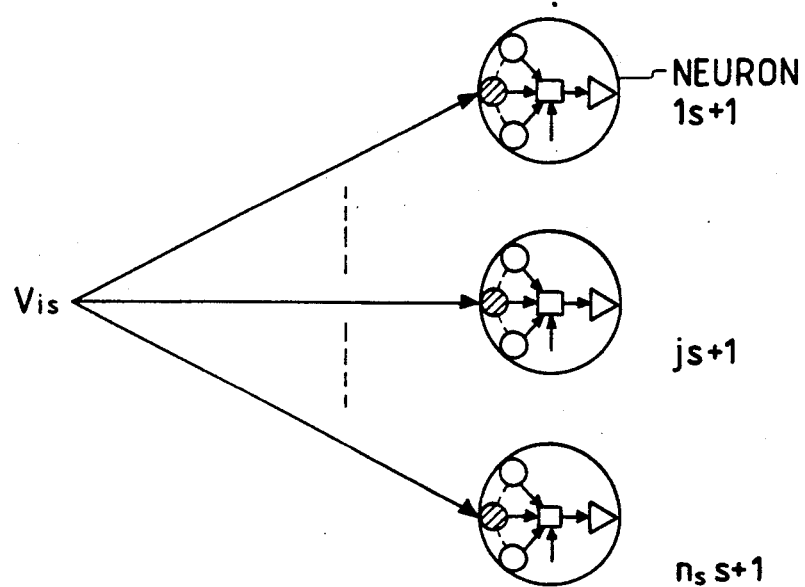
FIGS. 6(a) and 6(b) show second embodiments of the method for parallel processing of the multi-layered neural network and the Hopfield neural network, respectively.
Figure 6B:
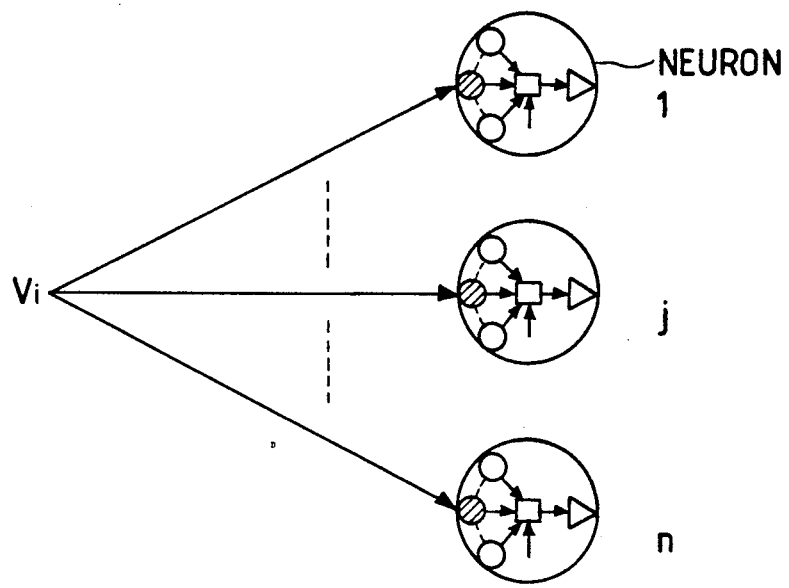

FIG. 6 shows one embodiment, in which the multiplications are executed in parallel for a plurality of neurons to be fed with the output value of one neuron in the multi-layered network of FIG. 6(a) and in the Hopfield network of FIG. 6(b). In this method, the neural output values and the connection weights are read out from the memory, and the calculations necessary for updating the neuron output values are executed bit by bit for the plural neurons. This makes it impossible to realize the unsynchronized Hopfield network. Since, however, the time period required for the multiplications will increase in the order of the neuron number with the increase in the neuron number like the system of FIG. 5, the data processing time can be drastically shortened, as compared with the case in which the multiplications are sequentially carried out.

In the example of the prior art of FIG. 4, too, the arithmetics are executed in parallel. As will be described in the following, however, the structure of FIG. 1 can be realized with a smaller number of circuits than that of the example of the prior art. In the systems shown in FIGS. 6(a) and 6(b), only one multiplier operates in parallel in each neuron, as hatched. In the embodiment of FIG. 1, therefore, the arithmetic circuit may be provided with the multipliers in a number equal to that of the neurons to be calculated at one time so that this system can be realized with a smaller number of circuits than that of the case of the prior art in which all the multipliers are provided for all the individual neurons. In the multi-layered network having three layers each composed of three neurons, for example, a similar parallelism can be realized by using individually three multipliers, adders and nonlinear transfer function circuits, for example, according to the embodiment of FIG. 1, on the contrary to the case of the prior art which is equipped with individually six multipliers, adders and nonlinear transfer function circuits.

Thus, according to the embodiment shown in FIG. 1, a system for the data processing similar to that of the neural network using numerous neurons can be realized with the necessary minimum circuits by sharing the adders, multipliers and nonlinear transfer function circuits of the arithmetic circuit among the plural neurons. By executing the arithmetics such as the products or sums with the aforementioned arithmetic circuit, moreover, the data processing can be accomplished at a high speed. Incidentally, with the parallel arithmetics, the number of wiring lines between the memory and the arithmetic circuit has to be increased to send many data at once to the arithmetic circuit. In FIG. 1, however, the memories and the arithmetic devices are arranged over the common chip so that the number of the wiring lines of the bus can be easily increased.

Although the method of calculating the neuron output values has been described hereinbefore, a neuron output value and its desired value can be compared according to the embodiment of FIG. 1. For this comparison, the desired value may be stored in advance in the memory so that its distance from the output value obtained by the aforementioned method may be calculated by the arithmetic circuit. This operation is to calculate the similarity between the desired value and the calculated value. At this time, the desired value and the output value composed of numerous bits can be simultaneously read out to the arithmetic circuit and processed in parallel with ease by increasing the number of wiring lines of the bus 1. Thus, according to the embodiment of FIG. 1, the data processing such as the pattern recognition can be executed at a high speed, as compared with the case in which the comparison is accomplished serially bit by bit by using an external computer.

According to the embodiment of FIG. 1, moreover, the learning can be accomplished at a higher speed than that of the case using the software, by executing the arithmetics necessary for the learning with the arithmetic circuit. This specific embodiment will be described hereinafter.

The neural network processing is advantageous in that it can process various data by changing the connection weights. This advantage can be easily exploited according to the embodiment of FIG. 1 by rewriting the connection weight stored in the memory. Moreover, several kinds of connection weights necessary for different data processings can be stored in advance by making the capacity of the memory larger than that necessary for calculating the neuron output values. In this case, there can be attained a merit that different kinds of data can be continuously processed without losing the time period for rewriting the connection weights. In addition, in case numeral input data are to be continuously processed, the necessary input data or the obtained data can be stored in advance in a portion of the memory. Thus, the frequency for switching the reading, calculating and outputting modes can be reduced to shorten the processing time, as compared with the case in which the operations of reading each input data in the memory and calculating and outputting it to the outside of the system are repeated.

Next, a more specific embodiment based upon the embodiment of FIG. 1 will be described in the following. For simplicity of descriptions, the case of giving the arithmetic circuit the function of calculating the neuron output values will be described at first, and the method of giving the comparing or learning function will be described at last.

Figure 7A:
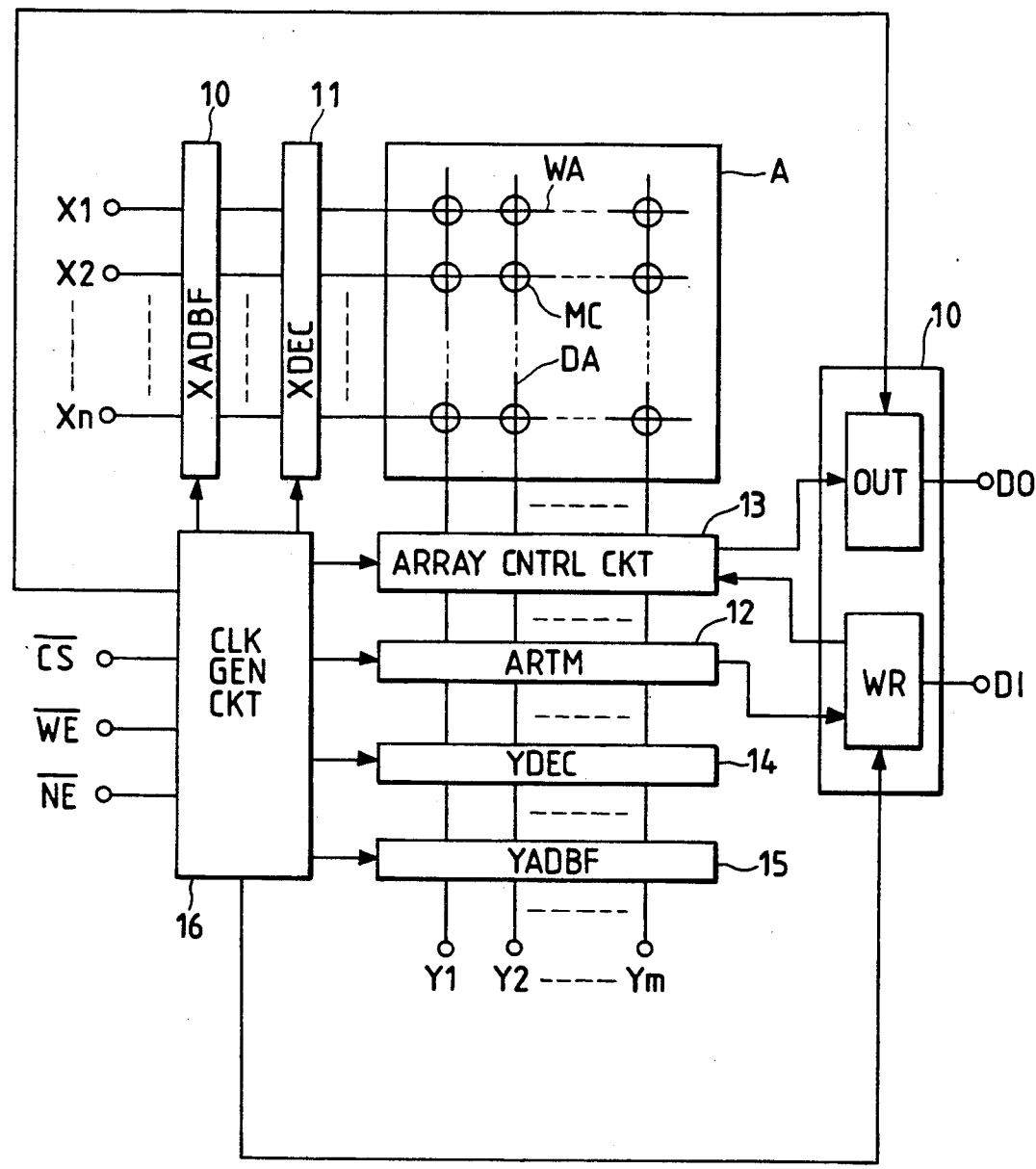
FIG. 7(a) shows one embodiment of the structure, in which the data processing system according to the present invention is realized by using a memory array capable of reading out a number of data on data lines by selecting one word line.

FIG. 7(a) shows one embodiment in case a lattice-shaped memory cell array is used in the memory of the embodiment of FIG. 1. In FIG. 7(a), letter A designates a memory cell array which is composed of: a plurality of data lines (D); a plurality of word lines (W) arrayed to intersect the data lines (D); and memory cells (MC) arrayed at the desired intersections. As a result, the signals of the different memory cells can be read out onto the plural data lines by selecting one of the word lines. Numeral 12 designates an arithmetic circuit (ARTM). Numerals 10, 11, 13, 14, 15 and 16 designate circuits corresponding to the control circuit (CNT) of FIG. 1. The numerals 10 and 15 designate address buffers for X-addresses and Y-addresses, and the numerals 11 and 14 designate a decoder and a driver for X-addresses and Y-addresses, respectively. The numeral 13 designates an array control circuit for controlling the memory cell array. Numeral 16 designates a clock generator for generating clocks to controls the operations of the memories on the basis of the signals inputted from the outside. Letters OUT and WR designate a read circuit and write circuit, respectively. A chip select $\overline{CS}$ is a chip selection signal. A write control signal $\overline{WE}$ is a signal for switching the write and read operations for establishing the write operation at a low level and the read operation at a high level. Letter $\overline{NE}$ designate an arithmetic circuit control signal for starting the arithmetic circuit at a low level and interrupting the same at a high level to act as an ordinary memory. In the following, the state of the signal $\overline{NE}$ at the high level will be called the "memory mode", and the state at the low level will be called the "arithmetic mode". In the memory mode, a desired memory cell is selected according to the X-address and the Y-address so that a write data DI can be written in that cell or so that a data can be read out from the same cell and outputted as a read data DO. In the arithmetic mode, the data stored in the memory cell is read out to the arithmetic circuit 12 so that the arithmetic result of the arithmetic circuit 12 or the data according to the arithmetic result can be written in the memory cell through the input circuit. By selecting one word line, according to the present embodiment, the data of all the memory cells on the selected word are outputted to the data lines. As a result, numerous data can be easily latched in the arithmetic circuit 12 so that many arithmetics can be accomplished in parallel. In order to calculate the neuron output values according to the present embodiment, the mode is changed at first into the memory mode to stop the arithmetic circuit, and the necessary connection weight, neuron output value (i.e., the input signal at first), offset and so on are written in the memory. Next, the mode is changed to the arithmetic mode to start the arithmetic circuit to read the necessary data is read out to the arithmetic circuit by selecting one word line. Next, the result is written in the memory circuit. If the read of the data necessary for the arithmetics and the write of the result are further continued by a necessary number of times, the neural network processing can be accomplished at a high speed. As has been described above, according to the embodiment shown in FIG. 7(a), many data can be written at once in the arithmetic circuit, the embodiment is suited for the parallel arithmetics of the type shown in FIG. 5 or FIG. 6. Thus, according to the present embodiment, the parallel arithmetics make it possible to execute the neural network processing at a high speed. By using the arithmetic circuit 12 repeatedly, moreover, the plural neurons can share the output value calculating circuit to effect a high integration easily.

In case, on the other hand, parallel arithmetics are to be accomplished by using the data stored in the memory cells on the plural word lines, a register for primary storage can be provided in the arithmetic circuit so that it may once store the data obtained by selecting the word lines and execute the arithmetics of the stored data together with the data read out by selecting other word lines.

Figure 7B:
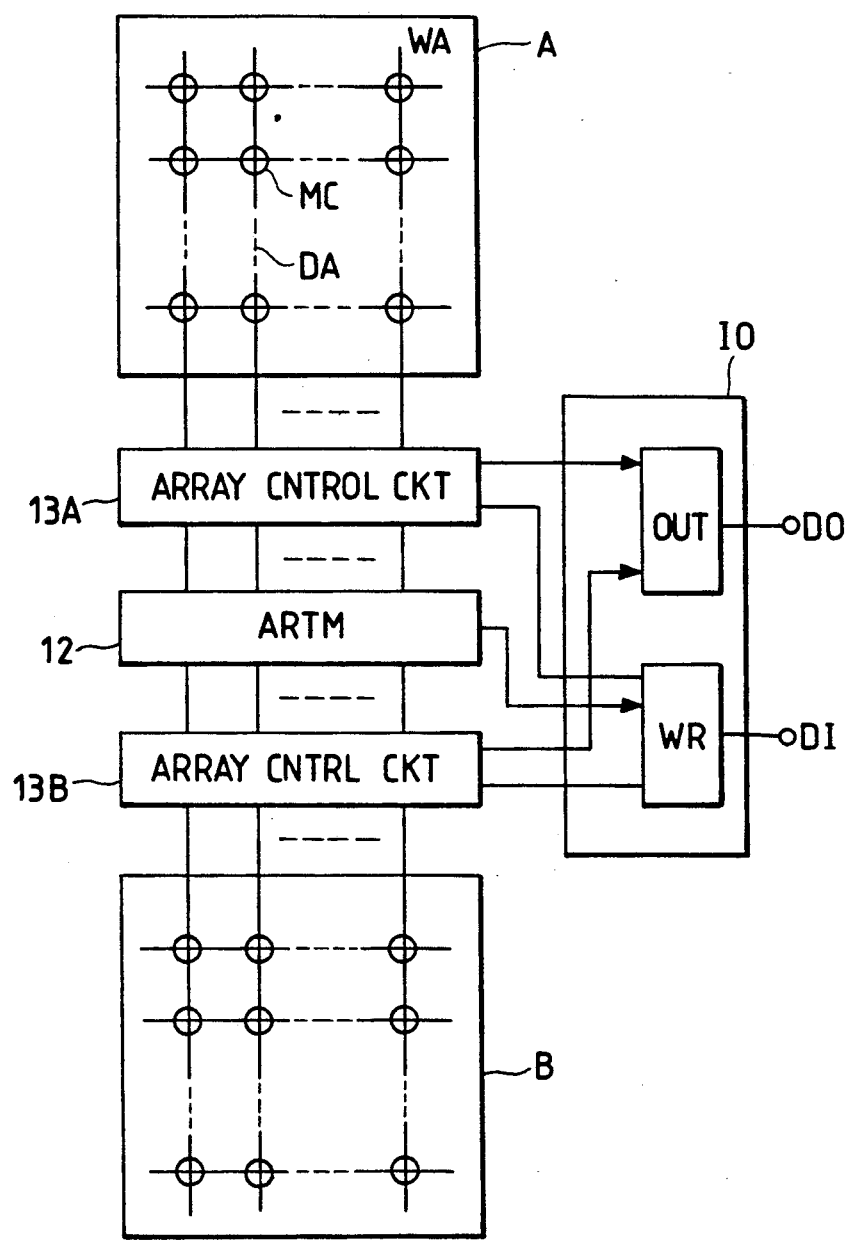
FIG. 7(b) shows one embodiment of the structure, in which the data processing system according to the present invention is realized by using two memory arrays capable of reading out a number of data on data lines by selecting one word line.

As in the embodiment shown in FIG. 7(b), moreover, two memories A and B can be provided. In FIG. 7(b), characters 13A and 13B designate array control circuits for controlling the memory cell arrays A and B, respectively. Other circuits such as a decoder is not shown in FIG. 7(b). According to the structure of FIG. 7(b), the data of the memory cells on the two word lines of the memory cell arrays A and B can be written in the arithmetic circuit by selecting one word line of each of the memory cell arrays A and B. By using the structure of FIG. 7(b), the memory arrays can be separately used according to the kinds of data such that the memory cell array A is stored with the neuron output value whereas the memory cell array B is stored with the connection weight, the controls of the reading or writing operations can be simplified. Incidentally, in the embodiments of FIGS. 7(a) and 7(b), the write data DI and the read data DO may be processed in plurality and in parallel, or the array A and B may be separately provided with the read circuit OUT and the write circuit WR.

In the embodiments of FIGS. 7(a) and 7(b), the selection of a specific memory cell can be accomplished like the ordinary memory according to the address. By changing the order of selecting the address, therefore, those embodiments can be flexibly applied to the various networks or various parallel arithmetic systems.

In the embodiments of FIGS. 7(a) and 7(b), the memory can be exemplified by a highly integrated semiconductor memory such as the DRAM or SRAM. In this case, the memory can store many data so that a large-scale network can be integrated into one chip.

Figure 2A:
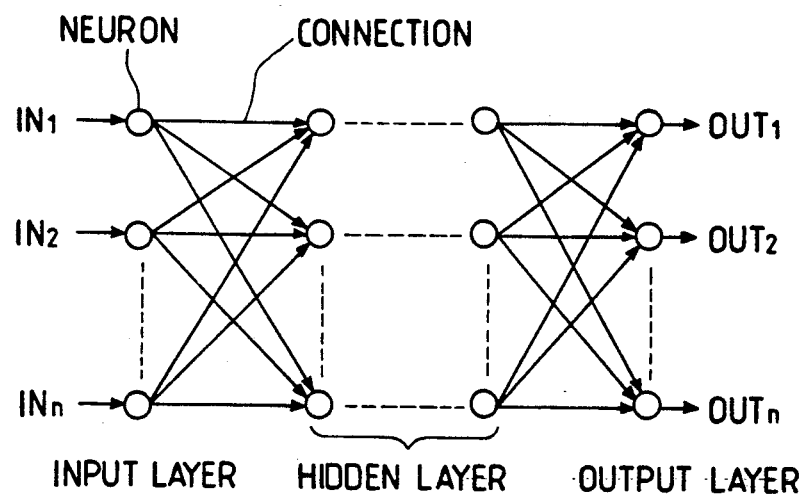
FIGS. 2(a) and 2(b) are diagrams showing the principle of the multi-layered neural network.
Figure 2B:
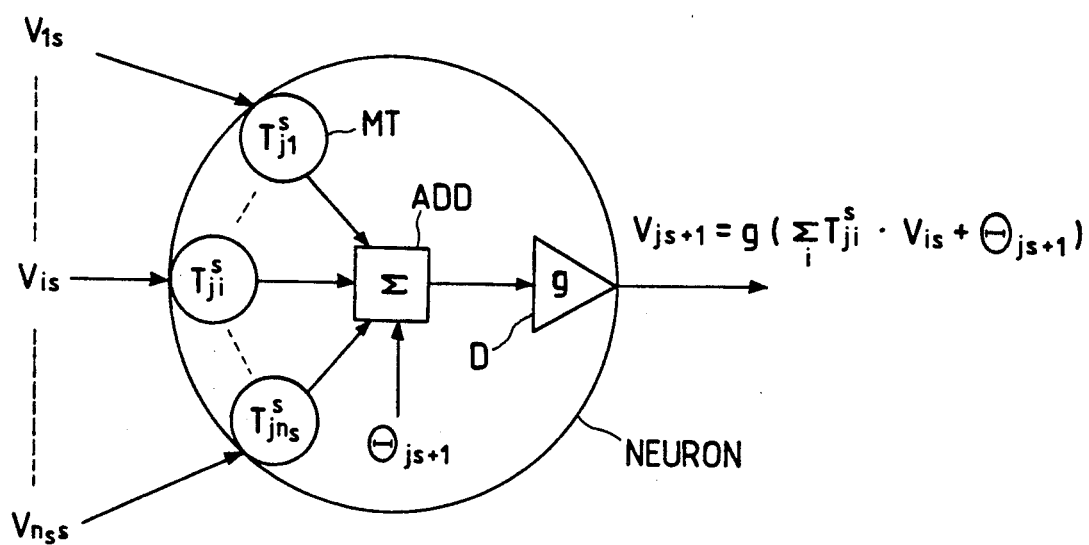
Figure 2C:
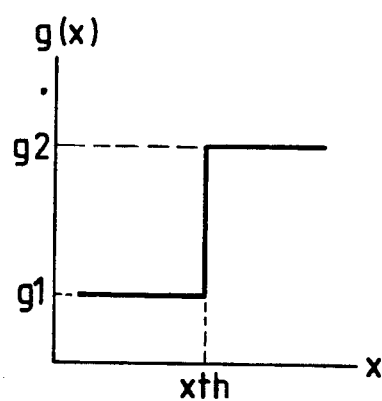
FIGS. 2(c) and 2(d) are diagrams showing the examples of the characteristics of the nonlinear transfer function circuit D.
Figure 3A:
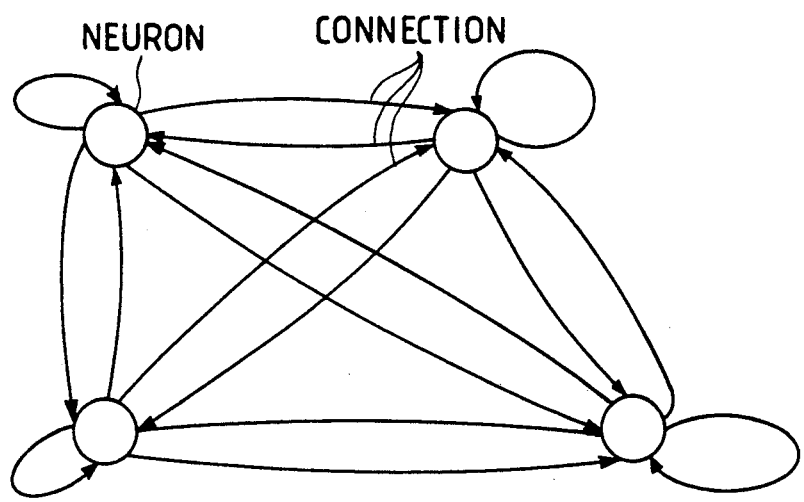
FIGS. 3(a) and 3(b) are diagrams showing the principle of the Hopfield neural network.
Figure 3B:
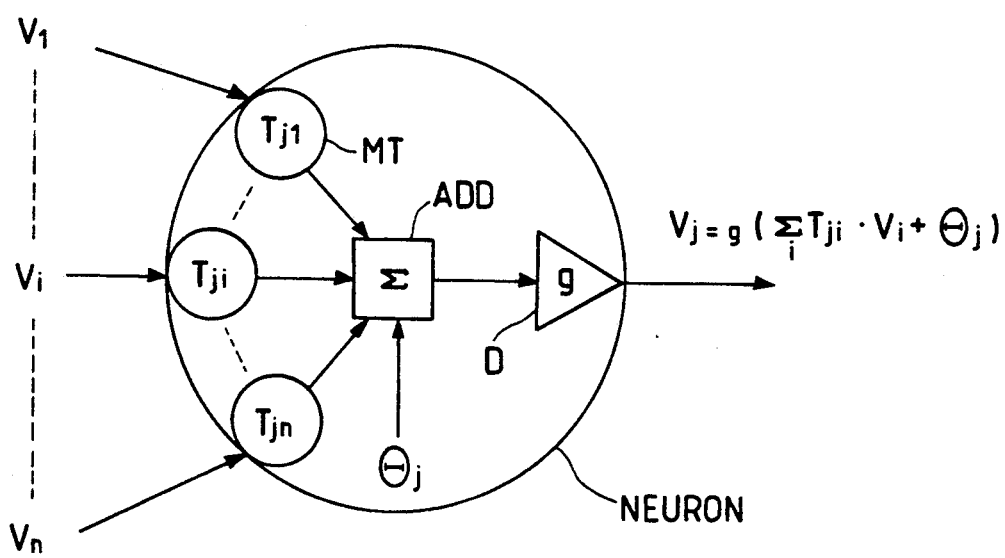
Figure 8A:
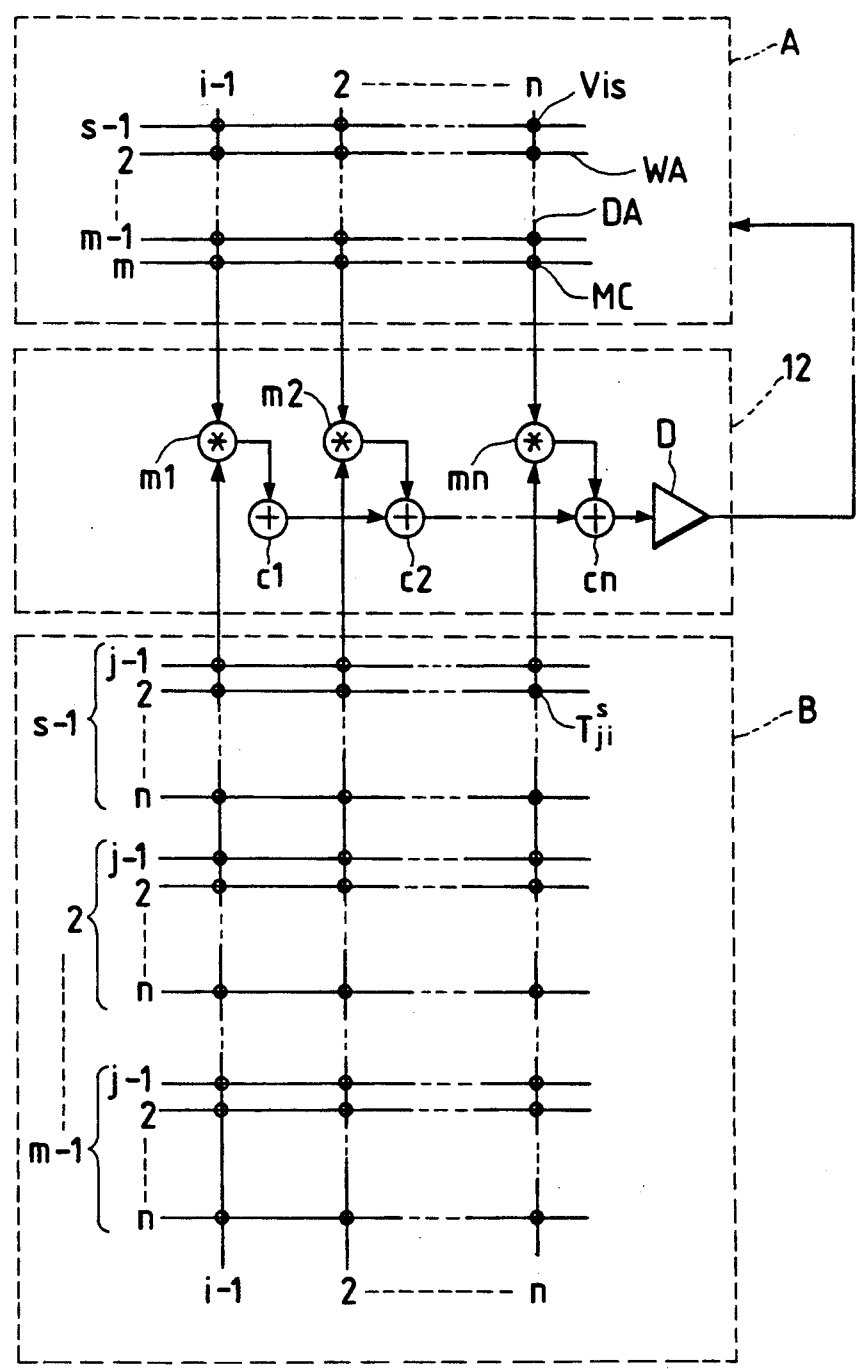
FIG. 8(a) shows one embodiment of the corresponding relations of memory cells to the neuron output values and the connection weights, in case the multi-layered neural network is realized by using the embodiment of FIG. 7(b), that is to say, the embodiment in which the neuron output value and the connection weight are realized with each memory cell.

Next, the method of realizing the multi-layered network by using the structure of FIG. 7(b) will be described in detail in the following. The parallel arithmetic system is exemplified by taking the system of FIG. 5(a). It is assumed that the number of layers be m and that the number of neurons in each layer be n. Incidentally, the offset $\theta$ of each neuron, as shown in FIG. 2(b) or FIG. 3(b), will be omitted here so as to simplify the description. As is apparent from FIG. 2(b) or FIG. 3(b), however, the offset $\theta$ of each neuron can be handled like the output from another ordinary neuron either by providing one neuron having an output value of 1 at all times to setting the connection weight of it and each neuron at the offset $\theta$ or by increasing the neuron output value, which is to be inputted for each neuron, by 1 to set the value at the offset $\theta$ of each neuron and the corresponding connection weight at 1 so that their product may be added to the total sum of the products of other neuron output values and the connection weights. FIG. 8(a) shows one embodiment in which the memory cells are correspond to the connection weights and the neuron output values. Letter D designates the non-linear transfer function circuit; characters c1, c2, - - -, and cn designate the adders; and characters m1, m2, - - -, and mn designate the multipliers. The adders c1, c2, - - -, cn constitute altogether the multi-input adder ADD of FIG. 2(b). The memory cell array A is stored with the neuron output values, and the memory cell array B is stored with the connection weights. Although what is shown in FIG. 8(a) is the memory cells for storing the neuron output values and the connection weights, it is quite natural that the memory cells to be stored with other data such as the offsets $\theta$ of the individual neurons or the data necessary for the learning may be provided, if necessary. As shown, the memory cells located at the intersections of the word lines s and the data lines i in the memory cell array A are stored with neuron output values $V_{is}$. In other words, the output values of the neurons of the common layer are arranged on the common word line. In the memory cell array B, the memory cells located at the intersections between the word lines (s, j) and the data lines i are stored with connection weights $T^s_{ij}$.

Figure 2D:
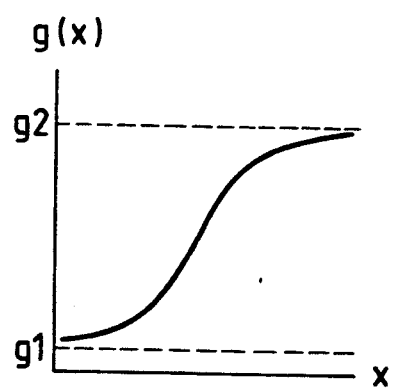
Figure 8B:
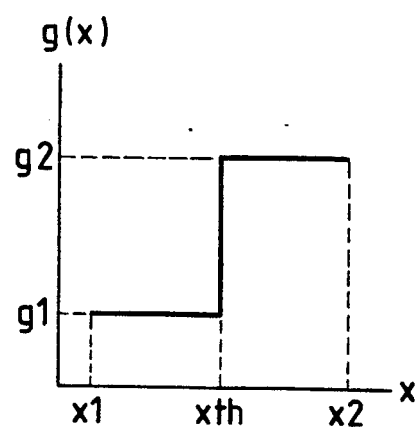
FIG. 8(b) shows one embodiment of the characteristics of the nonlinear transfer function circuit D which is suitable in case binary memory cells are used in the embodiment of FIG. 8(a)
Figure 8C:
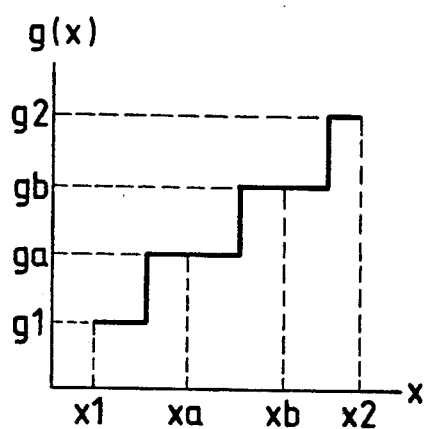
FIG. 8(c) shows one embodiment of the characteristics of the nonlinear transfer function circuit D which is suitable in case tetral memory cells are used in the embodiment of FIG. 8(a)

FIGS. 8(b) and 8(c) show one embodiment of the input/output characteristics of the nonlinear transfer function circuit D. FIG. 8(b) shows the embodiment having binary outputs g1 and g2. Characters x1 and x2 indicate the lower limit and the upper limit of the input x, respectively. In FIG. 8(b), the output is g2, if the input x exceeds the threshold value xth, but g1 if not. Therefore, the embodiment of FIG. 8(b) is suitable when the memory cell used is binary. FIG. 8(c) shows an embodiment having tetral outputs ga and gb between the outputs g1 and g2. The present embodiment is a suitable example when the tetral memory cells are used. The gap between the elements g1, ga, gb and g2 can naturally be changed, if necessary, although they are shown equally distant in FIG. 8(c). In case the memory cells are exemplified by those capable of storing data having continuous values, i.e., the so-called "analog values", the nonlinear transfer function circuit D to be used may have the characteristics shown in FIG. 2(d).

FIG. 8(d) shows one embodiment of the correspondences in the embodiment of FIG. 8(a) between the word line selecting method for determining the neuron output values of the final layer from the neuron output values of the input layer and the write destination addresses. The operations of FIG. 8(a) will be described in the following with reference to FIG. 8(d). The neuron output values $V_{11}$, $V_{21}$, - - -, and $V_{n1}$ of the input layer are written in advance in the input/output circuit (although omitted from FIG. 8) in the memory cells on the word line of S=1 of the array A. First of all, the word lines of s=1 of the array A and the word lines of (s, j)=(1, 1) of the array B are selected simultaneously, although not necessarily complete. Then, the neuron output values $V_{11}$, $V_{21}$, - - -, and $V_{n1}$ of the input layer are outputted to the data lines of i=1, 2, - - -, and n of the array A. On the other hand, the connection weights $T^1_{11}$, $T^1_{12}$, - - -, and $T^1_{1n}$ are outputted to the data lines of i=1, 2, - - -, and n of the array B. These values are inputted to the multipliers m1, m2, - - -, and mn so that their products $T^1_{11}V_{11}$, $T^1_{12}V_{21}$, - - -, and $T^1_{1n}V_{n1}$ are inputted to the adders c1, c2, - - -, and cn. The results $(T^1_{11}V_{11}+T^1_{12}V_{21}, - - -, +T^1_{1n}V_{n1})$ are inputted to the nonlinear transfer function circuit D. The output of this nonlinear transfer function circuit D is written through the write circuit WR (although omitted) in the memory cells corresponding to the write destination addresses of (s, i)=(2, 1) in the array A. Thus, the value of the first neuron output value $V_{21}$ of the second layer is calculated. Next, the word line of s=1 of the array A and the word line of (s, j)=(1, 2) of the array B are simultaneously selected. Then, the neuron output values $V_{11}$, $V_{21}$, - - -, and $V_{n1}$ of the input layer are outputted to the data lines of i=1, 2, - - -, and n of the array A. On the other hand, the connection weights $T^1_{21}$, $T^1_{22}$, - - -, and $T^1_{2n}$ are outputted to the data lines of i=1, 2, - - -, and n of the array B. These values are inputted to the multipliers m1, m2, - - -, and mn so that their products $T^1_{21}V_{11}$, $T^1_{22}V_{21}$, - - -, and $T^1_{2n}V_{n1}$ are inputted to the adders c1, c2, - - -, and cn. The results $(T^1_{21}V_{11}+T^1_{22}V_{21}, - - -, +T^1_{2n}V_{n1})$ are inputted to the nonlinear transfer function circuit D. The output of this nonlinear transfer function circuit is written through the write circuit (although not shown) in the memory cells corresponding to the write destination addresses of (s, i)=(2, 2) in the array A. Thus, the value of the second neuron output value $V_{22}$ of the second layer is calculated. All the neuron output values can be calculated by continuing the operations thus far described according to FIG. 8(d). According to the present embodiment, one neuron output value can be determined by executing the reading and writing operations once in the arithmetic mode so that the neural network processing can be accomplished at a high speed. Since, moreover, the arithmetic circuit can be shared among all the neurons, a high integration can be made. Incidentally, FIG. 8(d) shows one example of assignment of the memory cells, and the present invention should not be limited thereto but can be modified in various manners. For example, the plural input data can be continuously processes, as has been described hereinbefore. In this case, a plurality of sets of neuron output values of an input layer are required. For this operation, the neuron output values of the input layer corresponding to the plural input data may be written in advance on the plural different word lines of the array A so that they may be consecutively used. Thus, the neuron output values of the input layer need not be read in for each data processing so that the data processings can be continuously accomplished at the high speed.

Here is used one memory cell for storing the neuron output value and the connection weight. This allows only binary values to be taken as the neuron output values and the connection weights in case the binary memory cells are used. By using the multivalued memory cells, as has been described hereinbefore, the neuron output values and the connection weight values could be increased, but the multi-valued memory cells may have its reliability made deficient by the problem of S/N ratio. In this case, a plurality of memory cells can be used for storing the neuron output values and the connection weights, as will be described in the following.

Figure 9A:
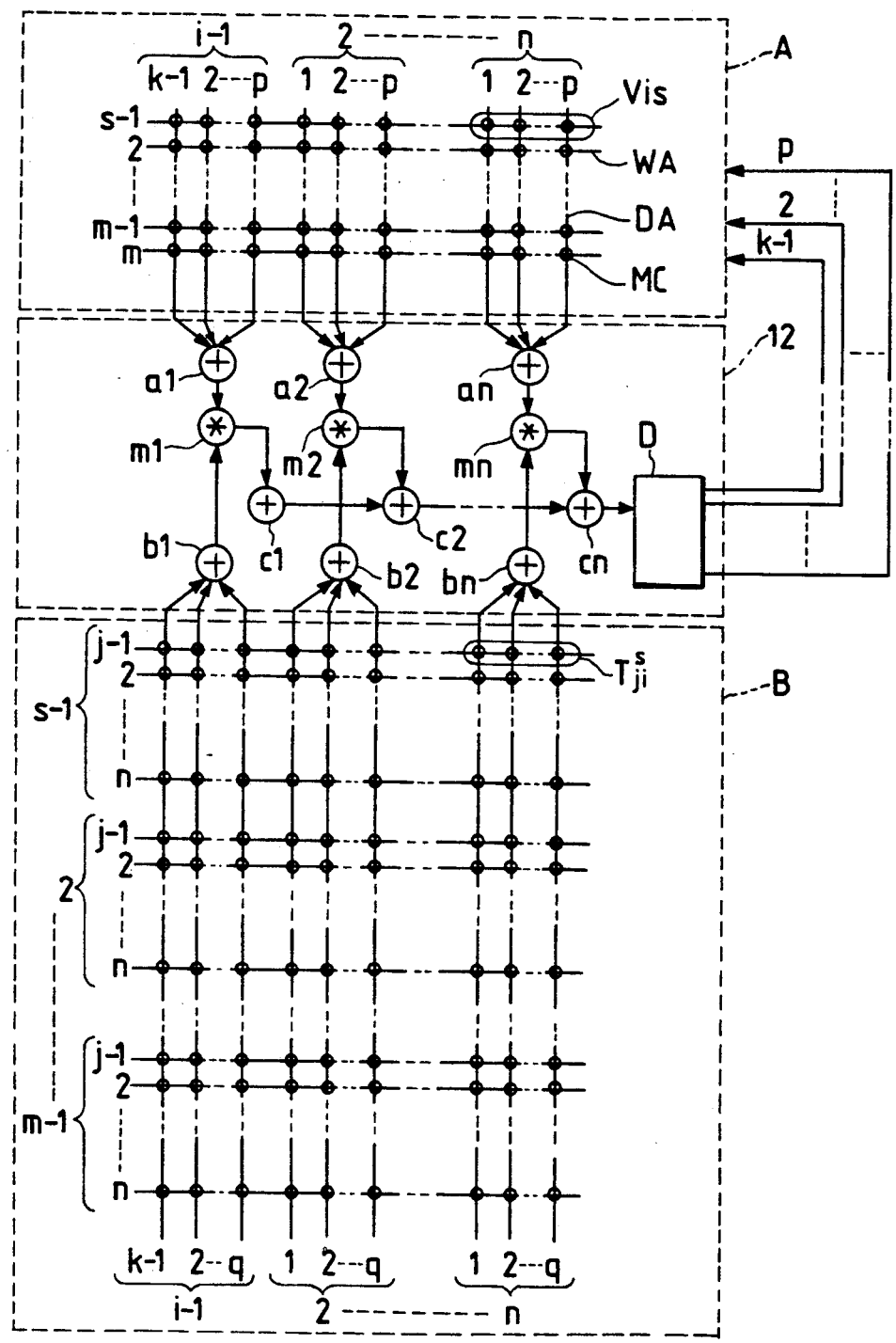
FIG. 9(a) shows a second embodiment of the corresponding relations of the memory cells to the neuron output values and the connection weights, in case the multi-layered neural network is realized by using the embodiment of FIG. 7(b), that is to say, the embodiment in which the neuron output values and the connection weights are realized by a plurality of memory cells.

FIG. 9(a) shows one embodiment of the case in which a p number of memory cells are used for storing one neuron output value and in which a q number of memory cells are used for storing one connection weight. The suffix i, j or s appearing in FIG. 9(a) to indicate the neuron output value or the connection weight corresponds to that of the embodiment shown in FIG. 8. In the embodiment of FIG. 9(a), the p number of continuous memory cells on one word line in the array A express one neuron output value, and the q number of continuous memory cells on one word line in the array B express one connection weight.

The calculations of the neuron output values are carried out in the following manner. First of all, like the embodiment of FIG. 8, the word line of s=1 of the array A and the word line of (s, j)=(1, 1) of the array B are simultaneously selected. Then, to the data line group of i=1, 2, ---, and n composed of p number data lines of the array A, there are outputted the data expressing the neuron output values of $V_{11}$, $V_{21}$, ---, and $V_{n1}$ of the input layer, which are inputted group by group to the adders a1, a2, ---, and an. To the data line group of i=1, 2, ---, and n composed of q number of data lines of the array B, on the other hand, there are outputted the data expressing the connection weights $T^1_{11}$, $T^1_{12}$, ---, and $T^1_{1n}$, which are inputted group by group to the adders b1, b2, ---, and b3. By the aforementioned adders a1, a2, ---, and an, and b1, b2, ---, and bn, the neuron output values $V_{11}$, $V_{21}$, ---, and $V_{n1}$ and the connection weights $T^1_{11}$, $T^1_{12}$, ---, and $T^1_{1n}$ are composed and inputted, as shown, to the multipliers m1, m2, ---, and mn to produce the products $T^1_{11}V_{11}$, $T^1_{12}V_{21}$, ---, and $T^1_{1n}V_{n1}$. These products are inputted to the adders c1, c2, ---, and cn so that their results $(T^1_{11}V_{11} + T^1_{12}V_{21}, ---, + T^1_{1n}V_{n1})$ are inputted to the nonlinear transfer function circuit D. The output of the nonlinear transfer function circuit is written through the write circuit WR (although not shown) to the p number of memory cell groups corresponding to the write destination address (s, i)=(2, 1) in the array A. The output values of all the neurons can be determined by continuing similar operations by using the same address as that of FIG. 8(d).

Since, according to the aforementioned embodiment, one neuron output value is expressed with the p number of continuous memory cells on one word line in the array A, the multi-valued neuron output values can be expressed by using the binary memory cells. Since, moreover, one connection weight is expressed with the q number of continuous memory cells on one word line in the array B, the multi-valued connection weights can be expressed by using the binary memory cells. As a result, the multi-valued such as the neuron output values or the connection weights can be expressed with the binary memory cells. In the aforementioned embodiment, moreover, the frequency of switching the addresses is identical to that of the embodiment of FIG. 8 so that the data can be processed at a high speed like the embodiment of FIG. 8. In order to write the result of the nonlinear transfer function circuit in the p number of memory cells expressing the neuron output values, the p number of writing operations may be continuously executed but can be easily accomplished in parallel by providing the p number of write circuits. In this case, it is possible to avoid the time losses for writing the plural memory cells. By providing a plurality of read circuits, on the other hand, it is naturally possible to increase the speed of the reading operations. Incidentally, if a multi-input circuit is used as the multipliers m1, ---, and mn in the embodiment of FIG. 9(a), a similar circuit can be realized without providing the adders a1, ---, and an, and b1, ---, and bn. In addition, the structure of the arithmetic circuit can be modified in various manners.

Figure 9B:
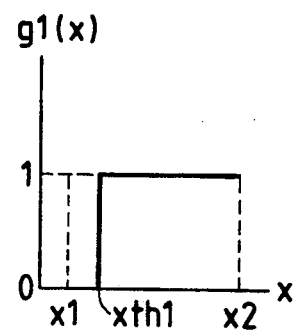
FIG. 9(b) shows one embodiment of the characteristics of the nonlinear transfer function circuit D which is suitable in case the neuron output values and the connection weights are equivalently expressed by a plurality of memory cells in the embodiment of FIG. 9(a)
Figure 9B:
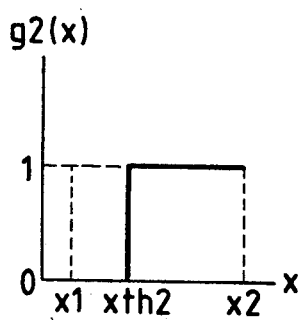
Figure 9B:
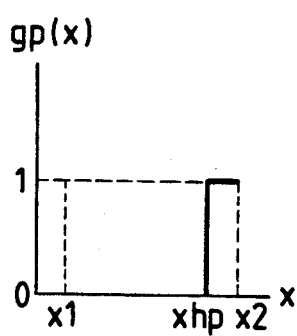
Figure 9C:
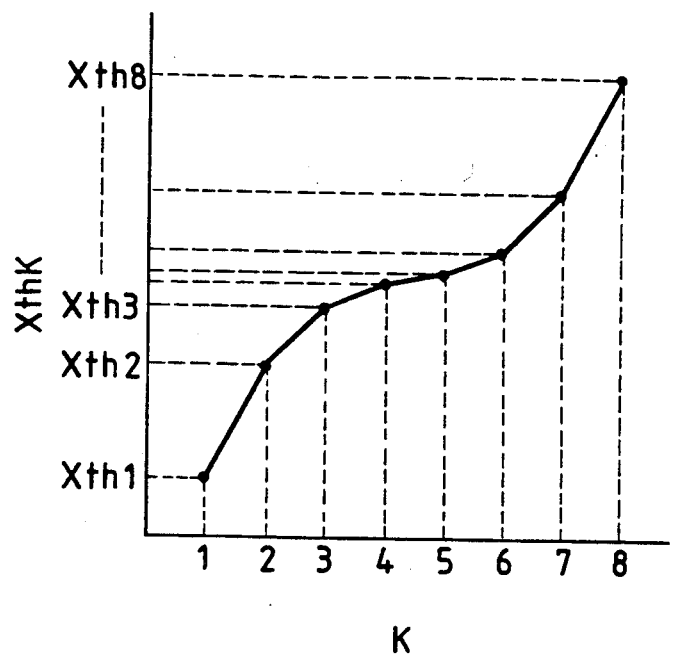
FIG. 9(c) shows one embodiment of a method of setting the values Xth1, - - -, and Xthp of FIG. 9(b) for giving the nonlinear transfer function circuit D the sigmoid characteristics.

The embodiment of FIG. 9(a) uses the p number of memory cells for storing the neuron output values and the q number of memory cells for storing the connection weights. In other words, the neuron output values are expressed in the p bits, and the connection weights are expressed in the q bits. Since there are various methods of expressing the data in the plural bits, an expression method may be selected, if necessary, and it is accordingly sufficient to design the characteristics of the adders, the multipliers and the nonlinear transfer function circuits. For example, the neuron output values can be expressed with the number of such ones of the memory cells of p bits expressing the neuron output values as have a content of 1. FIG. 9(b) shows one embodiment of the input/output characteristics of the nonlinear transfer function circuit D suited for such case. In FIG. 9(b), characters g1, g2, ---, and gp designate the p number of outputs of the nonlinear transfer function circuit D. Their individual outputs take the value 0 or 1, which is written in the p number of corresponding memory cells through the write circuit WR (although not shown). The outputs g1, g2, ---, and gp take the value 1, when the individual inputs exceed the values xth1, xth2, ---, and xthp, and otherwise take the value 0. These values xth1, xth2, ---, and xthp may be at an equal or arbitrary distance between the upper limit x1 and the lower limit x2 of the inputs. If the distance between the values xthk and xthk+1 (k=1, ---, and p−1) is set, as shown in FIG. 9(c), the non-linear transfer function circuit g can be realized to have the sigmoid characteristics. According to the present embodiment, one neuron output value can be given the p number of values by the p number of memory cells. In the present embodiment, the p number of memory cells expressing the neuron output values are equivalently handled. Specifically, the influences upon the neuron output values are equal no matter what of the p number of memory cells might have its data inverted or fixed. As a result, the influences upon the neuron output values due to the fall of the data of one memory cell can be made lower than those of the general binary expressions. This expression method will be referred to as the "equivalent expression" in the following. Here has been described the neuron output values, but the aforementioned equivalent expression can naturally be used for the connection weights.

Figure 10A:
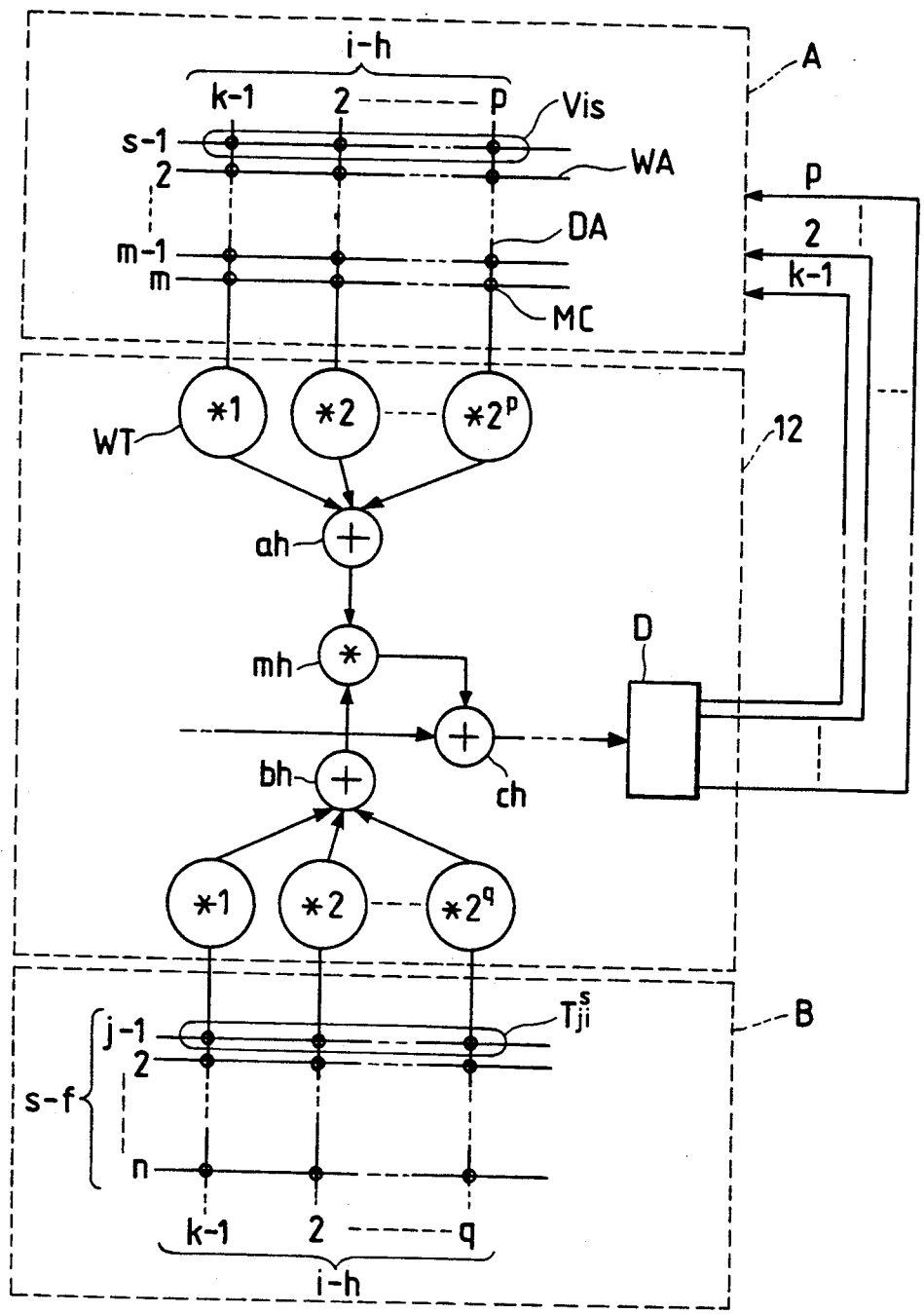
FIG. 10(a) shows a third embodiment of the corresponding relations of the memory cells to the neuron output values and the connection weights, in case the multi-layered neural network is realized by using the embodiment of FIG. 7(b), that is to say, the embodiment in which the neuron output values and the connection weights are realized by a plurality of memory cells.
Figure 10B:
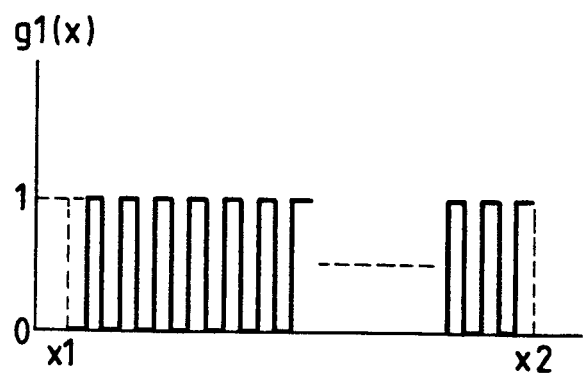
FIG. 10(b) shows one embodiment of the characteristics of the nonlinear transfer function circuit D which is suitable in case the neuron output values and the connection weights are binarily expressed by a plurality of memory cells in the embodiment of FIG. 10(a)
Figure 10B:
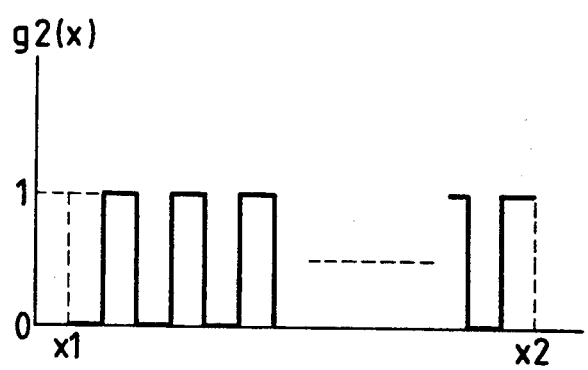
Figure 10B:
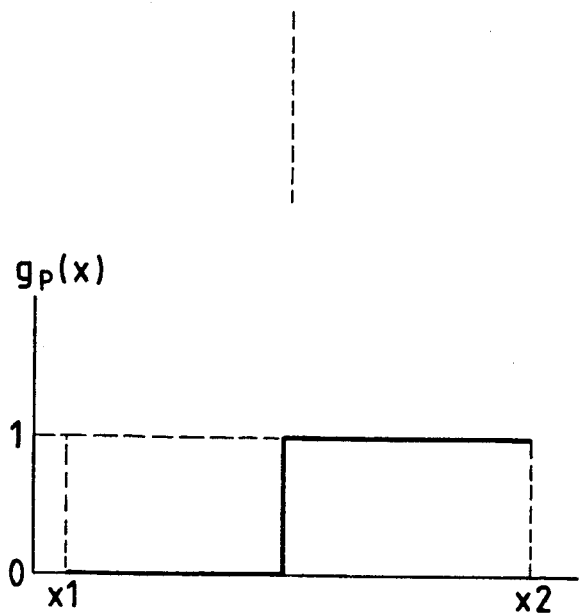

The binary expressions can naturally be used. This case is suited for expressing many values with less memory cells because the $2^P$ values can be expressed in the p bits. FIG. 10(a) shows one embodiment of the case, in which the binary expressions are used for the neuron output values and the connection weights. Only the memory cells on the data line of i=h (h=1, 2, ---, and n) are shown in the array A, and only the memory cells on the data line of i=h and on the word line of s=f (f=1, 2, ---, and m−1) are shown in the array B. In FIG. 10(a), letters WT designate a weighing circuit for weighing the signals of the memory cells and transmit them to the adders ah and bh. Here, the weighing coefficient are varied for the every memory cells, as shown, from 1 to $2^P$ for the neuron output values and from 1 to $2^q$ for the connection weights. As a result, the neuron output values and the connection weights to be inputted to the multiplier mh can take the $2^P$ and $2^q$ numbers of values, respectively. The address selecting method for calculating the neuron output values may follow FIG. 8(d) like the embodiment of FIG. 9. FIG. 10(b) shows one embodiment of the characteristics of the nonlinear transfer function circuit D in the embodiment of FIG. 10(a). The output g1 alternately repeats the values 0 and 1, each time the input varies by (x2−x1)/$2^P$, and the output g2 alternately repeats the values 0 and 1 for a period twice as long as that of the output g1. The periods are likewise varied by times so that the output gp is set from 0 to 1 across the value of (x2−x1)/2. In other words, the nonlinear transfer function circuit D may be so designed that it may operate as an A/D converter. In the present embodiment, too, the nonlinear transfer function circuit D can be so designed that the neuron output values may increase nonlinearly for the input. In order to increase the neuron output values according to the sigmoid function in response to the input, for example, the periods for the individual outputs to vary may be decreased with the increase in the input, while the period ratios between the different values g being held constant, so that the periods may be increased with the increase in the input when the input exceeds the value of (x2−x1)/2. As has been described hereinbefore, according to the embodiments shown in FIGS. 10(a) and 10(b), the neuron output values and the connection weights can be expressed to have the $2^P$ values and the $2^q$ values, respectively, by using the p and q numbers of memory cells, respectively. Thus, the embodiments are suited for giving the neuron output values and the connection weights multiple values with less memory cells. Incidentally, in the present embodiment, too, various modifications can naturally be made such that the functions of the weight circuit WT and the adders a1, ---, and an, and b1, ---, and bn are given to the multipliers by using multi-input circuits as the multipliers m1, ---, and mn. Here has been described the embodiments using the equivalent expressions and the binary notations. In addition, there are various methods such as the method of expressing a negative number with a code bit or a method of expressing data in plural bits, which can be separately used, if necessary.

Next, here will be described an embodiment, in which a dynamic memory cell (i.e., DRAM cell) composed of one MOS transistor and one capacitor is used in the memory.

Figure 11:
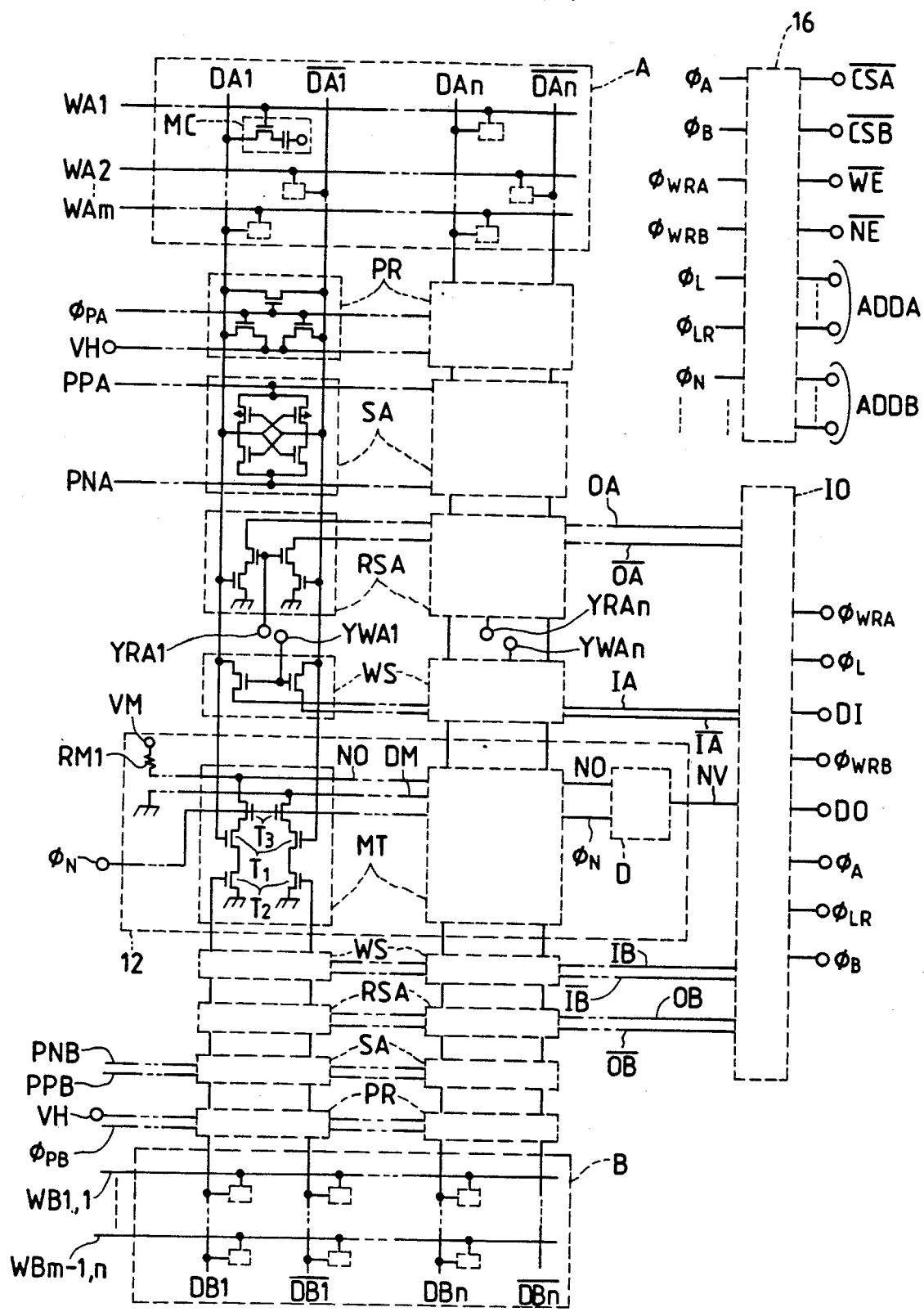
FIG. 11 shows one embodiment in case a DRAM cell is used as the memory cell of the embodiment of FIG. 8(a)

FIG. 11 shows an embodiment in which the embodiment shown in FIG. 8(a) is composed of the DRAM cells. In FIG. 11, the array A and the array B are composed of: a plurality of intersecting data line pairs DA1 and $\overline{DA1}$, ---, and DAn and $\overline{DAn}$, and $\overline{DB1}$ and DB1, ---, and DBn and $\overline{DBn}$, and word lines WA1, WA2, ---, and WAm, and WB1,1, WB1,2, --- WB1,n, and WB2,1, WB2,2, ---, and WBm-1,n; and memory cells MC disposed at their intersections. Each memory cell MC is arranged at either of the intersections between the paired data lines and the word line. Thus, the embodiment has the so-called "folded-bit line structure". In FIG. 11, letters PR, SA, RSA and WS designate a precharge circuit, a sense amplifier, a read sense amplifier, and a write switch, respectively, and correspond to the array control circuits 13A and 13B of FIG. 7(b). Letters MT appearing in the arithmetic circuit designate a multiplier. Numeral 16 designates a clock generator for generating clocks $\Phi_A$ and $\Phi_B$ for controlling other circuits in response to addresses ADDA and ADDB and chip select signals $\overline{CSA}$ and $\overline{CSB}$ given from the outside of the chip.

In the following, the operations of the embodiment of FIG. 11 will be described with reference to FIG. 12 and FIGS. 13(a) and 13(b). FIG. 12 shows one embodiment between the operation modes and the external signals. As has been described hereinbefore, the word lines of the memory cell arrays A and B are selected one by one in the earlier half of the arithmetic mode, and one word line of the memory cell array A is selected in the later half. In the memory mode, on the other hand, the memory cell arrays A and B are independently subjected to the reading and writing operations. In FIG. 12, the operation modes are further divided so that those controls may be facilitated. Letters AR, AW, BR and BW in the memory mode designate the reading mode from the array A, the writing mode in the array, the reading mode from the array B and the writing mode in the array B, respectively. On the other hand, letters NR and NW in the arithmetic mode the earlier half for reading and calculating the individual data and the later half for writing the arithmetic results, respectively. In order to switch those six modes, the present embodiment uses four external input signals: chip select signals $\overline{CSA}$ and $\overline{CSB}$; write control signal $\overline{WE}$; and arithmetic circuit control signal $\overline{NE}$. The chip select signals $\overline{CSA}$ and $\overline{CSB}$ assign the selections of the chips and the arrays A and B. The chips are unselected if both the signals $\overline{CSA}$ and $\overline{CSB}$ are at the H (i.e., high) level; the array is selected if the signal $\overline{CSA}$ is at the L (i.e., low) level; and the array B is selected if the signal $\overline{CSB}$ is at the L (i.e., low) level. The write control signal $\overline{WE}$ is one for switching the write and read, as has been described hereinbefore, and establishes the reading operation at the H level and the writing operation at the L level. The signal $\overline{NE}$ also establishes the memory mode at the H level and the arithmetic mode at the L level, as has been described hereinbefore. If, therefore, both the signals $\overline{CSA}$ and $\overline{CSB}$ are at the L level and the signal $\overline{WE}$ is at the H level whereas the signal $\overline{NE}$ is at the L level, for example, there is established the earlier half mode NR of the arithmetic mode, in which both the arrays A and B are read out. Since the switching of the arrays A and B is assigned by the chip select signal, the address signal can divide the addresses into the address group ADDA for selecting the memory cells of the array A and the address group ADDB for selecting the memory cells of the array B. Here, the address group ADDA is the generic name of the X-addresses for selecting the word lines of the array A and the Y-addresses for selecting the data lines of the array A. Likewise, the address group ADDB is the generic name of the X-addresses for selecting the word lines of the array B and the Y-addresses for selecting the data lines of the array B. In each operation mode, these address groups are applied to the address pins in accordance with FIG. 12. According to the embodiment of FIG. 12 thus far described, the two chip select signals are provided to switch the arrays A and B thereby to separate the addresses between the arrays A and B. Since the arrays A and B can be independently selected, it is possible to control each operation mode easily for selecting the arrays A and/ B. Incidentally, the relations between the operation modes and the external signals can naturally be modified in various manners in addition to those of FIG. 12. For example, there can be adopted: the method of adding addresses for switching the arrays A and B by using the chip select signal CS only; or the method of generating the X-address for selecting the word line of the array B in the mode NR from the counter disposed in the chip, by not dividing the addresses for the arrays A and B but selecting either the array A or B only.

Figure 13A:
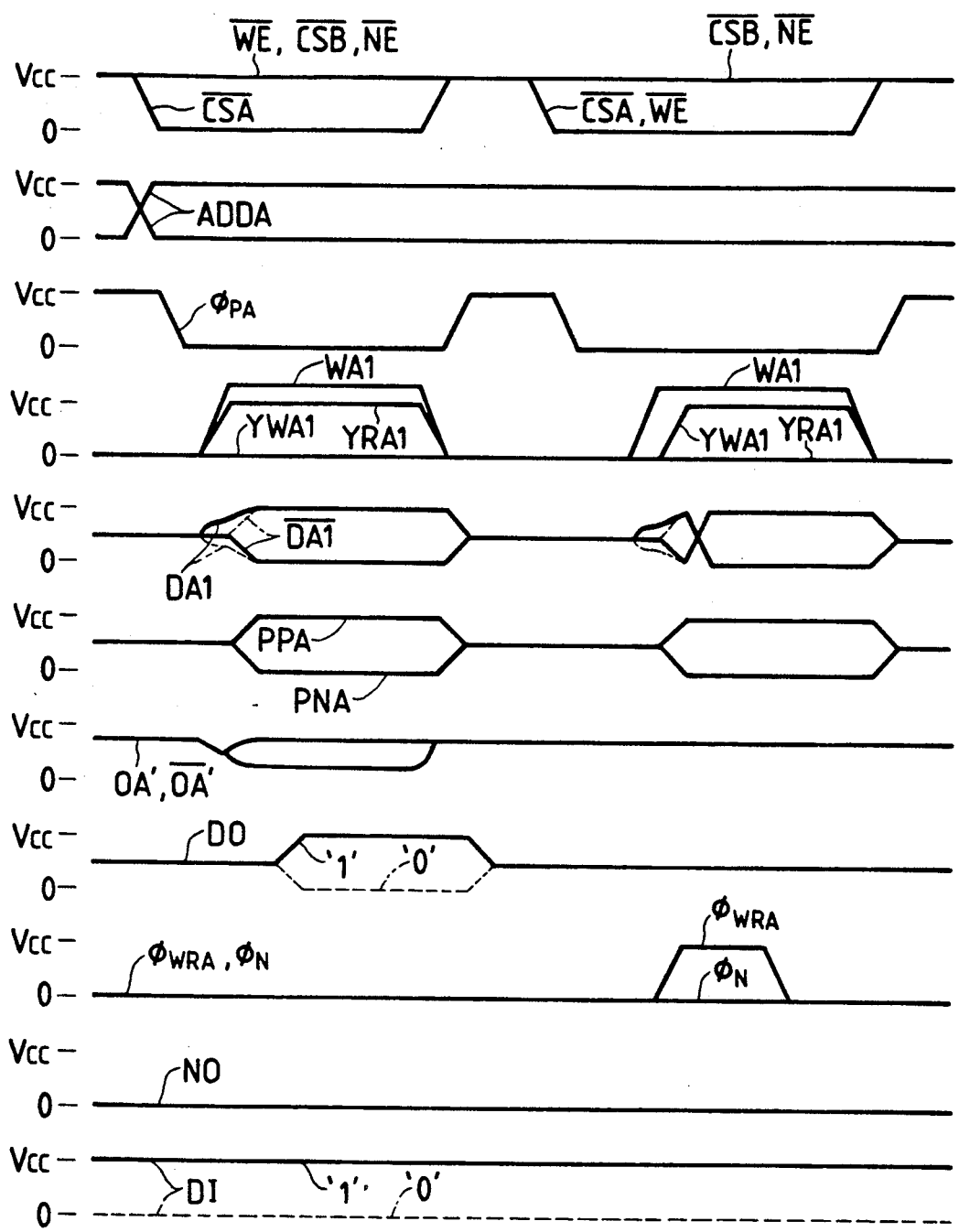
FIG. 13(a) shows one embodiment of the operation waveforms in the memory mode of the embodiment of FIG. 11.
Figure 13B:
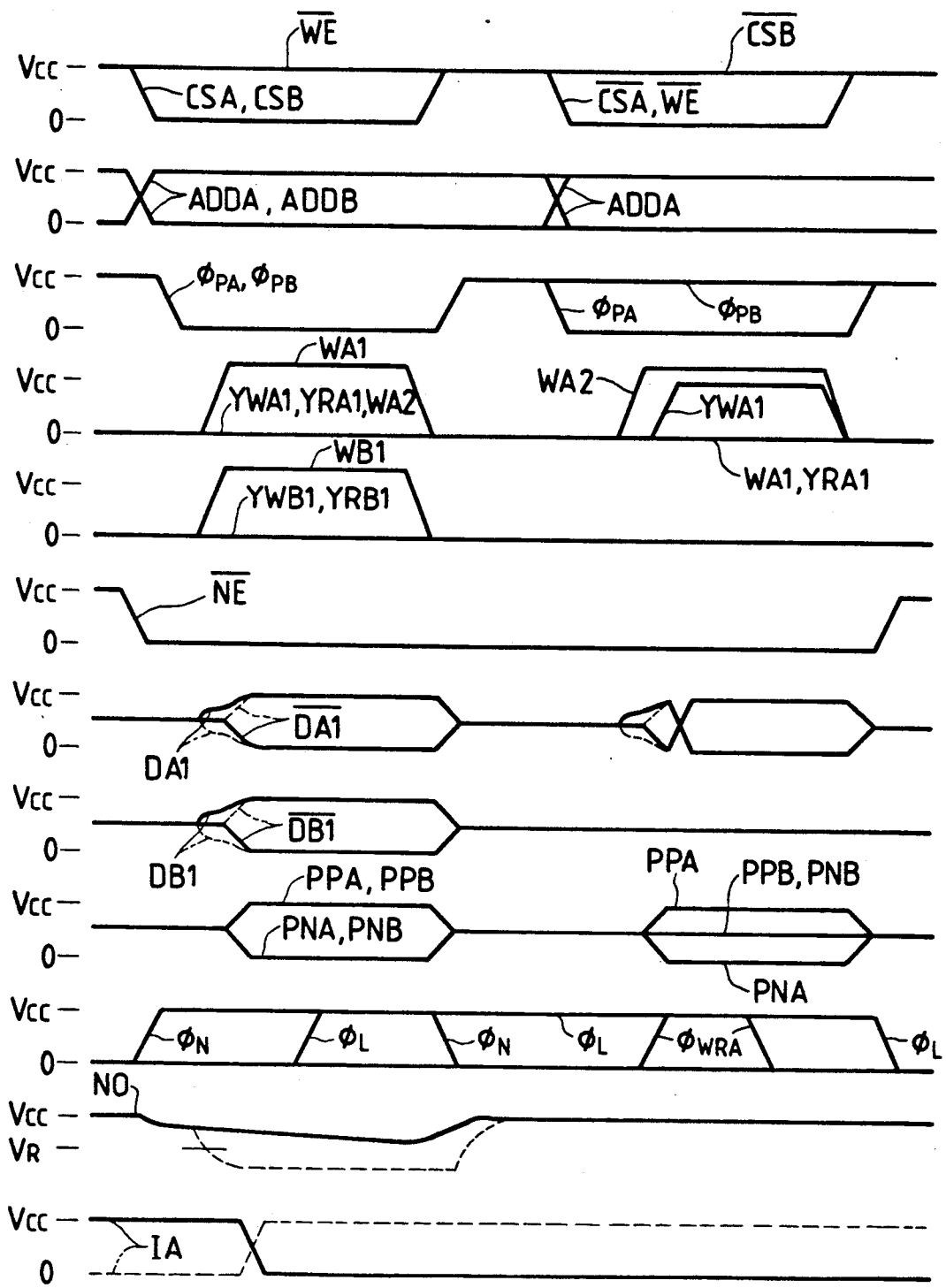
FIG. 13(b) shows one embodiment of the operation waveforms in the arithmetic mode of the embodiment of FIG. 11.

FIG. 13(a) shows an embodiment of the waveforms of FIG. 11 in the memory mode, and FIG. 13(b) shows an embodiment of the waveforms of FIG. 11 in the arithmetic mode.

The operations of the memory mode are similar to the reading and writing operations of the ordinary DRAM. FIG. 13(a) shows the voltage waveforms in case the reading operations (in the mode AR) and the writing operations (in the mode AW) are continuously executed for the memory cell at the intersection between the word line WA1 and the data line DA1 in the array A in the memory mode. In FIG. 13(a), letters Vcc designate a positive supply potential. Since, in the memory mode, the arithmetic circuit control signal $\overline{NE}$ is at the high level, the arithmetic circuit start signal $\Phi_N$ is fixed at the low level so that the arithmetic circuit 12 is OFF. Before the start of the reading operation, signals PPA and PNA are set at Vcc/2 so that the sense amplifier SA is OFF. Since a precharge signal $\Phi_{PA}$ is at the high potential, on the other hand, the precharge circuit PR is turned on to short the data line pairs DA1 and $\overline{DA1}$, - - -, and DAn and $\overline{DAn}$ and to set the potential at a precharge potential VH. This precharge potential VH is set at Vcc/2 according to the so-called "half-precharge method". When the chip select signal $\overline{CSA}$ drops to the low potential, the precharge signal $\Phi_{PA}$ falls to turn off the precharge circuit PR so that the word line WA1 selected by the address signal ADDA and a read Y-Select signal YRA1 are transited to the high potential. As a result, the MOS transistors of all the memory cells MC connected with the word line WA1 are rendered conductive to establish individually delicate potential differences on the data line pairs DA1 and $\overline{DA1}$, - - -, and DAn and $\overline{DAn}$ in accordance with the electric charges stored in the capacitor. This potential difference is read out and is detected by the sense amplifier RSA fed with the Y-Select signal YRA1 so that it is converted into the impedance difference of read lines OA and $\overline{OA}$. This impedance difference is converted by the input/output circuit into a voltage difference, which is amplified so that the content of the memory cell, i.e., the potential corresponding to 1 or 0 is outputted as the read data DO. The so-called "rewriting operation" is executed in parallel with the aforementioned operations in the following manner. After the individual delicate potential difference have been established in the data line pairs DA1 and DA1, - - -, and DAn and $\overline{DAn}$, the signal PPA is transited to the high potential whereas the signal PNA is transited to the low potential to start the sense amplifier SA. As a result, the delicate potential difference established in the data line pairs is amplified to transit the data lines at the high potential to the level Vcc and the data lines at the low potential to 0 V. As a result, the capacitors of all the memory cells MC connected with the word line WA1 are written again with the potential corresponding to the data before read. When the chip select signal $\overline{CSA}$ takes the high potential after the end of the rewriting operation, the selected word line WA1 and the read Y-select signal YRA1 are transited to the low potential, and the signals PPA and PNA are then transited to Vcc/2 to turn off the sense amplifier SA and transit the precharge signal $\Phi_{PA}$ to the high potential. As a result, the data line pairs are shorted, and the precharge potential VH is set with the potential, until the initial state is restored. The operations thus far described are the reading operations.

Subsequently, the operations are shifted to the writing operations (in the mode AW) of the same cells. When, in the writing operations, the chip select signal $\overline{CSA}$ takes the low potential and the write control input $\overline{WE}$ takes the low potential, the data given to the write data DI are written in the selected memory cell in the array A. In the writing operation, too, the precharge signal $\Phi_{PA}$ is dropped at first to turn off the precharge circuit PR when the chip select signal $\overline{CSA}$ drops to the low potential. Next, the word line WA1 selected by the address signal ADDA and the Y-Select signal YRA1 are transited to the high potential. As a result, the MOS transistors of all the memory cells MC connected with the word line WA1 are rendered conductive so that the delicate potential differences are individually established in the data line pairs DA1 and $\overline{DA1}$, - - -, and DAn and $\overline{DAn}$ in accordance with the electric charges stored in the capacitor. The delicate potential differences established in the data line pairs are amplified by the sense amplifier SA. Subsequently, an input circuit starting signal $\Phi_{WRA}$ generated as a result of transition of the control input $\overline{WE}$ to the low potential is transited to the high potential. As a result, the data given to the write data DI are transmitted as the difference signals to write line pairs IA and $\overline{IA}$. Moreover, the write Y-select signal YWA1 is transited to the high potential to turn on the write switch WS connected with the write destination memory cell. As a result, the write line pairs IA and $\overline{IA}$ are conducted to the data line pairs DA1 and $\overline{DA1}$, respectively. As a result, the data line pairs DA1 and $\overline{DA1}$ are set to the potential corresponding to the data fed to the write data DI. After this, the input circuit starting signal $\Phi_{WRA}$ is transited to the low potential, but the potential of the data line pairs is held by the sense amplifier SA. In the data line pairs for which the write switch WS is not turned on, the signal read out at first is amplified as it is by the sense amplifier so that the rewrite is executed. When the chip select signal $\overline{CSA}$ takes the high potential after the end of the rewriting operation, the selected word line WA1 and the write Y-selection signal YWA1 are shifted to the low potential. After this, the signals PPA and PNA are transited to Vcc/2 to turn off the sense amplifier SA and to transit the precharge signal $\Phi_{PA}$ to the high potential. As a result, the data line pairs are shorted and has its potential set to the precharge potential VH so that the initial state is restored. The operations thus far described are the writing operations.

Here, the foregoing description is directed to the case in which a memory cell in the array A is continuously subjected to the reading operation and the writing operation. Despite of this description, however, one of the reading and writing operations can be continuously executed. Moreover, it is quite natural that memory cells in desired positions in a memory cell array, which are different for every reading operation or writing operation, can be subjected to the reading operation or the writing operation by switching the modes AR, AW, BR and BW.

Next, the operations of the arithmetic mode will be described in the following. FIG. 13(b) shows the operation waveforms for obtaining a neuron output value $V_{12}$. Let it be assumed that the necessary connection weights and neuron output values or the like have already been written by the writing operations in the memory mode. In order to establish the mode NR, first of all, the chip select signals $\overline{CSA}$ and $\overline{CSB}$ are set to the low level, and the write control signal WE is set to the high level whereas the arithmetic circuit control signal $\overline{NE}$ is set to the low level. The addresses ADDA and ADDB are so set as to select the word line WA1 of the array A and the word line WB1 of the array B. Since the signals $\overline{CSA}$ and $\overline{CSB}$ are at the low level, the precharge signals $\Phi_{PA}$ and $\Phi_{PB}$ are transited to the low level. Since the signal $\overline{NE}$ is at the low level, the arithmetic circuit starting signal $\Phi_N$ is transited to the high level. Subsequently, the word lines WA1 and WB1 are selected so that the neuron output values $V_{11}$, $V_{21}$, - - -, and $V_{n1}$ and the connection weights $T^1_{11}$, $T^1_{12}$, - - -, and $T^1_{1n}$ are read out of the memory cells on the word line WA1 onto the data lines. Thus, the neuron output values read out from the array A and the connection weights read out from the array B are inputted to the multiplier MT which has been started by the arithmetic circuit starting signal $\Phi_N$, as shown in FIG. 11. In the multiplier MT, the data lines at the side of the array A and the data lines at the side of the array B are individually connected with the gates of the MOS transistors (T$_1$, T$_2$), which in turn are connected with the product/sum output line NO and the dummy line DM through the switching MOS transistor (T$_3$) fed with the arithmetic circuit starting signal $\Phi_N$. The product/sum output line NO has its one terminal connected with the power source VM through the load RM1, and the dummy line DM has its one terminal earthed to the ground. When the signal read out to the data lines is amplified to Vcc or 0 V by the sense amplifier SA, the electric current lows through the load RM1 from the power source VM to the earthed electrode in the multiplier in which the product to the neuron output value and the connection weight is 1. As a result, the potential of the product/sum output line NO drops in proportion to the number of combinations, in which the product of the neuron output value and the connection weight is 1. The product/sum NO is inputted to the nonlinear transfer function circuit D. In this nonlinear transfer function circuit D, the summation of the products of the neuron output values and the connection weights is so high that the detection result of whether or not the potential of the product/sum output line NO is lower than reference voltage VR is outputted to a line NV. In the waveforms of the product/sum output line NO shown in FIG. 13(b), solid lines show the case, in which the result of the product sum is small, and broken curves show the case in which the result of the product sum is large. The input/output circuit detects the result of the nonlinear transfer function circuit D and outputs the neuron output value $V_{12}$, which is to be subsequently written in the memory cells, to the write line pairs IA and $\overline{IA}$. FIG. 13(b) show the waveforms of the write line pair IA. This pair IA takes the high level, as indicated by a broken curve, in case the product sum is large, and the low level, as indicated by a solid curve, in case the product sum is small. The word line pair $\overline{IA}$ takes an opposite phase. At the time when the neuron output values are outputted to the write line pairs IA and $\overline{IA}$, a latch signal $\Phi_L$ is transited to the high potential. As a result, the potentials outputted to the write line pairs IA and $\overline{IA}$ are latched by a latch circuit which is disposed in the input/output circuit IO. The latch signal $\Phi_L$ may be raised with a delay till the signals appear in the pairs IA and $\overline{IA}$, in response to the fall of the arithmetic circuit starting signal $\overline{NE}$. Subsequently, the arithmetic circuit starting signal $\Phi_N$ is transited to the low potential to turn off the arithmetic circuit so that the data lines are precharged as in the memory mode after the word lines have fallen. At this time, the latch signal $\Phi_L$ is left at the high potential so that the neuron output values outputted to the write line pairs IA and $\overline{IA}$ are held.

Next, the mode shifts to the mode NW, i.e., the later half of the arithmetic mode. First of all, the chip select signal $\overline{CSA}$ and the write control signal $\overline{WE}$ are set to the low level, and the chip select signal $\overline{CSB}$ is set to the high level to switch the address ADDA so that the memory cell for writing the neuron output value in the array A may be selected. The arithmetic circuit starting signal $\overline{NE}$ is left at the low level. As a result of the fall of the signal $\overline{CSA}$, the precharge signal $\Phi_{PA}$ drops to the low level to establish a state for the array A to be written. Subsequently, the potentials of the selected word line WA2 and the write Y-selection signal YWA1 fall. As a result, the neuron output value $V_{12}$ outputted to the write line pairs IA and $\overline{IA}$ is written in the memory cell which is connected with the WA2 and the data line DA1. Finally, all the potentials of the word lines are dropped for the precharge. Since, moreover, the arithmetic circuit control signal $\overline{NE}$ falls, the latch signal $\Phi_L$ falls to release the latch. Thus, preparations are made for the next operations. The operations thus far described are those in the arithmetic mode. All the neuron output values can be calculated by continuing similar operations in different addresses in accordance with FIG. 8(d).

In the structure thus far described, the circuit of the multiplier MT, which is connected with the dummy line DM, may be omitted. If, however, the gate capacitors or the like of the MOS transistors of the multiplier MT are added to the data lines only at one side, the data line capacities are unbalanced to trouble the operations of the sense amplifier, as the case may be. In this case, the structure of FIG. 11 could avoid the inferior influences coming from the unbalance of the data line capacities.

Figure 14A:
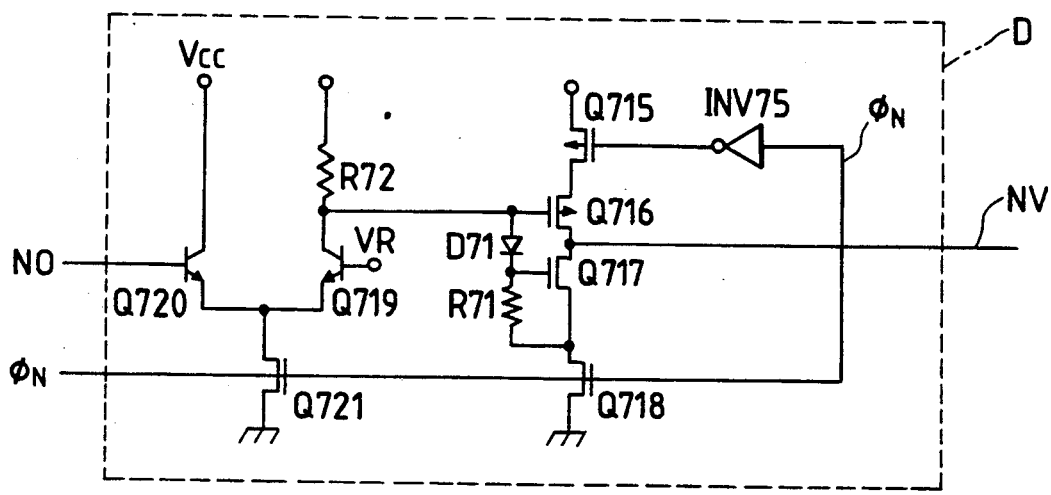
Figure 14B:
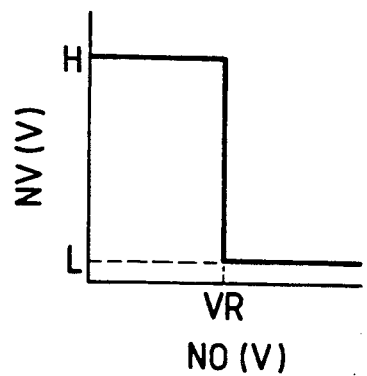
FIG. 14(b) shows one embodiment of the characteristics of the nonlinear transfer function circuit D of FIG. 14(a)

Next, an embodiment of the circuit suitable for use in FIG. 11 is shown. FIG. 14(a) shows one embodiment of the nonlinear transfer function circuit D. The present embodiment is constructed of: a differential amplifier composed of bipolar transistors Q720 and Q719, a resistor R72, and a MOS transistor Q721; and an inverter composed of an inverter INV75, MOS transistors Q715, Q716, Q717 and Q718, a resistor R71 and a diode D71. The present circuit is started when the signal $\Phi_N$ takes the high potential. FIG. 14(b) shows a relation between the potential of the product/sum output line NO or the input of the nonlinear transfer function circuit D and the potential of the output NV. The output NV takes the high potential, if the potential of the product/sum output line NO is lower than the reference potential VR, but takes the low potential if the potential of the line NO is higher than the reference potential VR. Since, according to the present embodiment, the bipolar transistors are used in the differential amplifier, it is possible to realize a nonlinear circuit which is characterized to have a steep rise for the change in the input. By setting the reference potential VR to a desired value, moreover, the characteristics of the nonlinear transfer function circuit D can be easily changed. Incidentally, the output of the different amplifier cannot be made so high so as to avoid the saturation of the bipolar transistor Q719. As a result, the downstream inverter may not operate if it is connected directly with the output of the differential amplifier. Therefore, the resistor R71 and the diode D71 are provided to drop the potential to be inputted to the MOS transistor Q717.

Figure 14C:
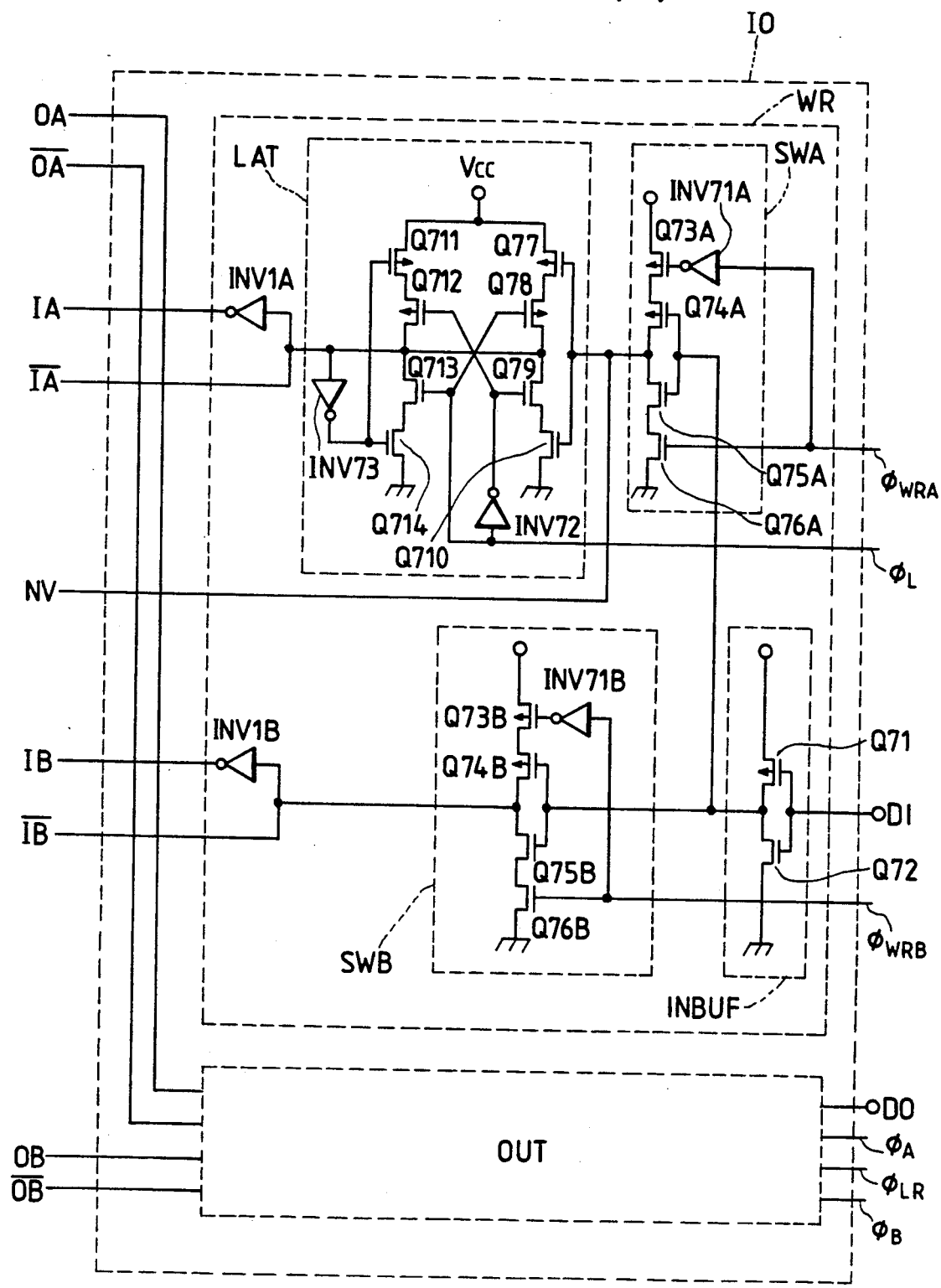
Figure 14D:
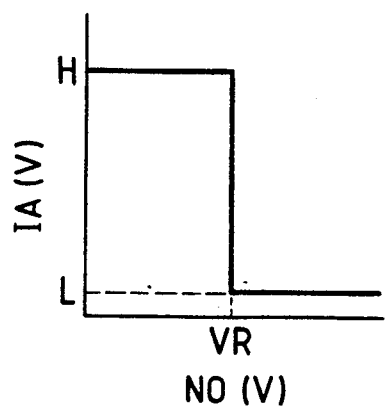
FIG. 14(d) shows one embodiment of the potential relation between the product and sum output line NO and the write line IA in case the nonlinear transfer function circuit of FIG. 14(a) and the write circuit of FIG. 14(c) are used.

FIG. 14(c) shows one embodiment of the input/output circuit IO. The write circuit WR is composed, as shown in FIG. 14(c), of an input buffer INBUF, write switches SWA and SWB, a latch circuit LAT, and inverters INVIA and INVIB. The write switches SWA and SWB are used to switch which of the arrays A and B has its memory cells written with the write data DI. When the switching signal $\Phi_{WRA}$ is at the high potential, the write data DI is written through the input buffer INBUF in the memory cells of the array A by the write line pairs IA and $\overline{IA}$. When the switching signal $\Phi_{WRB}$ is at the high potential, the write data DI is written through the input buffer INBUF in the memory cells of the array B by the write line pairs IB and $\overline{IB}$. The latch circuit LAT latches the data, which are outputted to the output NV of the nonlinear transfer function circuit D in the arithmetic mode, to write them in the memory cells of the array A by the write line pairs IA and $\overline{IA}$. Since the potential relations of the output NV of the nonlinear transfer function circuit D and the write line pairs IA and $\overline{IA}$ are in phase, as is apparent from 14(c), the potential relations between the product/sum output line NO of the nonlinear transfer function circuit D and the input common line IA are opposite to each other, as shown in FIG. 14(d). Since, in the embodiment of FIG. 11, the potential of the product/sum output line NO is the lower for the larger product sum of the neuron output values and the connection weights, as has been described hereinbefore, the circuit is made such that the potential relations between the product/sum output line NO and the input common line IA are opposite to each other. In case the potential of the product/sum output line NO is so designed that it may rise the more for the larger product sum of the neuron output values and the connection weights, it is quite natural that the circuit may be so made that the potential relations between the product/sum output line NO and the input common line IA are in phase.

Figure 14E:
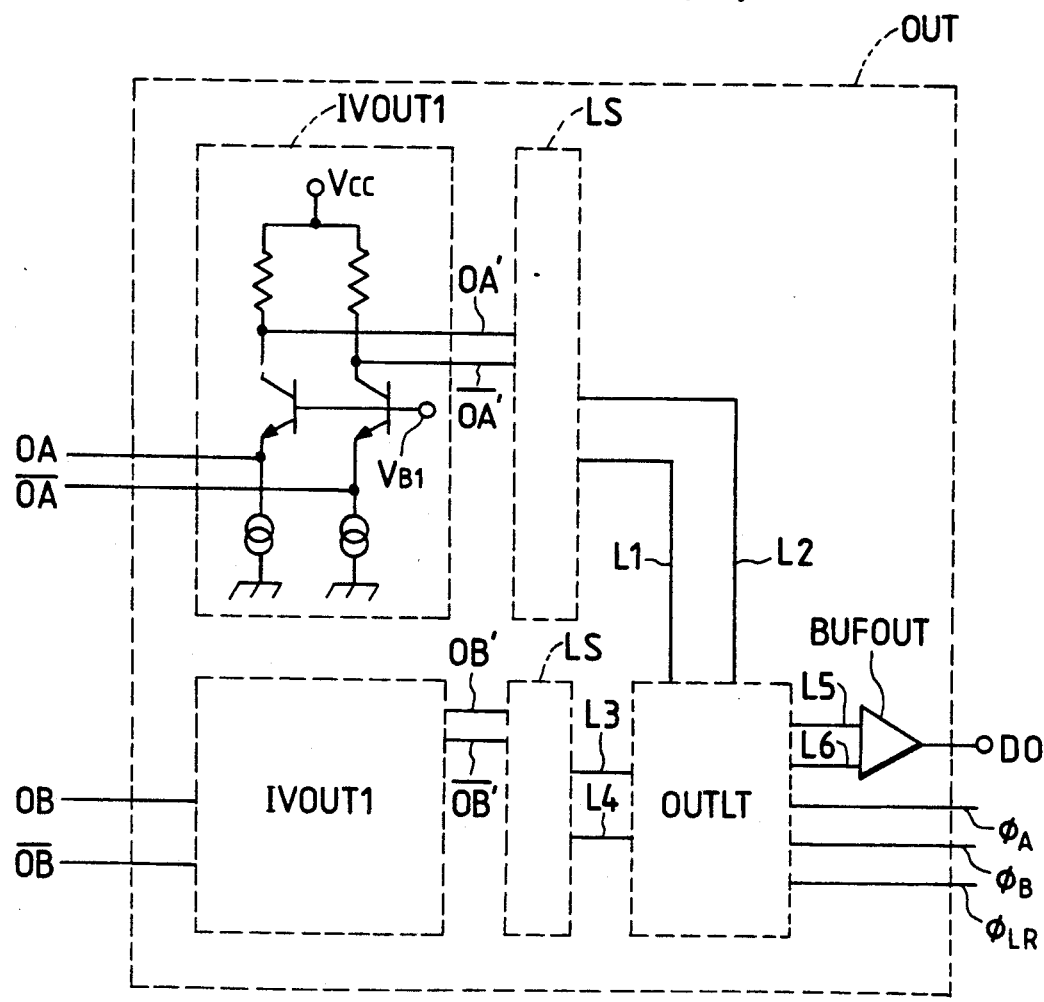

FIG. 14(e) shows one embodiment of the read circuit OUT. This read circuit OUT is composed of a current/voltage converter IVOUT1, a level shift circuit LS, a read latch circuit OUTLT and an output buffer BUFOUT. In the current/voltage converter IVOUT1, the data read out as the impedance differences to the read lines OA and $\overline{OA}$ and the read lines OB and $\overline{OB}$ are converted to the differences of the voltages of the lines OA' and $\overline{OA}'$ or read lines OB' and $\overline{OB}'$. In the level shift LS, the voltage of the data read out from the current/voltage converter IVOUT1 is shifted to a level, at which the bipolar transistors in the downstream read latch circuit OUTLT are not saturated, to transmit it to the read latch circuit OUTLT.

Figure 14F:
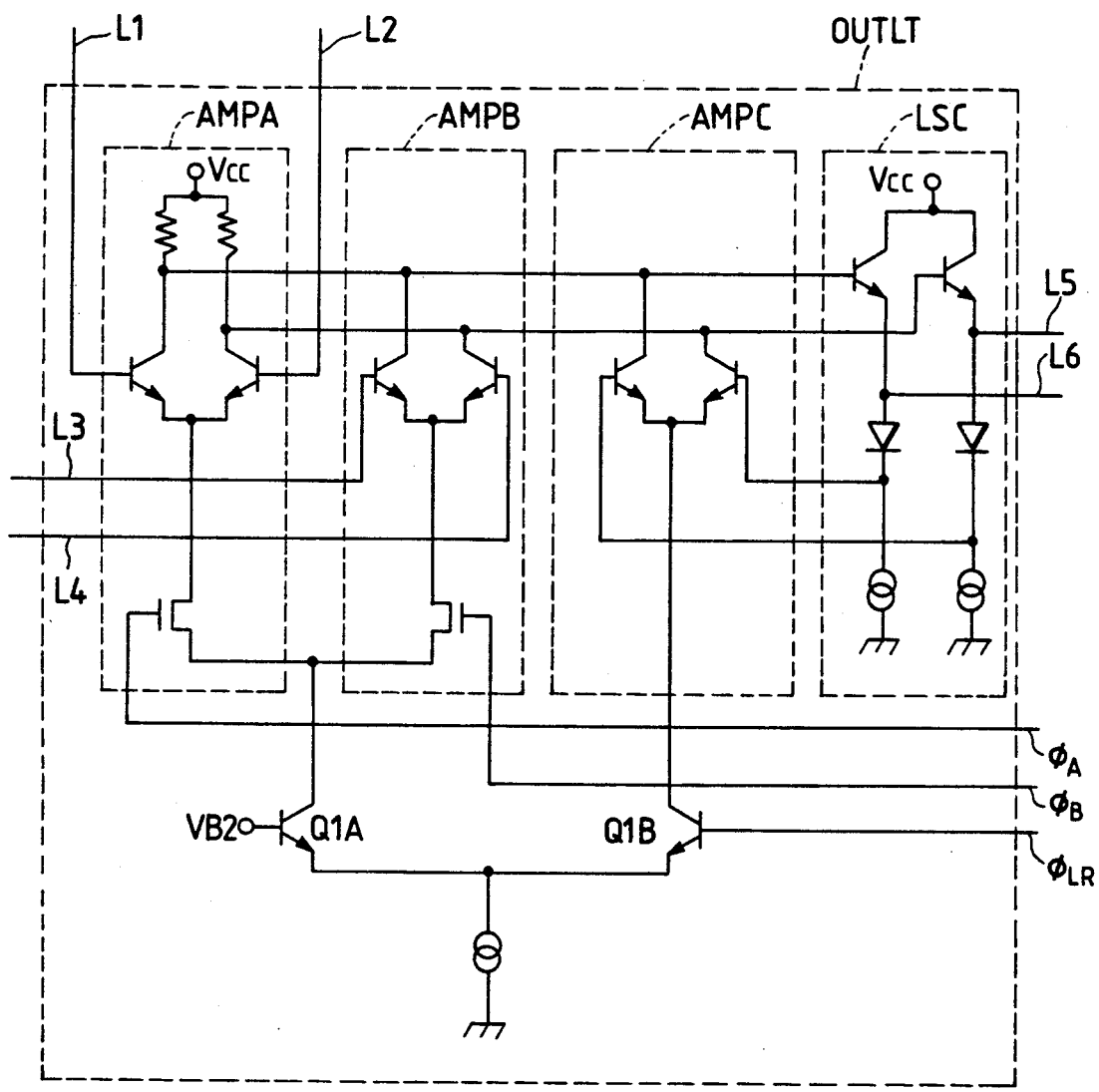
FIG. 14(f) shows one embodiment of the read latch circuit OUTLT which is suitable for the embodiment of the read circuit OUT of FIG. 14(e)

A detailed embodiment of the read latch circuit OUTLT is shown in FIG. 14(f). The read differential amplifiers AMPA and AMPB in the read latch circuit OUTLT are used to switch which of the data read out from the memory cells of the array A through the read lines OA and $\overline{OA}$ to lines L1 and L2 and the data read out from the memory cells of the array B through the read lines OB and $\overline{OB}$ to the lines L3 and L4 are to be read out as the read data DO. When a switch signal $\Phi_A$ is at the high potential, the data read out from the memory cells of the array A are outputted as the read data DO. When a switch signal $\Phi_B$ is at the high level, the data read out from the memory cells of the array B are outputted as the read data DO. In the read latch circuit OUTLT, the bipolar transistor Q1A is turned off, but the bipolar transistor Q1B is turned on when the read latch circuit $\Phi_{LR}$ is transited to a higher potential than the voltage $V_{B2}$. As a result, the differential amplifiers AMPA and AMPB are turned off, and the differential amplifier AMPC is turned on. As a result, the read data are latched by the differential amplifier AMPC and the level shift circuit LSC. Specifically, according to the present embodiment, the read data DO can be latched and continuously outputted for a desired time period by transiting the read latch circuit $\Phi_{LR}$ to a higher potential than the voltage $V_{B2}$ after the read data have been fixed.

Figure 15:
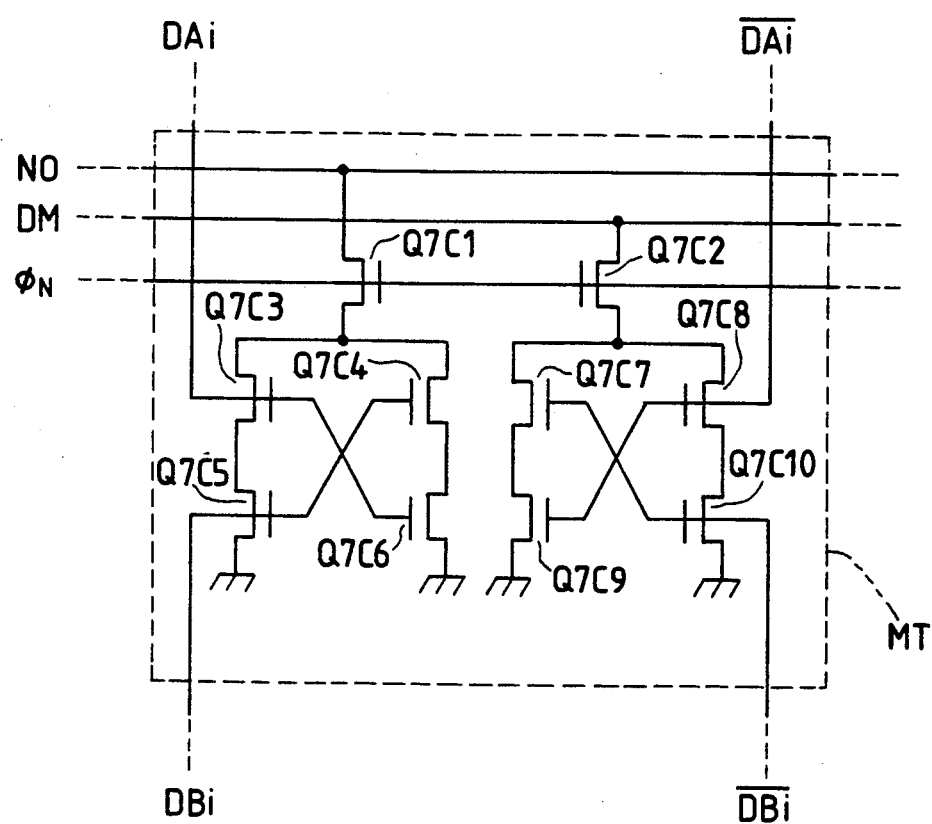
FIG. 15 shows a second embodiment of the multiplier MT in FIG. 11.

Incidentally, in the embodiment of the multiplier MT shown in FIG. 11, the data line pairs of the array A are connected with the gates of the MOS transistors which are farther from the earthed electrode than the data line pairs of the array B. As a result, the neuron output values and the connection weights are not equivalently handled when a product is to be taken. If this raises a problem, an embodiment of FIG. 15 may be used. In FIG. 15, the data line DAi is connected with the gates of MOS transistors Q7C3 and Q7C6, and the data line pair DBi is connected with the gates of MOS transistors Q7C5 and Q7C4. Since the two data lines are connected with the MOS transistors closer to the earthed electrode and the MOS transistors farther from the same, the neuron output values and the connection weights are equivalently handled. As has been described hereinbefore, according to the embodiment shown in FIG. 11, the embodiment shown in FIG. 8(a) can be realized by using the DRAM cell which is composed of one MOS transistor and one capacitor. The DRAM cell can have its occupied area drastically reduced to attain a merit that it can be realized in high integration over the chip. In the DRAM cell composed of one transistor and one capacitor, although not touched in the foregoing description, refreshing operations are necessary within a constant time period for compensating the reduction of the stored charges due to the current leakage of the capacitor. In the present invention, too, the refreshing operations can be easily accomplished, if necessary, like the ordinary DRAM no matter which the mode might be the memory mode or the arithmetic mode.

Figure 16A:
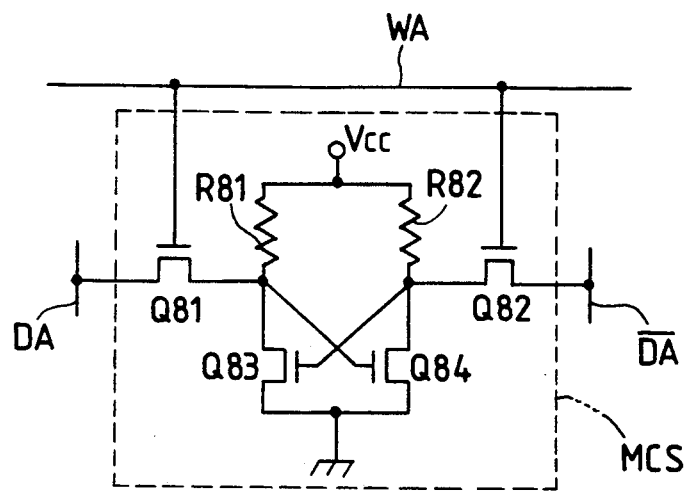
FIGS. 16(a) and 16(b) show examples of the SRAM cell.
Figure 16B:
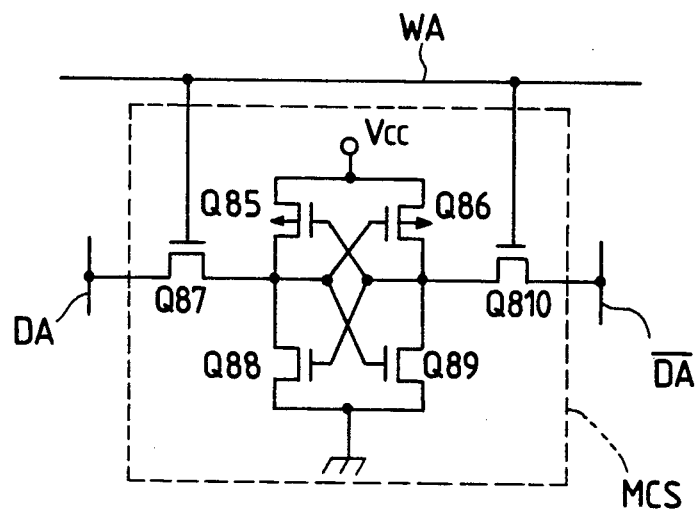
Figure 16C:
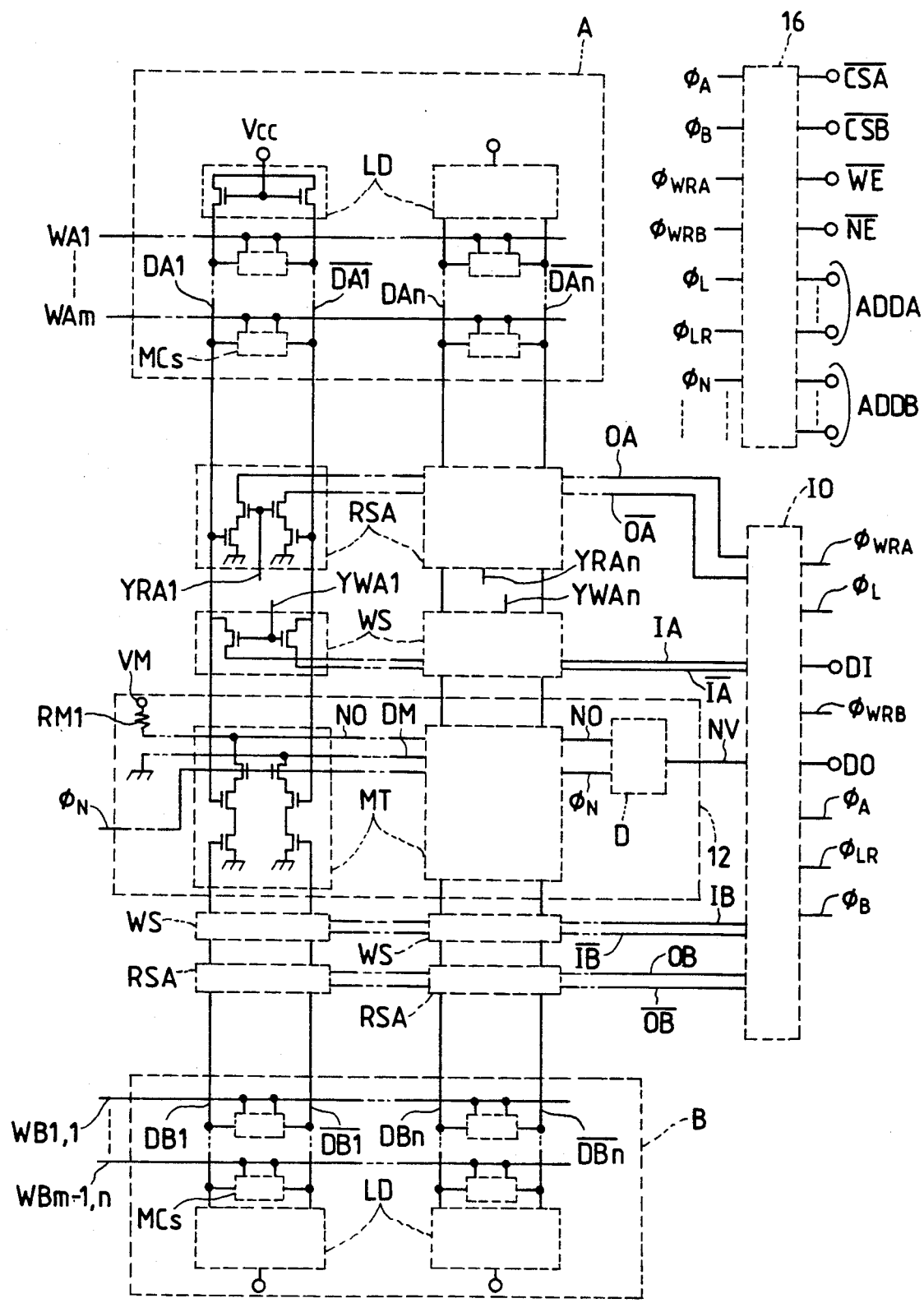
FIG. 16(c) shows one embodiment in case the SRAM cells of FIGS. 16(a) and 16(b) are used as the memory cell of FIG. 8(a)
Figure 17A:
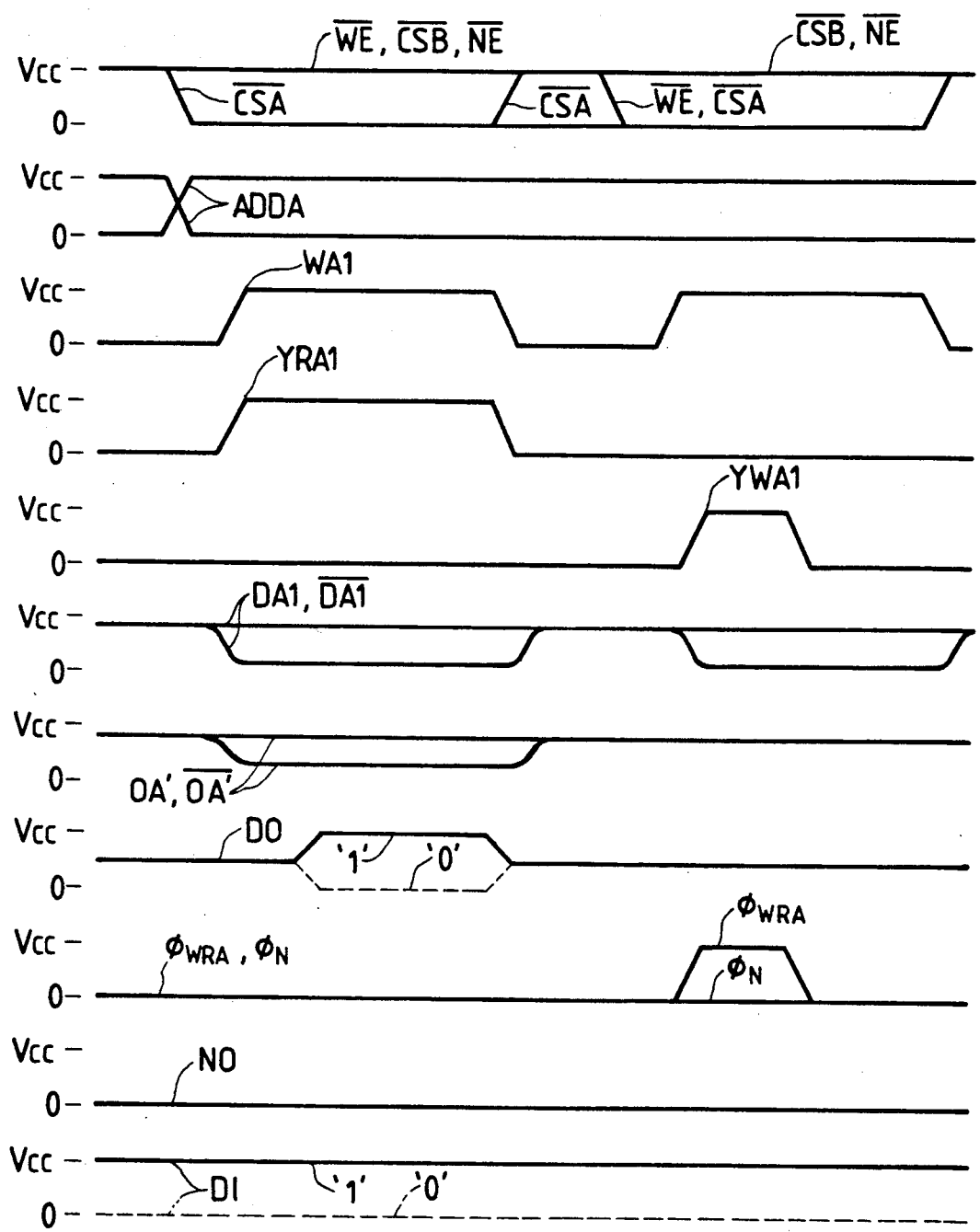
FIG. 17(a) shows one embodiment of the operation waveforms in the memory mode of the embodiment of FIG. 16(c)
Figure 17B:
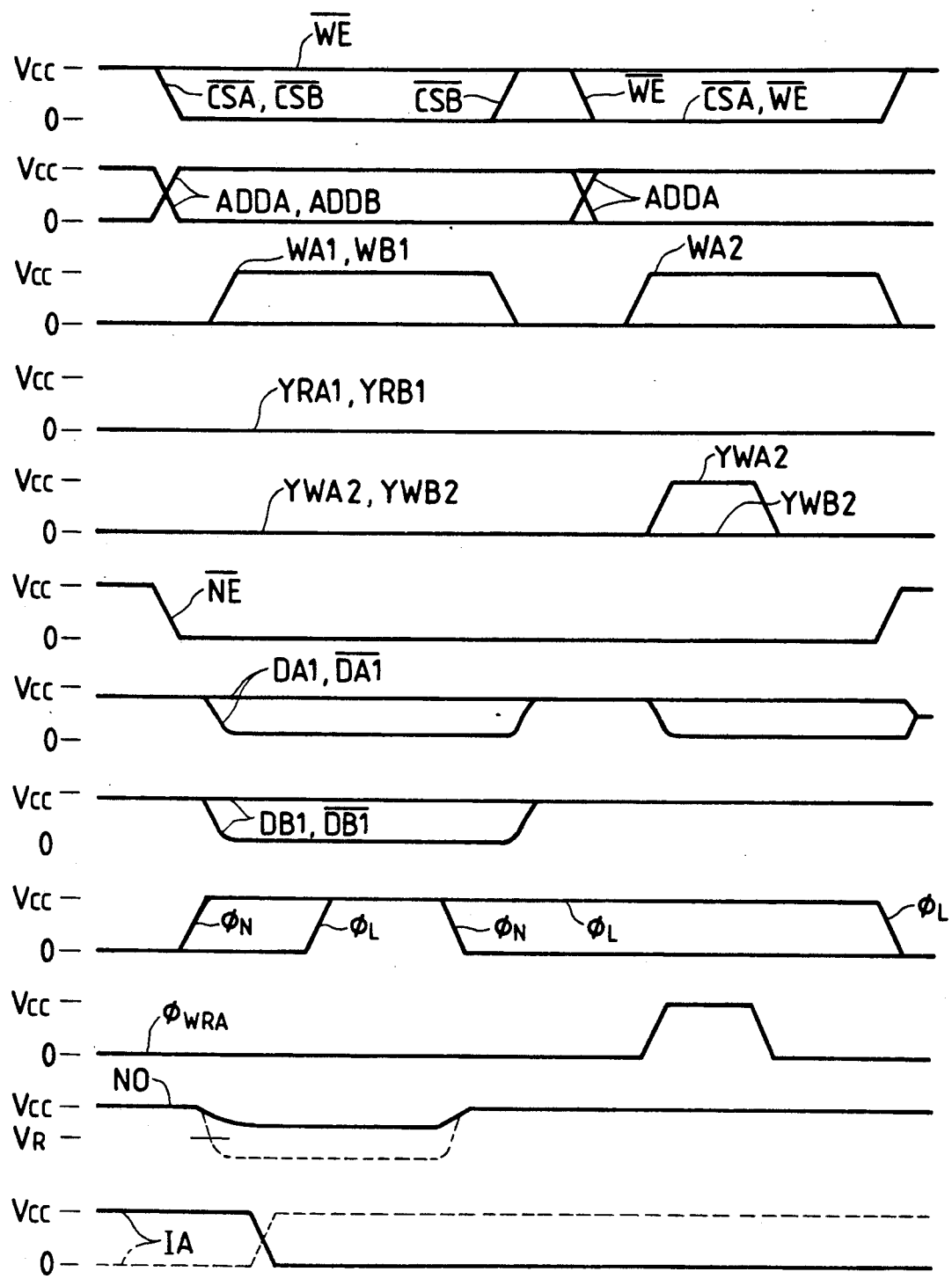
FIG. 17(b) shows one embodiment of the operation waveforms in the arithmetic mode of the embodiment of FIG. 16(c)

In the aforementioned embodiment, the memory cells are exemplified by the DRAM cells but should not be limited thereto, but a similar data processing system can also be realized by using even other memory cells. Next, an embodiment using SRAM cells will be described in the following. FIGS. 16(a) and 16(b) are circuit diagrams showing SRAM cells MCS. In the embodiment of the present invention, the SRAM cells MCS are used as the MC of FIGS. 7(a) and 7(b), FIG. 8(a), FIG. 9(a) and FIG. 10(a). Either of the embodiments of FIGS. 16(a) and 16(b) is advantageous in that the controls are far easier than the case of using the DRAM cells because it requires neither rewriting nor refreshing operation unlike the DRAM cells. FIG. 16(c) shows one embodiment for realizing the embodiment of FIG. 8(a) by using the SRAM cell of FIG. 16(a) or 16(b). In FIG. 16(c), letters MCS designate the SRAM cell, and letters LD designate a data line load. FIGS. 17(a) and 17(b) show examples of the operation waveforms. FIG. 17(a) shows an example of the case, in which cells connected with the data lines DA1 and $\overline{DA1}$ and the word line WA1 are continuously subjected to the reading operations and the writing operations in the memory mode. FIG. 17(b) shows an example of the operation waveforms of the case, in which the neuron output valve $V_{12}$ is to be calculated in the arithmetic mode from both the neuron output values $V_{11}, V_{21}, ---, $ and $V_{n1}$ stored in the memory cells of the word line WA1 and the connection weights $T^1_{11}, T^1_{21}, ---, $ and $T^1_{1n}$ stored in the memory cells of the word line WB1. The basic operations are similar to those of the aforementioned case of the DRAM cells, and their description will be omitted. The SRAM cell has a merit that its control is simpler than the DRAM cell, because it does not need the rewriting operation and the refreshing operation. Because of no necessity for the rewriting operation, moreover, there is another merit that the reading and writing speeds in the memory mode and the cycles in the arithmetic mode can be accelerated.

The description thus far made is directed to the example of the circuit structure, in which the embodiment of FIG. 8 is realized by using the DRAM cells and the SRAM cells. Next, here will be described an example of the circuit structure for expressing the neuron output values and the connection weights by using a plurality of memory cells. Although the embodiment to be described uses the DRAM cells, the present invention can be likewise realized even by using the SRAM cells.

Figure 18A:
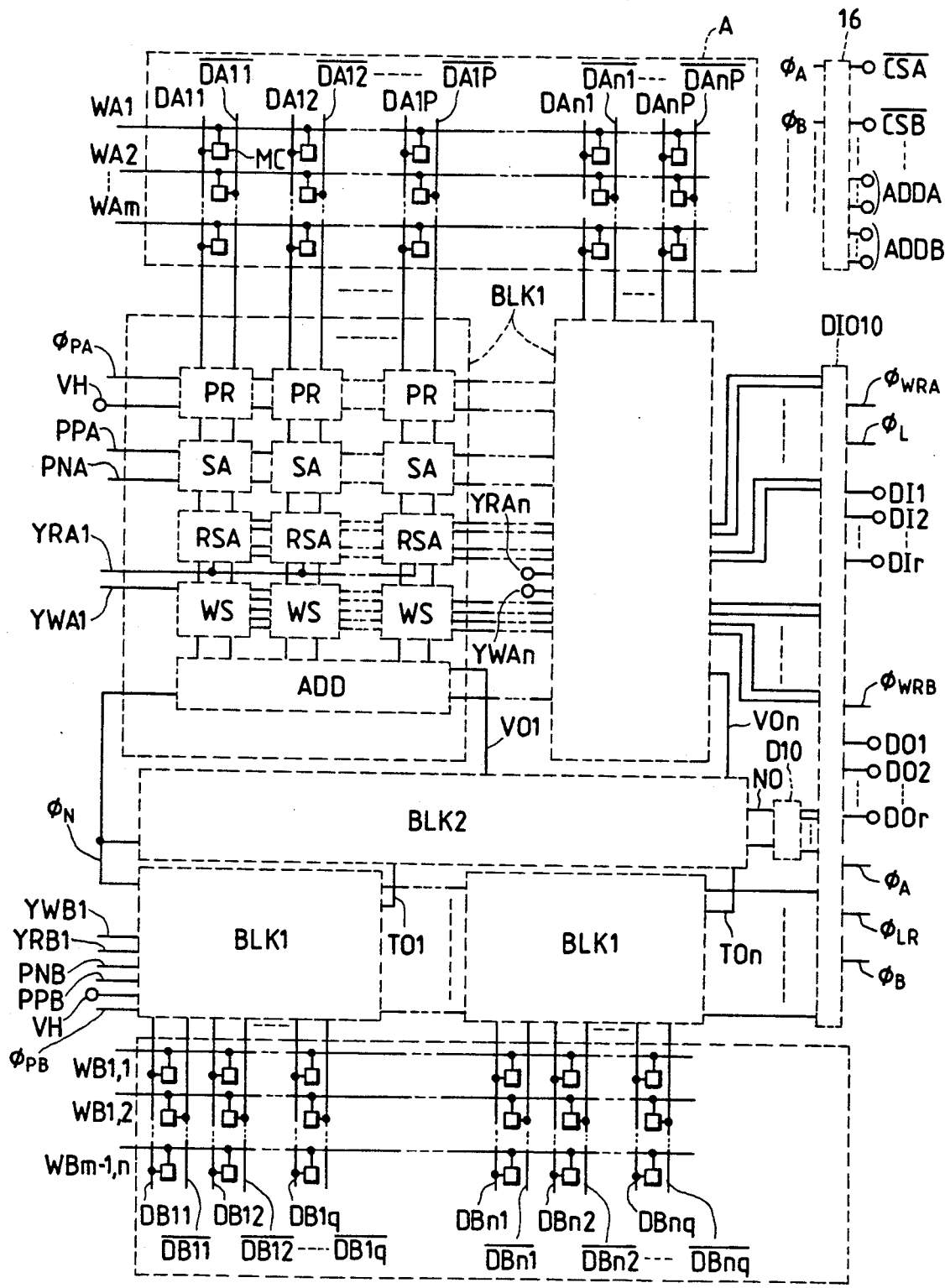
FIG. 18(a) shows one embodiment in case the DRAM cells are used in the embodiment of FIG. 9(a) or the embodiment of FIG. 10(a)

Next, here will be described an example of the circuit structure in which the neuron output values are expressed by using the DRAM cells and in which the connection weights are expressed by using a plurality of memory cells. In FIG. 18(a), the data line pairs DA11 and $\overline{DA11}$, DA12 and $\overline{DA12}$, ---, and DA1P and $\overline{DA1P}$ in the array A correspond to the data line pairs in the array A, which are to be inputted to the adder a1 in FIG. 9(a). On the other hand, the data line pairs DAn1 and $\overline{DAn1}$, and DAn2 and $\overline{DAn2}$, ---, and DAnP and $\overline{DAnP}$ in the array A correspond to the data line pairs in the array A, which are to be inputted to the adder an in FIG. 9(a). The array B has similar correspondences. As shown in the input/output circuit DIO10, there are provided an r number of input terminals DO1, ---, and DOr and an r number of output terminals DI1, ---, and DIr (wherein r is the larger number of p and q) so that the data of p bits or q bits indicating the neuron output values or the connection weights may be simultaneously read out or written in the memory mode. In the array A in the arithmetic mode, the data of every p bits read out to the data lines by selecting the word lines are synthesized by the adder ADD to output the neuron output values to the neuron output value output lines VO1, VO2, ---, and VOn. In the array B, on the other hand, the data of q bits read out to the data lines by selecting the word lines are synthesized by the adder ADD to output the connection weights to connection weight output lines TO1, TO2, ---, and TOn. These values are inputted to the BLK2 so that the resultant product sum is inputted to the nonlinear transfer function circuit D10. The output of the nonlinear transfer function circuit D10 corresponding to the neuron output value is transmitted to the input/output circuit DIO10 and latched by the latch signal $\Phi_L$. Subsequently, the address is switches to select the p number of cells to write the determined neuron output value, and the write Y-select signal YWAi is raised to write the latched neuron output values in parallel in the p number of selected cells. By continuing these operations, the neuron output values can be updated like the embodiment of FIG. 11(a). According to the present embodiment, the embodiment of FIG. 9(a) can be realized by equivalently adding the data of the plural memory cells inputted to the adder ADD. By weighing and adding bit by bit the data of the plural memory cells inputted to the adder ADD, moreover, it is possible to realize the embodiment of FIG. 10(a), in which the neuron output values and the connection weights are expressed with binary numbers of plural bits. Since the present embodiment can also be applied to the case in which the neuron output values and the connection weights are expressed with a plurality of bits by another method, a variety of data processings can be accomplished in accordance with the purpose. Since the DRAM cells are used in the present embodiment, a high integration can be achieved. Since, moreover, the data of the plural memory cells are processed in parallel both in the memory mode and in the arithmetic mode, the data processing can be executed at a high speed like the case of expressions with 1 bit, although the neuron output values and the connection weights are expressed by the plural bits. Here, in the BLK1, the signals of plural memory cells are synthesized by the adder, and the result is inputted to the BLK2 acting as the product-/sum circuit. However, a variety of modifications can be made by omitting the addition at the BLK1 such that the data of the plural memory cells indicating the neuron output values or the connection weights are inputted in parallel to the product/sum circuit BLK2 so that they may be subjected to the multiplications and summations.

Figure 18B:
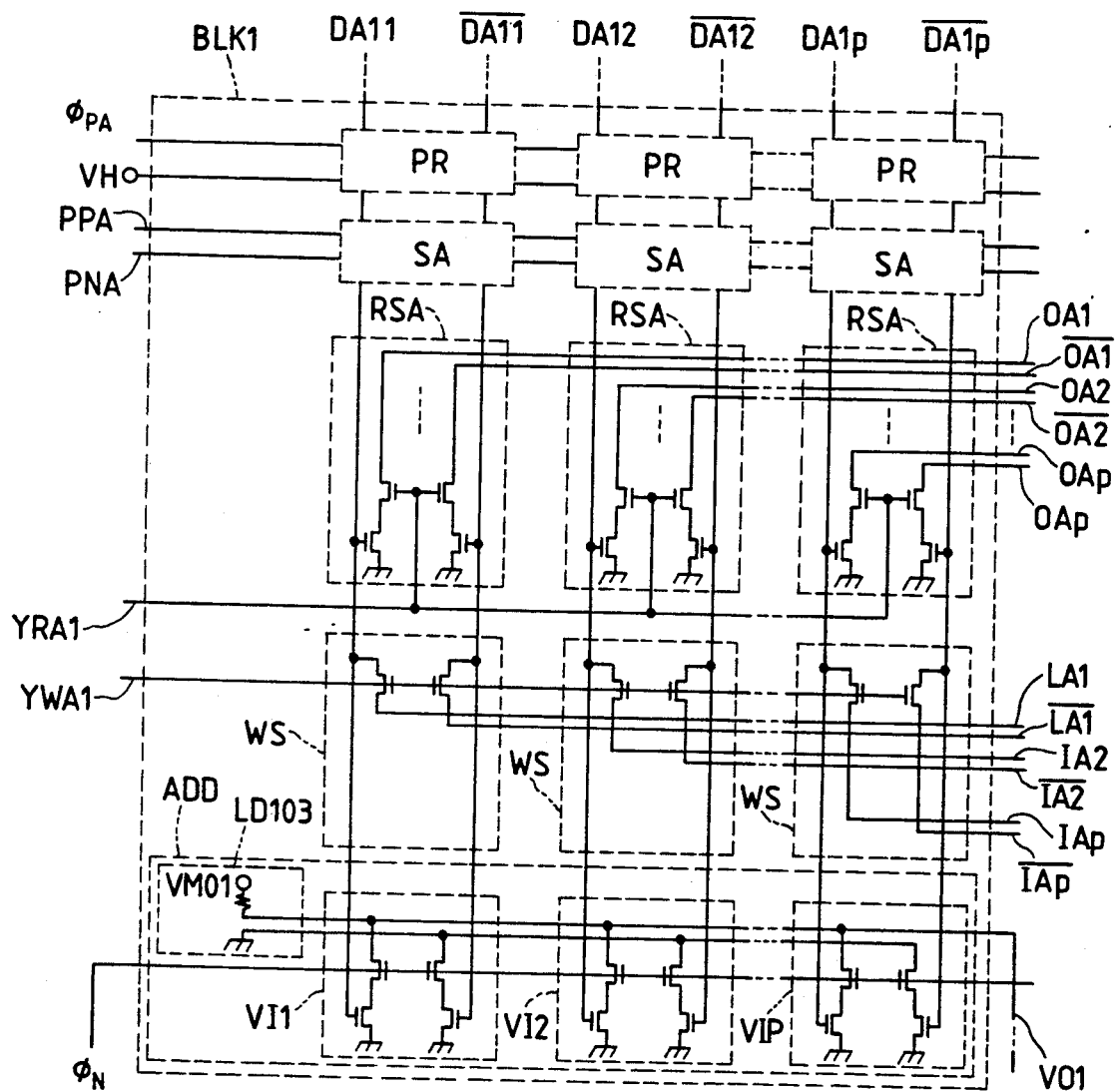
FIG. 18(b) shows one embodiment of the structure of the block BLK1 in the embodiment of FIG. 18(a)

In the following, FIG. 18(b) for realizing the embodiment of FIG. 9, in which the neuron output values and the connection weights are expressed in a plurality of equivalent bits by the embodiment shown in FIG. 18(a), shows one embodiment of the BLK1 of FIG. 18(a). Here is shown the BLK1 which is connected with the data lines DA11, - - -, and DA1P of the array A. The same circuit can also be used in another BLK1 of the array A. The circuit of the present embodiment can also be used in the array B, if the number of the data line pairs, the read line pairs or the write line pairs is changed from p to q and if a q number of circuits each having a p number of precharge circuits PR are provided. In the present embodiment, there are provided p pairs of read line pairs OA1 and $\overline{OA1}$, - - -, and OAp and $\overline{OAp}$ and p pairs of write line pairs IA1 and $\overline{IA1}$, - - -, and IAp and $\overline{IAp}$ so that the p number of memory cells may be subjected to the writing or reading operations in parallel. The read sense amplifier RSA and the write switch WS are consecutively connected in the same BLK1, as shown, with the read line pairs OA1 and $\overline{OA1}$, - - -, and OAp and $\overline{OAp}$ and the p pairs of write line pairs IA1 and $\overline{IA1}$, - - -, and IAp and $\overline{IAp}$. For one pair of read or write lines, specifically, every p pairs are connected with the data line pair. The adder ADD is composed of a load circuit LD103 and a p number of voltage/current converters VI. In the voltage/current converter VI, the data lines DA11, DA12, - - -, and DA1p are connected with the gates of the MOS transistors, which in turn are connected in series with the MOS transistors having their gates fed with the arithmetic circuit starting signal $\Phi_N$, to connect the earthed electrode and the neuron output value output line VO1. This neuron output value output line VO1 is connected through a resistor in the load circuit with the power source VM01. As a result, if the amplification of the data line potential is ended in the state started by the arithmetic circuit starting signal $\Phi_N$, the potential of the neuron output value output line VO1 is dropped by a voltage proportional to the number of data lines which are raised to the high potential, i.e., Vcc. According to the present embodiment, therefore, the neuron output values can be expressed in terms of the potential drop of the neuron output value output line VO1. Incidentally, the provision of similar circuits at one side of the data lines DA11, - - -, and DA1p is to avoid the unbalance of the data line capacities for the same reasoning as that of the multiplier MT of FIG. 11(a). According to the embodiment thus far described, the neuron output values or the connection weights expressed by the plural memory cells can be read out to the neuron output value output line or the connection weight output line.

Figure 18C:
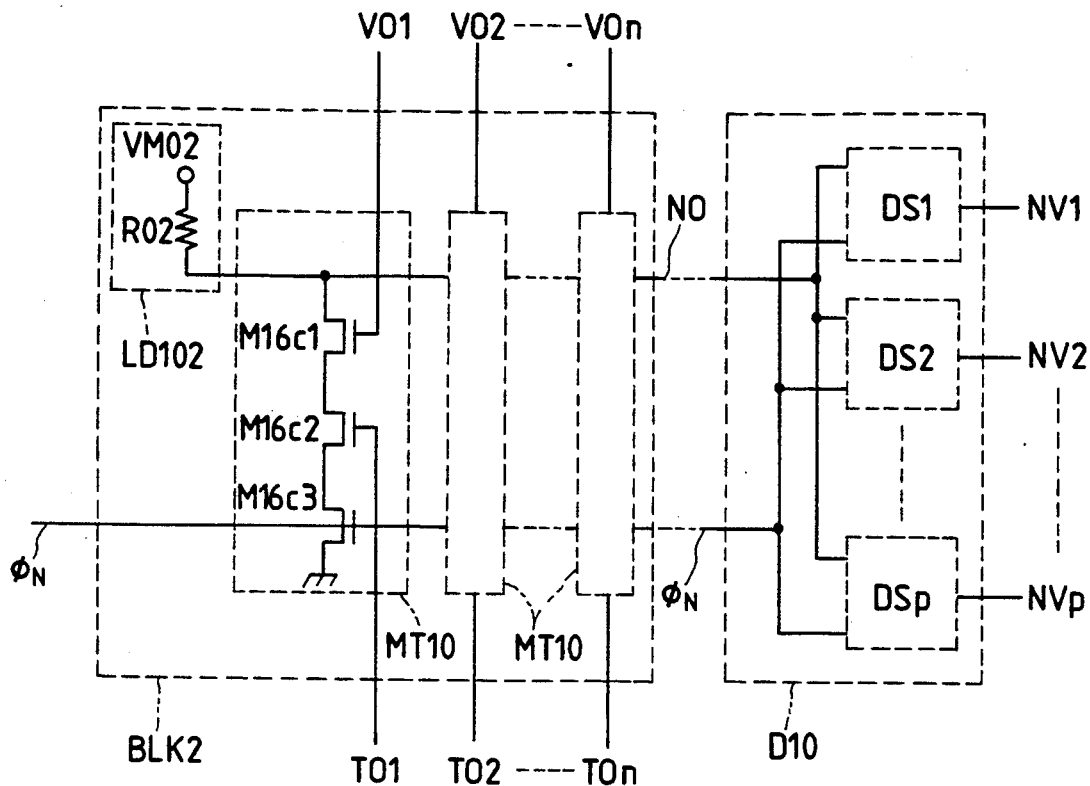
FIG. 18(c) shows one embodiment of the structure of the block BLK2 and the nonlinear transfer function circuit D in the embodiment of FIG. 18(a)
Figure 18D:
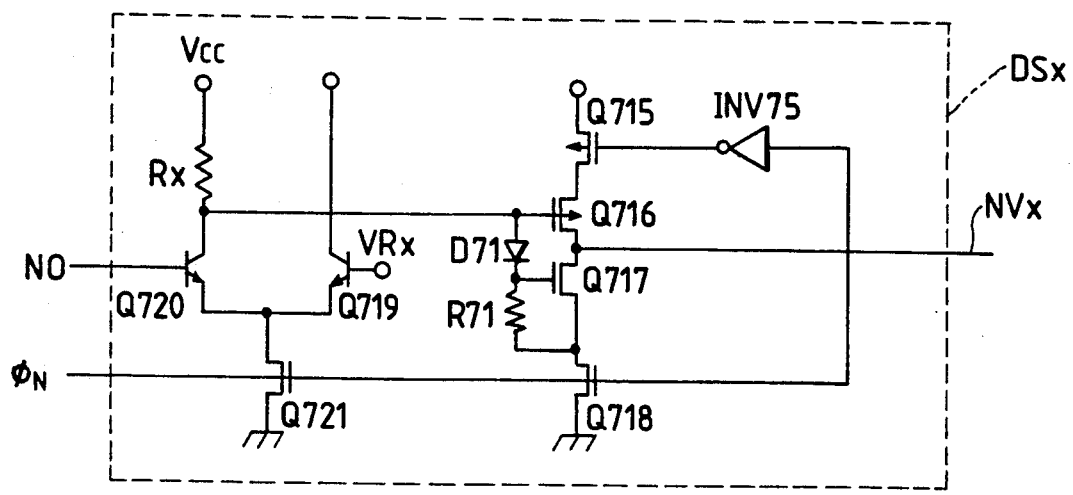
FIG. 18(d) shows one embodiment of the structure of the individual nonlinear transfer function circuits DSx (x=1, 2, - - -, and p) composing the nonlinear transfer function circuit D10 in the embodiment of FIG. 18(c)
Figure 18E:
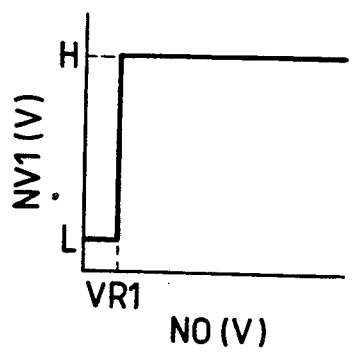
FIG. 18(e) shows one embodiment of the characteristics of the individual nonlinear transfer function circuit DSx (x=1, 2, - - -, and p) composing the nonlinear transfer function circuit D10 in the embodiment of FIG. 18(c)
Figure 18E:
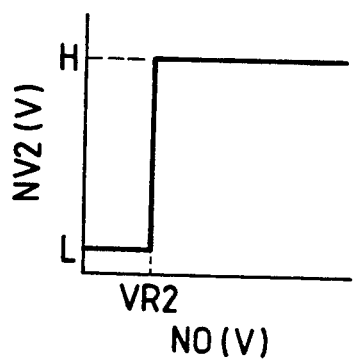
Figure 18E:
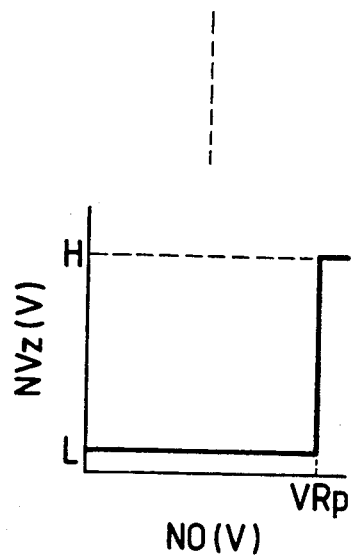

FIG. 18(c) shows one embodiment of the block BLK2 for calculating the product sum of the neuron output values and the connection weights and the nonlinear transfer function circuit D10. In FIG. 18(c), the block BLK2 is composed of the load circuit LD102 and the multiplier MT10. The neuron output value output lines VO1, VO2, - - -, and VOn and the connection weight output lines TO1, TO2, - - -, and TOn are connected with the gates of the MOS transistors M16c1 and M16c2 of the MT10, and the MOS transistors are connected in parallel with the MOS transistor M16c3, which has its gate fed with the arithmetic circuit starting signal $\Phi_N$, to connect the earthed electrode and the product/sum output line NO. On the other hand, the product/sum output line NO is connected through the resistor RO2 in the load circuit LD102 with the power source VM02. In the state in which the arithmetic circuit starting signal $\Phi_N$ is at the high level so that the present circuit is started, the potential of the product/sum output line NO is dropped the more for the larger sum of the products of the potentials of the corresponding neuron output value output lines VO1, VO2, - - -, and VOn and the connection weight output lines TO1, TO2, - - -, and TOn. As has been described hereinbefore, the potentials of the neuron output value output lines VO1, VO2, - - -, and VOn and the connection weight output lines TO1, TO2 and TOn are dropped substantially in proportion to the magnitudes of the neuron output values and the connection weights so that the potential of the product/sum output line NO becomes the higher for the larger product sum of the neuron output values and the connection weights. The product/sum output line NO is inputted to the nonlinear transfer function circuit D10. The nonlinear transfer function circuit D10 can be constructed by connecting an n number of circuits shown in FIG. 18(d) in parallel. The circuit of FIG. 18(d) is made like the nonlinear transfer function circuit D of FIG. 14(a) by combining the differential amplifier and the inverter. Since, however, the polarities of the product/sum output line NO and the product sum of the neuron output values and the connection weights are different between the embodiments of FIG. 11 and FIGS. 18(a), 18(b) and 18(c), the resistor Rx of the differential amplifier of FIG. 18(d) is connected in the position opposed to that of the resistor R72 of FIG. 14(a). In FIG. 18(d), therefore, the output NVx transits to the high potential if the product/sum output line NO exceeds the reference voltage VRx (x=1, 2, - - -, and p). If a p number of such nonlinear transfer function circuits DSx are provided and if the reference voltage VRx is changed, as shown in FIG. 18(e), the change in the product/sum output line NO can be indicated by the number of such ones of the p outputs NVx as take the high potential. According to the present invention, the characteristics of the nonlinear transfer function circuit can be easily varied by varying the value of the reference voltage VRx. Incidentally, in case the circuit shown in FIG. 18(c) is used as the multiplier MT10, the potential variation of the product/sum output line NO is generally kept away from linearity for the magnitudes of the product sum of the neuron output values and the connection weights by the characteristics of the MOS transistors. It is, therefore, advisable to set the value of the reference voltage VRx by considering the characteristics of the multiplier or the adder so that the characteristics of the nonlinear transfer function circuit may take a desired shape. As the case may be, the characteristics of the individual chips may be made difficult to understand accurately because of the fluctuations of the production conditions. In this case, the known neuron output values and connection weights are actually written in the arrays A and B, and the potential of the product/sum output line NO in the arithmetic mode is measured so that the vale of the reference voltage VRx may be resultantly trimmed to the desired characteristics.

Incidentally, here will be omitted the detail of the input/output circuit DIO10 of FIG. 18(a). The circuit of reading or writing a plurality of memory cells in parallel can be easily realized by using a plurality of circuits which are similar to the read circuit OUT or the write circuit WR shown in FIGS. 14(c), 14(e) and 14(f). Moreover, the structure of the clock generator 16 will be omitted but can be easily realized like the circuit used in the ordinary memory.

Figure 19A:
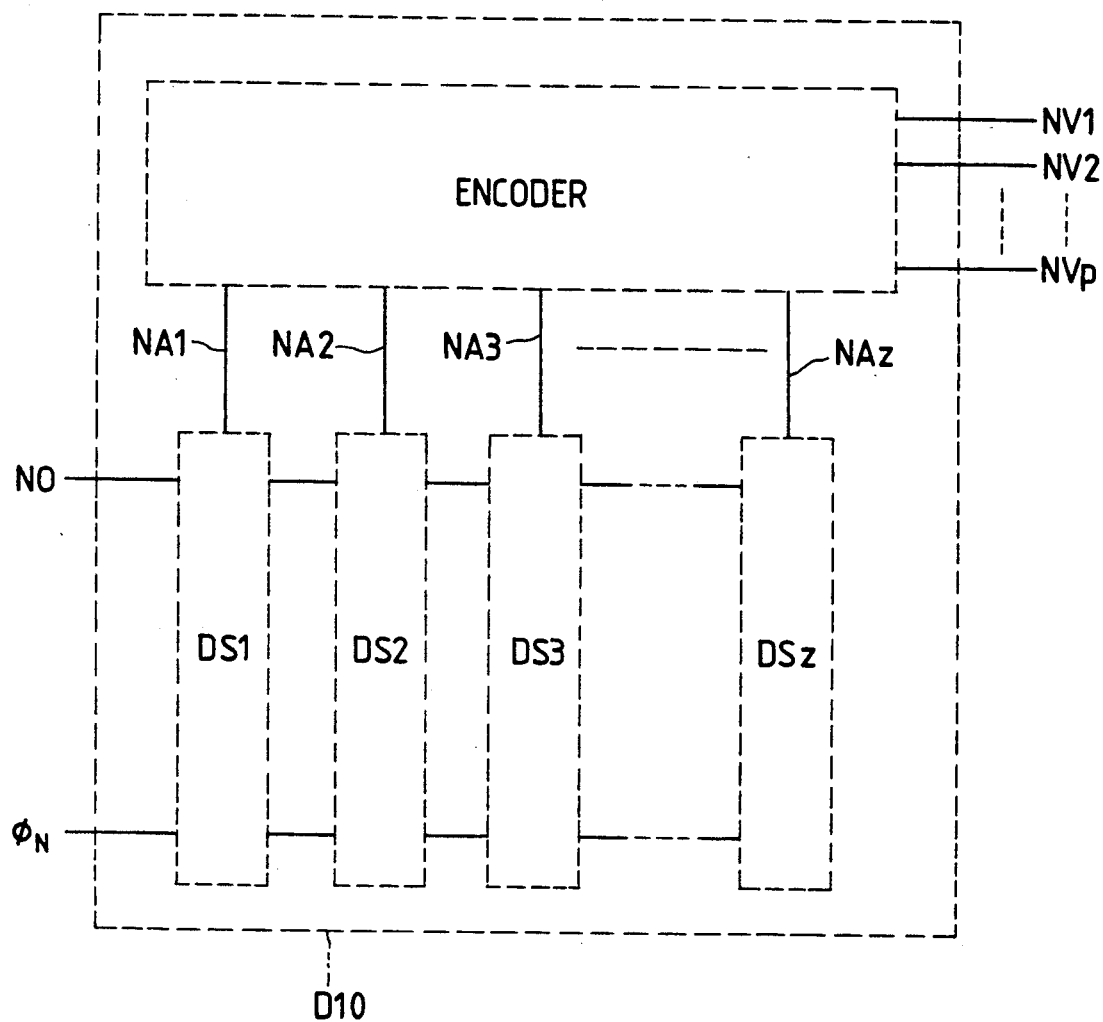
FIG. 19(a) shows one embodiment of the structure of the nonlinear transfer function circuit D10 which is suitable in case the neuron output values and the connection weights are binarily expressed in a plurality of memory cells in the embodiment of FIG. 18(a)
Figure 19B:
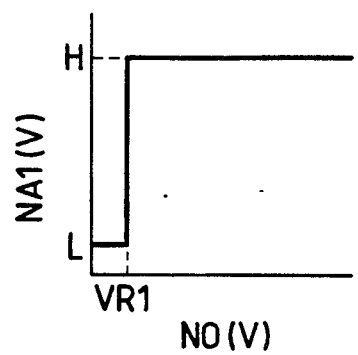
FIG. 19(b) shows one embodiment of the characteristics of the nonlinear transfer function circuit DSx (x=1, 2, - - -, and z) in the embodiment of FIG. 18(a)
Figure 19B:
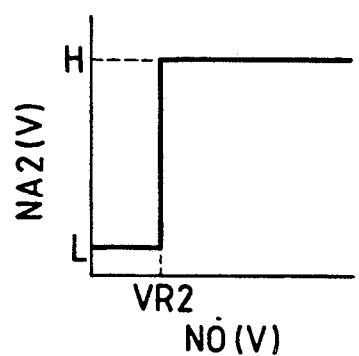
Figure 19B:
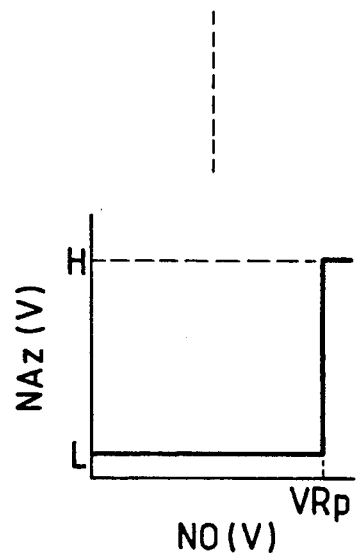
Figures 19C, 19D:
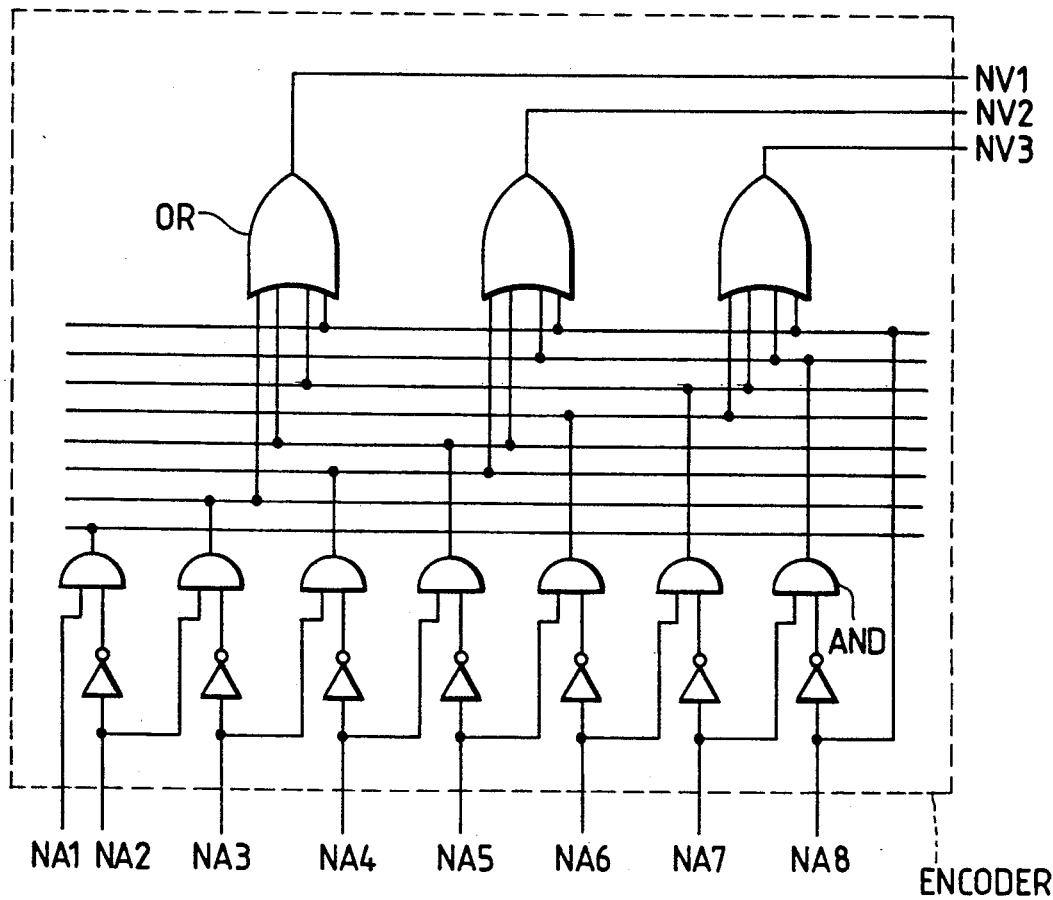
FIG. 19(c) shows one embodiment of the characteristics in the embodiment of FIG. 19(a)
FIG. 19(d) shows one embodiment of the structure of the encoder in the embodiment of FIG. 19(a)

Next, the method for realizing the embodiment of FIG. 10, in which the neuron output values and the connection weights are binarily expressed in plural bits, will be described in connection with the embodiment of FIG. 18(a). In order to add the data expressed binarily with plural bits, as shown in FIG. 10(a), it is necessary to weight and add the data of the plural memory cells bit by bit. For this necessity, the potential of the neuron output value output line VO1 drops in proportion to the magnitude of the binary neuron output values if the ratios of the gate width of the MOS transistors connected with the data lines in the voltage/current converters VI1, VI2, - - -, and VIp in FIG. 18(b) are 1:2:4:, - - -, and $:2^p$. If, therefore, similar circuits are used for other neuron output values or connection weights, the weighing additions can be realized, as shown in FIG. 10(a). The block BLK2 shown in FIG. 18(c) can be used as it is as the multiplier. The nonlinear transfer function circuit has to be given the function of the AD converter for rewriting the arithmetic result outputted to the product/sum output line NO in the plural memory cells in the binary notations. For this necessity, it is possible to use the embodiment shown in FIG. 19(a). In the embodiment of FIG. 19(a), a z ($z=2^p$) number of nonlinear transfer function circuits DS1, DS2, - - -, and DSz and an encoder are combined. These non-linear transfer function circuits DS1, DS2, - - -, and DSz are given the characteristics shown in FIG. 19(b) by adjusting the reference voltage VRx with the circuit of FIG. 18(d). Then, the magnitude of the product sum of the neuron output values and the connection weights can be known like the embodiment of FIG. 18(c) from the number of ones of the outputs NA1, NA2, - - -, and NAz as have the high potential. Then, the equivalent expressions of z bits have to be changed into binary expressions of p bits by the encoder so that they have to be transmitted to the write circuit through the p number of output lines NV1, NV2, - - -, and NVp. It follows that the encoder of FIG. 19(a) may be given the input/output relations shown in FIG. 19(c). This encoder can be realized without difficulty. An example of the structure for p=3 is shown in FIG. 19(d). The present embodiment can be easily extended to the cases other than that for p=3.

Figure 20A:
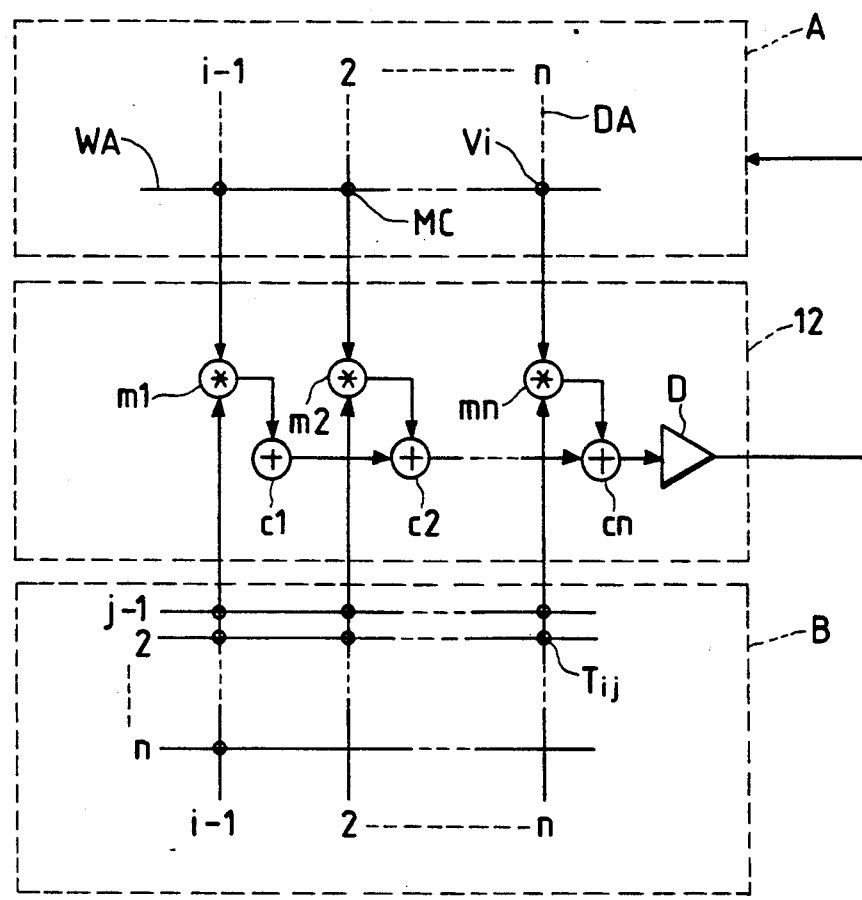
FIG. 20(a) shows one embodiment of the corresponding relations of memory cells to the neuron output values and the connection weights, in case the unsynchronized Hopfield neural network is realized by using the embodiment of FIG. 7(b), that is to say, the embodiment in which the neuron output value and the connection weight are realized with each memory cell.
Figure 20B:
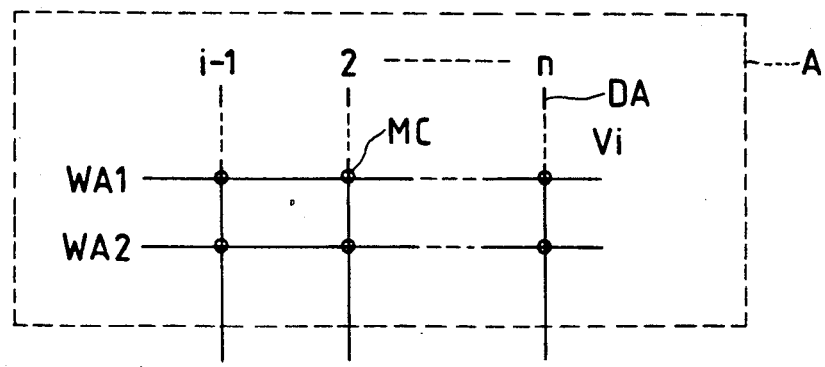
FIG. 20(b) shows one embodiment of the corresponding relations of memory cells to the neuron output values and the connection weights, in case the synchronized Hopfield neural network is realized by using the embodiment of FIG. 7(b), that is to say, the embodiment in which the neuron output value and the connection weight are realized with each memory cell.

The description thus far made is exemplified by the multi-layered neural network. Despite of this exemplification, however, the present invention should not be limited to the multi-layered neural network but can be applied to other types of networks by using the embodiments thus far described. FIGS. 20(a) and 20(b) and FIGS. 21(a) and 21(b) show embodiments for realizing the data processing using the Hopfield network according to the algorithm of FIG. 5(b). FIG. 20(a) shows an embodiment, in which the unsynchronized Hopfield network is realized by using memory cells one by one for expressing the neuron output values and the connection weights. As has been described with reference to FIGS. 2 and 3, the basic arithmetic method is commonly shared between the multi-layered network and the Hopfield network. In the Hopfield network, however, the arithmetics are carried out by using the neuron output values from all the neurons including those of itself. In FIG. 20(a), therefore, all the neuron output values are stored in one word line of the array A. In the array B, as shown, the connection weights necessary for calculating one neuron output value are stored on a common word line. The updating of the neuron output values can be executed in the following manner. In order to update the neuron output value $V_1$, for example, the word line WA of the array A and the word line of j=1 of the array B are raised. As a result, the new neuron output value of $g(T_{11}V_1+T_{12}V_2+ - - - +T_{1n}V_n)$ is calculated. This value may be written in the memory cell which is located in the position of i=1 on the word line WA of the array A. The updatings of the other neuron output values are similar. The value $V_4$, for example, is updated by raising the word line WA of the array A and the word line of j=4 of the array B. As a result, the new value $V_4$ of $g(T_{41}V_1+T_{42}V_2+ - - - +T_{4n}V_n)$ is calculated. This value may be written in the memory cell in the position of i=4 on the word line WA of the array A. Thus, the arithmetics of the unsynchronized Hopfield network can be executed by updating the neuron output values $V_i$ in the desired order. The arithmetics of the synchronized Hopfield network can be easily realized by using the memory cells on the word line WA1 of the array A for storing the neuron output values at present and by using the memory cells on the word line WA2 for storing the new neuron output values, as shown in FIG. 20(b). First of all, the word line WA1 of the array A and the word line of j=1 of the array B are raised. As a result, the new value $V_1$ of $g(T_{11}V_1+T_{12}V_2+ - - - +T_{1n}V_n)$ is calculated. This value may be written in the memory cell in the position of i=1 on the word line WA2 of the array A. Subsequently, the neuron output values $V_2$, $V_3$, - - -, and $V_n$ are updated and written in the memory cells on the word line WA2 of the array A. When the updatings of all the neuron output values are ended, the updating of the neuron output values is continued by interchanging the roles of the word lines WA1 and WA2 of the array A such that the word line WA2 is selected for calculating the neuron output values whereas the word line WA1 is selected for storing the neuron output values. From now on, the processings are likewise proceeded by interchanging the roles of the word lines WA1 and WA2 of the array A. Thus, according to the embodiment of FIG. 20(b), the arithmetics of the synchronized Hopfield network can be executed.

Figure 21A:
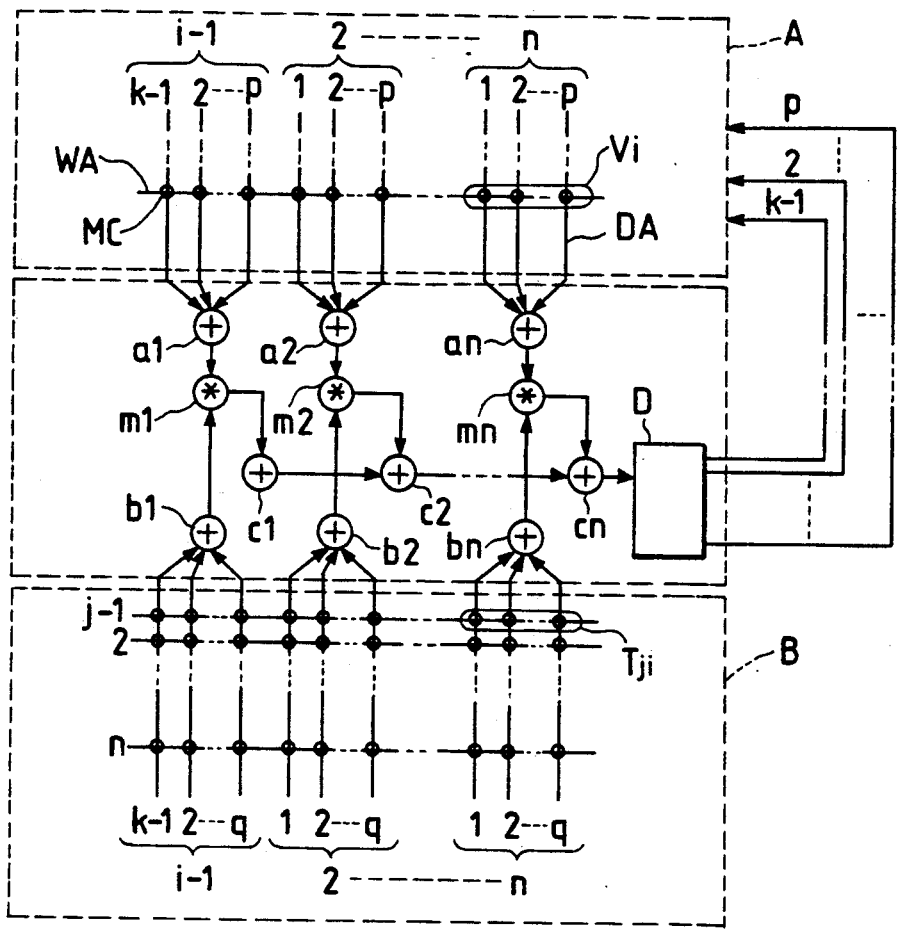
FIG. 21(a) shows one embodiment of the corresponding relations of memory cells to the neuron output values and the connection weights, in case the unsynchronized Hopfield neural network is realized by using the embodiment of FIG. 7(b), that is to say, the embodiment in which the neuron output value and the connection weight are realized with a plurality of memory cells.
Figure 21B:
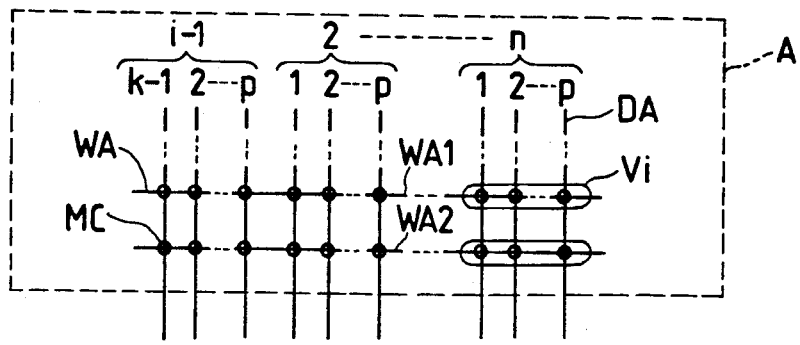
FIG. 21(b) shows one embodiment of the corresponding relations of memory cells to the neuron output values and the connection weights, in case the synchronized Hopfield neural network is realized by using the embodiment of FIG. 7(b), that is to say, the embodiment in which the neuron output value and the connection weight are realized with a plurality of memory cells.

Likewise, the Hopfield network can be realized by using a plurality of memory cells for expressing the neuron output values and the connection weights. FIG. 21(a) shows an embodiment for realizing the unsynchronized Hopfield network by using the p and q numbers of memory cells equivalently for expressing the neuron output values and the connection weights. Like FIG. 20(a), all the neuron output values are stored in one word line of the array A. Here, the p number of cells express one neuron output value. The storage of the array B is made such that the connection weights necessary for calculating one neuron output value are arrayed on a common word line for every q number of cells. The updating of the neuron output values may be executed like the embodiment of FIG. 20(a). Since, however, the p number of memory cells are individually used for expressing the neuron output values, a p number of output lines of the nonlinear transfer function circuit D are provided so that the arithmetic results may be written in parallel in the p number of cells. The synchronized Hopfield network can also be easily realized like FIG. 21(b) if two word lines of the array A are used like FIG. 20(b). Likewise, it is quite natural that the synchronized and unsynchronized Hopfield networks can be realized by binary expressions using p and q numbers of memory cells for expressing the neuron output values and the connection weights, as shown in FIG. 10(a).

FIGS. 8(a) and FIGS. 20(a) and 20(b), and FIG. 9(a) and FIGS. 21(a) and 21(b) present basically identical structures. If, therefore, the embodiments of FIGS. 11 to 19, the data processings according to the embodiments of FIGS. 20(a) and 20(b) and FIGS. 21(a) and 21(b) can be easily realized. Incidentally, in the Hopfield network, the procedure of continuing the updating of the neuron output values falls in the so-called "local minimum", in which the energy is not the minimum but the minimal, so that the neuron output values are not varied any more. In order to avoid this, the well-known "quasi-annealing method" can be used. The method of changing the shape of the nonlinear transfer function gradually is known for realizing the quasi-annealing method, as described on pp. 122 of Neural Network Processing (published by Sangyo Tosho and edited by Hideki Asou). According to the present invention, this method can be easily realized by switching a plurality of nonlinear transfer function circuits D having different characteristics and by controlling the characteristics of the nonlinear transfer function circuits D from the outside.

Figure 22:
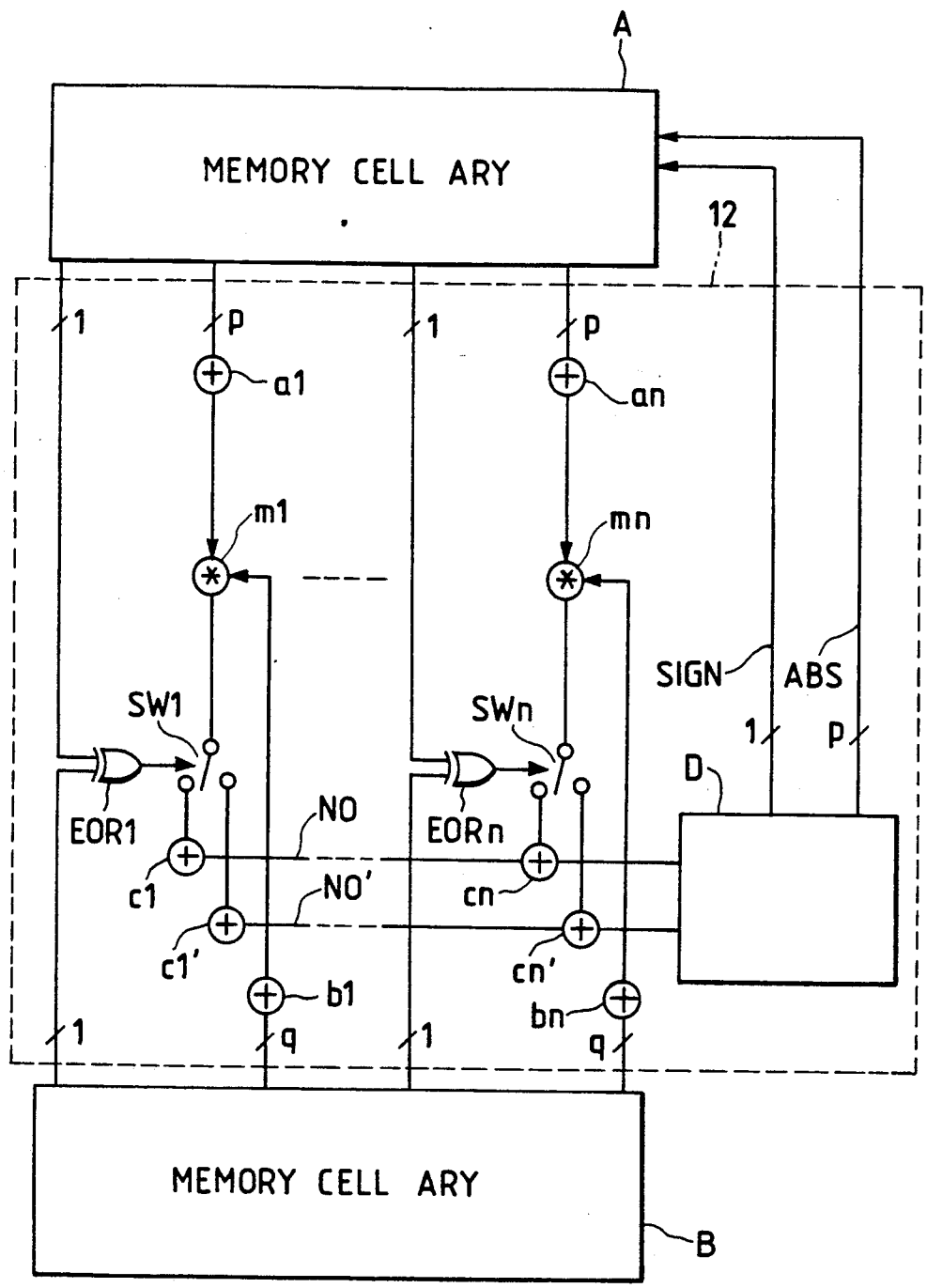
FIG. 22 shows one embodiment in case the neuron output values and the connection weights are enabled to take positive and negative values by using coding bits.

Although there have been described examples in which the neuron output values and the connection weights have been handled as positive numbers mainly in the multi-layered or Hopfield network, it may be convenient depending upon the application that both or one of the two values can take positive and negative values. The present invention can be easily applied to such case. FIG. 22 shows one embodiment of the present invention, in which both the neuron output values and the connection weights are enabled to take positive and negative values. In FIG. 22, the neuron output values are stored in the memory cell array A, and the connection weights are stored in the memory cell array B. The individual values are expressed with p or q bits indicating the absolute magnitudes and with 1 bit indicating the codes. The bits indicating the codes (as will be called the "coding bits") indicate a positive value with "1" and a negative value with "0". Of the neuron output values and connection weights thus read out by the method similar to those described herein before, the portions of the p or q bits indicating the absolute values are inputted to the adders a1, - - - , and an and b1, - - -, and bn so that the resultant analog values are inputted to the multipliers m1, - - - , and mn. Incidentally, when the neuron output values and the connection weights are to be expressed in the binary notation, the data of the individual p and q bits inputted to the aforementioned adders a1, - - - , and an, and b1 - - - , and bn may be weighed and inputted like FIG. 10. On the other hand, the coding bits are inputted, as shown in FIG. 22, to exclusive OR circuits EOR1, - - - , and EORn. In case the coding bits fail to become similar, namely, when the result of multiplications is negative, the outputs of the aforementioned exclusive OR circuits take the high level. In case of the similarity, namely, when the multiplication result is positive, the outputs of the exclusive OR circuits take the low level. Switches SW1, - - - , and SWn operate to transfer the outputs of the multipliers to the adders c1, - - - , and cn, when the outputs of the exclusive OR circuits take the low level, and the same to the multipliers c1', - - - , and cn' when the outputs of the exclusive OR circuits take the high level. As a result, the sum of the positive results of multiplications is outputted to the product/sum output line NO, and the sum of the negative multiplication results is outputted to the product/sum output line NO'. In the nonlinear transfer function circuit D, the difference between the signals of the product/sum output line NO and the product/sum output line NO' is converted into a digital value of p bits and fed to the bus ABS so that the coding bits are determined according to the magnitudes of the signals of the product/sum output line NO and the product/sum output line NO' and outputted to a bus SIGN. Incidentally, it is easily possible according to the method similar to the aforementioned ones to give the nonlinear characteristics, as shown in FIG. 9 or 10, according to the expressions of the neuron output values. According to the present embodiment, both the neuron output values and the connection weights can take the positive and negative values. As a result, the present embodiment is advantageous in that the range for applying the data processing is extended. Although both the neuron output values and the connection weights are enabled to take the positive and negative values, it is easily possible to make modifications such that either of them take the positive values.

The description thus far made has been directed to the embodiment in which the product/sum function necessary for calculating the neuron output values and the nonlinear transfer function circuit are realized as the arithmetic circuit. Despite of this description, however, a circuit for other arithmetics can be added to the arithmetic circuit. For example, the data processing system according to the present invention can be applied to the so-called "classification problem" such as the speech recognition or the letter recognition, in which input patterns are classified into several classes. In this case, the comparator is conveniently disposed in the arithmetic circuit, as has been described hereinbefore. In the classification problem, a desired value corresponding to a certain class can be attained as the output in case the inputted patterns are apparently classified to the class. In the delicate case, however, in which it is questionable to determine which of plural classes the inputted pattern belongs to, the classification may fall at a middle between the desired values of the plural classes. In case the inputted speech is 'K' in the speech recognition, for example, it is coded, and the connection weight is so set that the neuron output value (or the desired value) of 1111 may be obtained in the output layer for the speech waveforms given to the input layer. If the input is 'C', the connection weight is so set that the output value (or the desired value) of 0000 may be issued. If, in this case, a middle speech waveform between the 'K' and the 'C', the neuron output value of the output layer may output a middle value such as 0001 or 1110. In this case, the distance (or similarity) between the neuron output value of the output layer and the desired value of 1111 for the 'K' or the desired value 0000 for the 'C' can be interpreted as measures for giving the similarity to the 'K' or 'C' of the input speech. It is, therefore convenient to give a function to determined the distance between the output result and the desired value by providing the arithmetic circuit with a circuit for comparing the neuron output value of the output layer and the desired value of the class.

Figure 23:
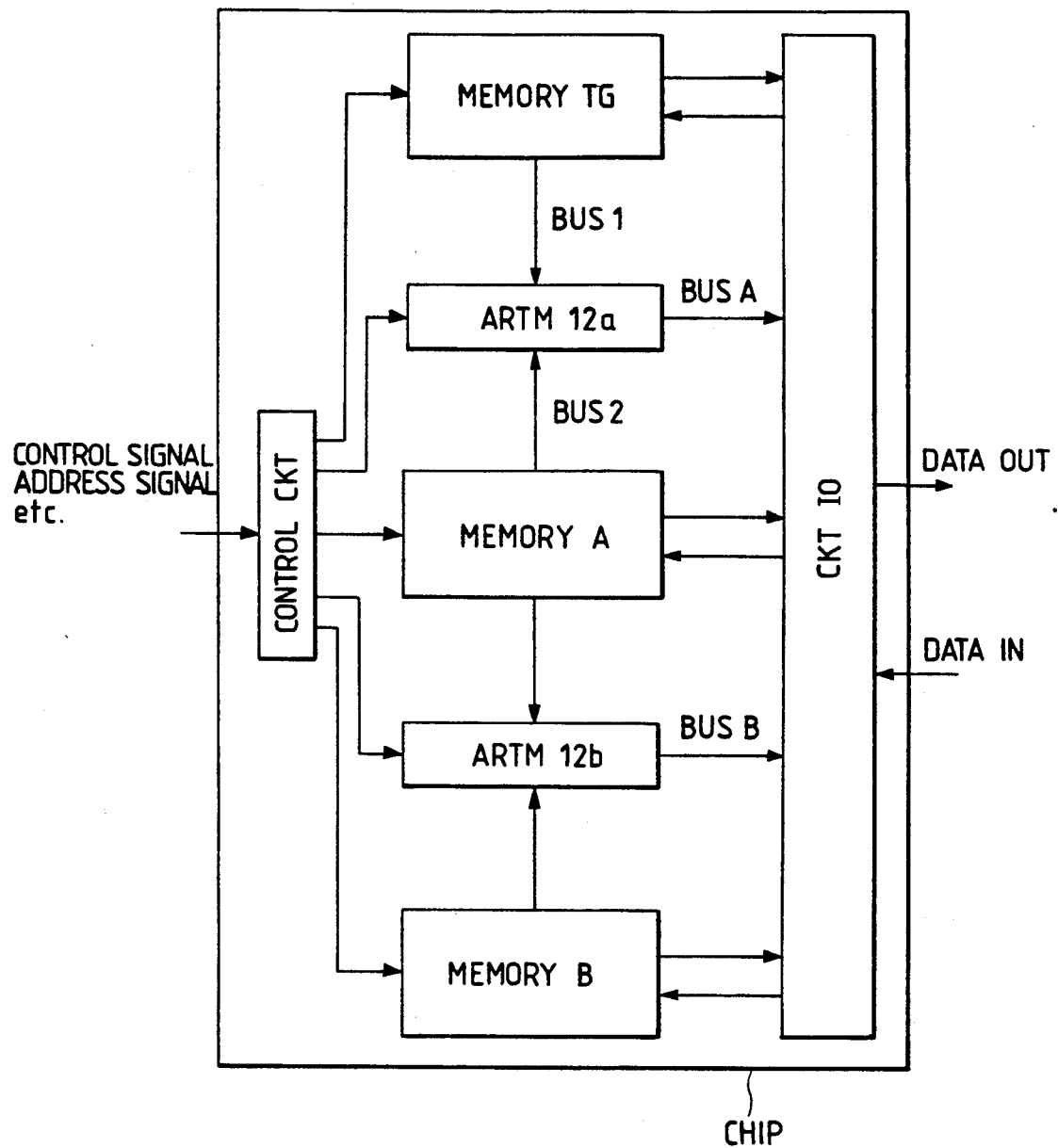
FIG. 23 shows one embodiment in case the system according to the present invention is given a function to compare the neuron output values and the desired values.

FIG. 23 shows one embodiment, in which there are integrated in one semiconductor chip: an arithmetic circuit 12a for comparing the neuron output values and the desired value; and an arithmetic circuit 12b for calculating the neuron output values. In FIG. 23: the desired value is stored in the memory TG; the neuron output values are stored in the memory A; and the connection weights are stored in the memory B. The calculations of the neuron output values may be accomplished by the method similar to those thus far described, by reading out the neuron output values from the memory A and the connection weights from the memory B, by calculating the neuron output values with the arithmetic circuit 12b and by writing the calculated result in the memory A. The comparisons are carried out by reading the neuron output values from the memory A and the desired value from the memory TG, by determining the distances in parallel with the arithmetic circuit 12B, and by writing the result in the memory TG or outputting the same through the input-/output device. Since, in the present embodiment, both the memories TG and A and the arithmetic circuit 12a are formed over the common chip, the numbers of the buses 1 and 2 can be easily increased to process the numerous bits in parallel. This results in an advantage that the distances can be calculated at a high speed. Incidentally, in the structure thus far described, it is convenient to divide the arithmetic mode into the neuron output value calculating mode for calculating the neuron output values and the comparison mode for comparing the neuron output values and the desired value to determine the distance. The switching of the arithmetic mode can be accomplished in response to the two arithmetic circuit control signals NE1 and NE2, for example. Specifically: the memory mode may be selected if both the signals NE1 and NE2 are at the high level; the neuron output value calculating mode may be selected if the signal NE1 is at the low level whereas the signal NE2 is at the high level; and the comparison mode may be selected if the signal NE1 is at the high level whereas the signal NE2 is at the low level. Incidentally, in the embodiment of FIG. 23, the memory is divided into three whereas the arithmetic circuit is divided into two, but these divided circuits may naturally be mixed over the chip. As has been described hereinbefore, according to the present embodiment, it is possible to determine the distances between the neuron output values and the desired value at a high speed. As a result, the data processing speed can be accelerated in case it is necessary, as in the pattern recognition using the multilayered network, to compare the neuron output values and each desired value to determine the distances inbetween.

Figure 24:
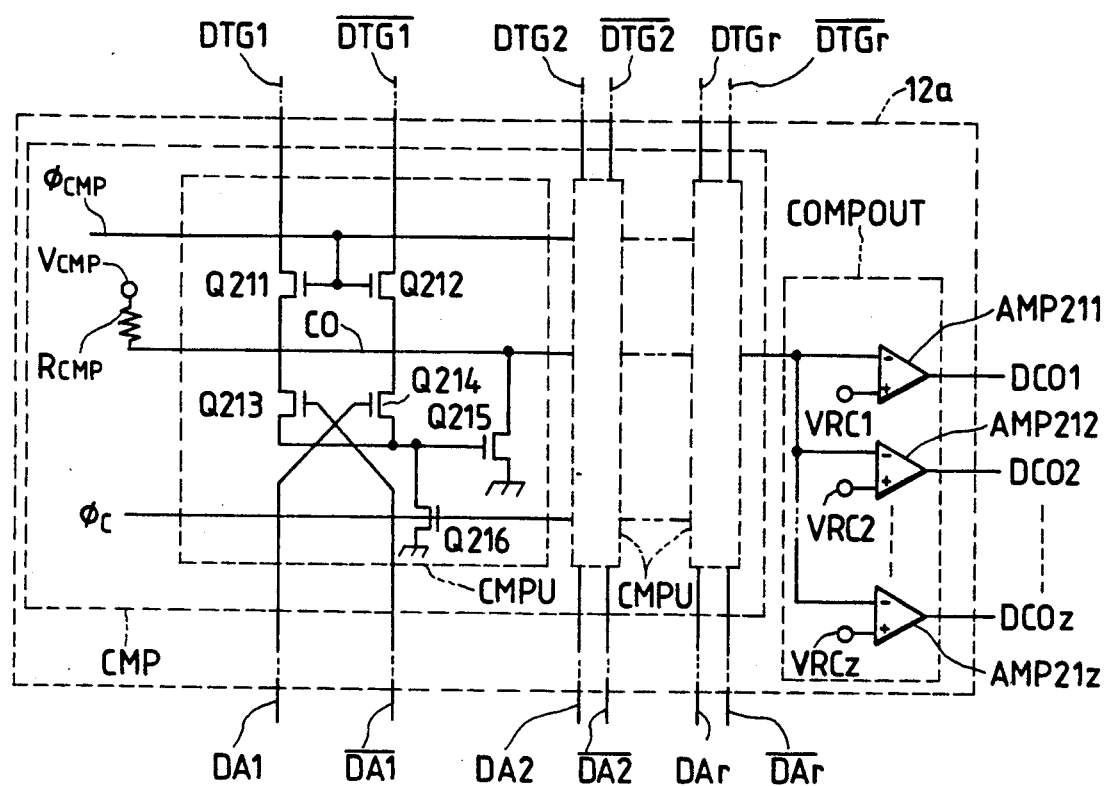
FIG. 24 shows one embodiment of the comparator for comparing the data read out to a plurality of data line pairs of the memory cell array TG and the memory cell array A to calculate the extent of similarity of the data.

FIG. 24 shows one embodiment of the arithmetic circuit 12a of FIG. 23, i.e., a circuit for comparing the neuron output values of the output layer and the desired value to calculate the humming distances inbetween. In the following, it is assumed that the memories TG and A of FIG. 23 are of the type, in which the data of the memory cells are read out to the data line pairs, as in FIG. 11, FIG. 16 or FIG. 18, and that the memories have the arrays TG and A, respectively. The circuit of FIG. 24 is composed of a comparator CMP and a comparison result converter COMPOUT. The comparator CMP is composed of a comparator CMPU and a load resistor $R_{CMP}$ connected in parallel, and the comparison result converter COMPOUT is composed of differential amplifiers AMP211, AMP212, - - -, and AMP21Z. The comparator CMP is connected with the data lines DTG1 and $\overline{DTG1}$, - - -, and DTGr and $\overline{DTGr}$ of the array TG, and the data lines DA1 and $\overline{DA1}$, - - -, and DAr and $\overline{DAr}$ of the array A. Here, letter r designates the number of memory cells on one word line and takes the value of n, if the neuron output values are expressed in 1 bit, and the product of n and p if the neuron output values are expressed in p bits. According to the present embodiment, it is possible to calculate the humming distances between the data read out onto the data lines DTG1 and $\overline{DTG1}$, - - -, and DTGr and $\overline{DTGr}$ of the array TG and the data read out onto the data lines DA1 and $\overline{DA1}$, - - -, and DAr and $\overline{DAr}$ of the array A. The operations of the present embodiment will be described in the following. First of all, a clear signal $\Phi_c$ is raised in advance to turn on a MOS transistor Q216 and to break the gate voltage of a MOS transistor Q215. After the clear signal $\Phi_c$ has been broken so that the signal is read out to the data line to set the data line potential to Vcc or 0 V, the comparator is started by a comparator starting signal $\Phi_{CMP}$. Then, the logic of exclusive OR is taken in each of the groups of the data lines (DTG1, DA1), (DTG2, DA2), - - -, and (DTGr, DAr) connected with the comparator. As a result, the gate of the MOS transistor Q215 is left at the low potential, in case the data are similar on the data lines at the array TG and the data lines at the array A, but otherwise is transited to the high potential. Then, the MOS transistor Q215 is turned on in the comparator CMPU in which the data are not similar between the data lines of the array TG and the data lines of the array A. As a result, the more current will flow from the power source VCMP through the load resistor RCMP to the earthed electrode for the larger number of groups of the data lines (DTG1, DA1), (DTG2, DA2), - - -, and (DTGr, DAr), in which the data are not similar. As a result, the potential of the compare line CO will be the lower for the larger number of groups in which the data are not similar. The compare line CO is connected with the differential amplifiers AMP211, AMP212, - - -, and AMP21Z disposed in the comparison result converter COMOUT. If the reference voltages VRC1, VRC2, - - -, and VRCZ of those differential amplifiers are set to suitable values, the number of those of the comparison result output lines DCO1, DCO2, - - -, and DCOZ, which take the high potential, is the larger for the larger drop of the potential of the compare line CO. In other words, the comparison result converter COMPOUT operates as a kind of AD converter. Thus, according to the embodiment of FIG. 24, the data read out to the plural data lines of the array TG and the data read out to the plural data of the array A can be compared to determine their humming distance. If, therefore, one word is selected from each of the array TG and the array A, the data stored in the memory cells on the selected word lines can be compared with each other. If, therefore, the desired values are individually stored in the memory cells on the array TG, it can be compared with the neuron output values, which are stored in the memory cells on one word line of the array A, to know what desired value the neuron output values are close to and how close they are. In case, therefore, the obtained neuron output values are not similar to the desired value corresponding to the class, it is possible to know at a high speed what class the neuron output values are close to and how close they are.

Incidentally, in the embodiment of FIG. 24, the result outputted to the comparison result output lines may be outputted to the outside of the chip through the input-/output circuit at each time of comparison. Alternatively, the capacity of the memory TG may be made larger than that necessary for storing the desired values so that the results may be once written in the memory TG and then outputted altogether.

Figure 25:
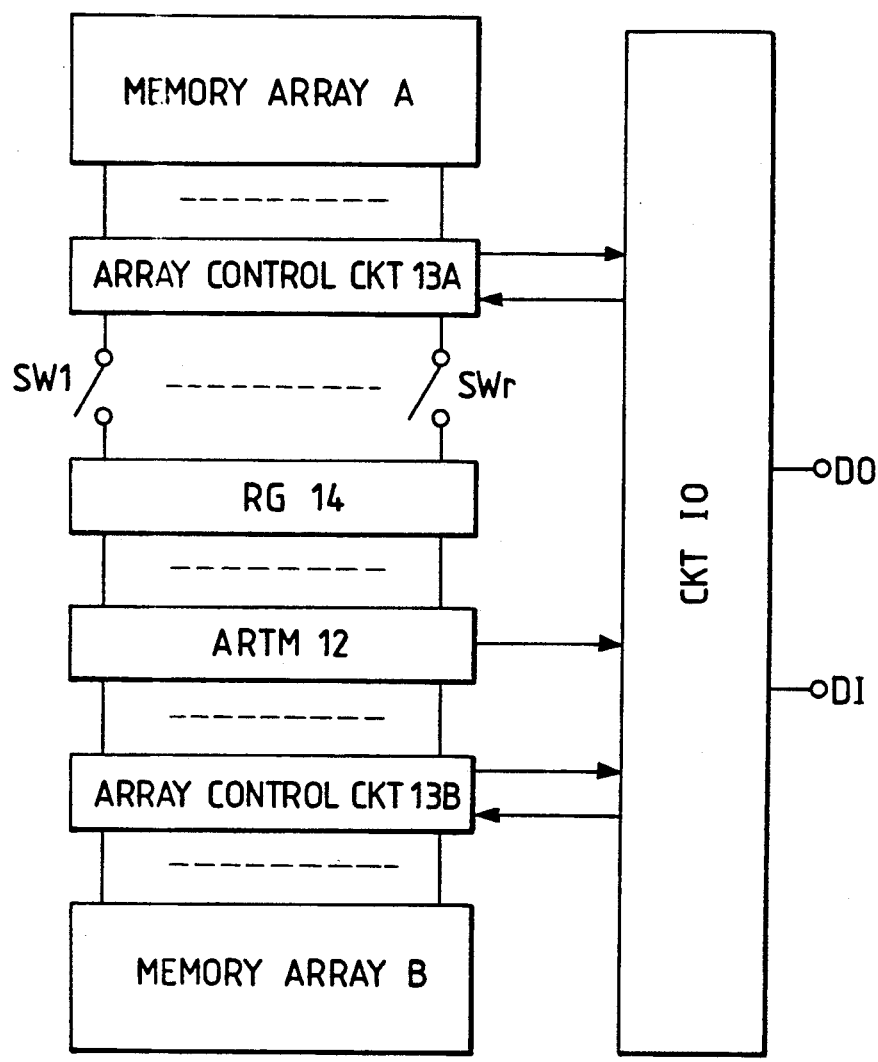
FIG. 25 shows one embodiment in which the updating of the neuron output values is speeded up by providing a register.

Finally, an embodiment for further speeding up the system of the present invention by using a register will be described in the following. As has been described hereinbefore, according to the present invention, the neuron output values are calculated by reading out the necessary data from the memory, by determining the neuron output values with the arithmetic circuit, and by rewriting the determined result in the memory. In other words, one arithmetic mode (i.e., the neuron output value arithmetic mode) cycle is composed of the reading operation and the writing operation, and the arithmetic circuit is inactive in the writing operation. If, therefore, the time period, for which the arithmetic circuit is in active, is shortened, the arithmetic mode can be further speeded up. FIG. 25 shows one embodiment in which the arithmetic mode is speeded up on the basis of the aforementioned point of view. The embodiment of FIG. 25 is made by adding the register and the switches SW1, - - -, and SWr to the embodiment of FIG. 7. According to the embodiment of FIG. 25, the neuron output values can be calculated at a high speed by using the algorithm of FIG. 5. In the following, the description will be made upon the multi-layered network, but similar effects can be attained even in the Hopfield network. In the embodiment of FIG. 25, the output value of the first neuron of the s-th layer is calculated by raising one word line of the memory cell array A to read out the neuron output value of the (s−1) th layer, by closing the switches SW1, - - -, and SWr to write the neuron output values of the (s−1) th layer in the register 14, and by opening the switches SW1, - - -, and SWr. Next, one word line of the memory cell array B is raised to read the connection weight between the neuron of the (s−1) th layer and the first neuron of the s-th layer, and the neuron output values of the (s−1) th layer are read out by the register 14 so that the output value of the first neuron of the s-th layer is calculated by the arithmetic circuit 12. The calculated results are written in the memory cell array A. Simultaneously with this, one word line of the memory cell array B is raised to read out the connection weight between the neurons of the (s−1) th layer and the second neuron of the s-th layer, and the neuron output values of the (s−1) th layer are read out by the register 14 so that the output value of the second neuron of the s-th layer is calculated by the arithmetic circuit 12. From now on, the output values of the neurons of the s-th layer are likewise calculated. Next, the output values of the neurons of the (s+1) th layer are calculated by raising one word line of the memory cell array A to read out the previously determined neuron output value of the s-th layer, and by closing the switches SW1, - - -, and SWr to write the neuron output values of the s-th layer in the register 14, and the subsequent calculations are proceeded like before. As has been described hereinbefore, according to the present embodiment, the writing operation and the reading operation can be simultaneously carried by providing the register 14 so that they can be accomplished at a high speed.

The description thus far made is directed mainly to the method of calculating the neuron output values according to the present invention, and the necessary connection weights are assumed to be already given. Depending upon the subject, the necessary connection weights are easily given at the start or have to be determined by the so-called "learning". In the learning for the multi-layered network called the "back propagation", for example, several neuron output values (or test patterns) of the input layer can be prepared in advance to determine the connection weights so that the desired neuron output values may be obtained in the output layer for the test patterns. As described in Section 2 of Neural Network Data Processing (published by Sangyo Tosho and edited by Hideki Asou), moreover, there is known the learning algorithm for setting the connection weights such that the balanced state of the neuron output values can take the desired state even in the Hopfield network. This learning can be applied to the present invention by the following three methods. According to the first method, the learning is carried out by using an external computer, and the obtained connection weights are written in the data processing system according to the present invention. This method is advantageous in that the learning can be executed by the software so that the learning algorithm can be easily changed, but is difficult to speed up the learning. According to the second method, the arithmetic circuit of the system according to the present invention is given an arithmetic function for the learning so that the learning is executed on-chip. This method speeds up the learning but may be difficult to integrate all the circuits necessary for the learning over a common chip. The third method is an intermediate one between the first and second methods, and a portion of the arithmetics necessary for the learning is executed by the system of the present invention whereas the remaining portion of the arithmetics necessary for the learning is executed by the external computer. This method is advantageous in that it can accelerate the learning speed more than the first method and that the arithmetic circuit of the system of the present invention can be simply constructed. This third method will be specifically described in the following. Incidentally, the learning method is exemplified by the back propagation method in the multi-layered network. In the back propagation method (as will be shortly referred to as the "BP" method), the connection weights are updated according to the following formulas:

$$T^s{}_{ij} = T^s{}_{ij} + \epsilon d_{js} V_{is-1} \qquad (1);$$

$$d_{jm} = (t_j - V_{jm}) g'(U_{jm}) \qquad (2);$$

and $$d_{js} = g'(U_{js}) \Sigma_i (T^{s+1}{}_{ij} d_{is+1}) \qquad (3)$$

$(s = m-1, - - -, \text{and } 2)$, wherein:
$\epsilon$: a small positive number;
$t_j$: a target of the neuron output value $V_{jm}$ of the final layer;
$g'$: a derivative of the nonlinear transfer function g; and
$U_{js}$: a quantity before passage through the nonlinear transfer function circuit g in the j-th neuron of the s-th layer, as will be defined by the following formula:

$$U_{js} = \Sigma_i (T^{s-1}{}_{ji} V_{is-1} + \theta_{js}) \qquad (4).$$

The connection weights may be updated by determining the quantities to be updated from the above-specified formulas (1) to (4) for every input data for the learning and by using the sum of the updated quantities of all the input data for the learning. On the other hand, the updating may be carried out by adding the following term called the "inertia term" to the formula (1):

$$\mu \Delta T^s_{ij}' \quad (5),$$

wherein:

μ: a small positive constant; and $\Delta T^s_{ij}$: a corrected quantity of the previous updating. The updating is continued till the difference between the neuron output values of the last layer and the target values becomes sufficiently small.

The learning thus far described can be executed by the embodiment shown in FIG. 23 and the external computer, as will be described in the following. The description to be made is directed to the case in which the updating is executed by summing the updated values of all the input data, but similar operations are applied to the case in which the connection weights are updated for every input data. Incidentally, the description to be made is directed to the case of the three-layered network, but similar operations are applied to the case of a net work having three or more layers.

First of all, the input data for all the learnings and their target values are written in the memories A and TG, respectively. Next, the a random number having a small absolute value is written as the initial value of the connection weights in the memory B. Moreover, the first input data are read out as the neuron output values of the first layer to the arithmetic circuit 12b, and the connection weights between the first and second layers are read out to the arithmetic circuit 12b by the memory B. These values are multiplied in parallel by the aforementioned method so that the neuron output values of the second layer are calculated and written in the memory A. Subsequently, the neuron output values of the third layer are calculated and written in the memory A. The calculations thus far described are executed for all the leaning input data to read out the neuron output values of the individual layers for the individual input data, the desired values for the individual input data, and the connection weights to the memory outside of the chip. Next, the quantities for updating the connection weights are calculated in the external computer, and the updated connection weights are written in the memory B of the system according to the present invention. Incidentally, the term g' ($U_{js}$) appearing in the formulas (2) and (3) may be either calculated from the value $U_{js}$ inputted to the nonlinear transfer function circuit D, when the neuron output value $V_{js}$ is to be calculated in the system of the present invention, or calculated inversely from the value $V_{js}$ by the external computer according to the following formula:

$$g'(U_{js}) = g'(g^{-1}(V_{js})) \quad (6).$$

In order to add the inertia term of the formula (5), on the other hand, the corrected quantities of the connection weights may be stored in the memory outside of the chip for every updatings so that they may be added to the newly determined corrected quantities in accordance with the formula (5).

The updatings thus far described can be repeated to proceed the learning. In order to know how the learning advances, the distances between the neuron output values of the last layer for the individual input data and their desired values can be used as the measures. These distances can be calculated at a high speed by using the embodiment of FIG. 24. As a result, it is easily possible to confirm the advance of the learning while the learning is being accomplished.

As has been described hereinbefore, according to the present invention, the calculations of the neuron output values for the input data for the learning can be executed at a high speed in the system of the present invention. In the present invention, moreover, the memories composed of memory arrays are used in the memories TG, A and B so that all the input data, the desired values and the neuron output values of the preceding layer can be easily stored and so that the numerous bits can be read out in parallel by raising the word lines. As a result, the transfers of the data to the external memory can be executed altogether at a high speed. As a result, the learning can be proceeded at a high speed.

If the capacities of the memories are made sufficiently large in the present embodiment, the number of neurons can be easily changed according to the application. If, in this case, the neuron number is drastically changed, the nonlinear transfer function circuit may have to have its dynamic range changed. For this necessity, it is possible to switch and use a plurality of nonlinear transfer function circuits having different characteristics and the reference voltages of the amplifiers in the nonlinear transfer function circuit. In case the neuron numbers are different for the layers in the multi-layered network, the nonlinear transfer function circuit may have to have its dynamic range changed for the layers. This necessity can also be coped with by the similar method.

Incidentally, the description thus far made is directed to the embodiment in which either the DRAM cell of the so-called "one transistor and one capacity" type and the SRAM cells shown in FIGS. 16(a) and 16(b) are mainly used, but other memory cells can naturally be used in the present invention. Since the portion for storing the connection weights need not be frequently rewritten for the data processing, the kinds of the cells can be changed according to the contents of the memories by using non-volatile memory cells or the DRAM cells or the SRAM cells in the portion for storing the neuron output values.

If the memory cell circuit is highly integrated by using very small memory cells such as the DRAM cells of the one transistor and one capacitor, some memory cells may be sometimes inactive because the wiring lines used are very small. The neural network is advantageous in that its function is hardly influenced even if the connection weights are changed more or less, but the data processing may be troubled in case the memory cells for storing the neuron output values are inactive. In order to solve this problem, the redundant word lines or data lines to be used in the ordinary highly-integrated semiconductor memory can be provided so that defective cells may not be used.

In FIGS. 14(a), 14(e) nd 14(f) and FIG. 18(d), moreover, there are used the bipolar transistors, which can be realized by the CMOS. Still moreover, the present invention can be practiced by not only the bipolar transistors and the MOS transistors but also other devices.

Although the foregoing description is directed mainly to the multi-layered and Hopfield networks, the present invention should not be limited thereto but can be applied to the neural network data processing for the networks of various types. For example, it is possible to realize the network in which the updating of the neuron output values such as the Boltzman's machine. As described on pp. 27 of Neural Network Data Processing (published by Sangyo Tosho and edited by Hideki Asou), the Boltzman's machine is featured, although the network shape is similar to that of the Hopfield network, in that the neuron output value (0 or 1) is not uniquely determined by another product sum of the neuron output values inputted to the neurons and the connection weights but in a probable manner. The probability P for the neuron output value take the value 1 is expressed by $P=1/(1+\exp(-I/T))$. Here, letter I designates the product sum of the nol inputted to the neurons and the connection weights, and letter T designates a parameter called the temperature. The Boltzman's machine described above can be easily realized according to the present invention. For example, the reference voltage VRx of the nonlinear transfer function circuit D, as shown in FIG. 18(d), is not set to the steady value but may be changed with time within the fluctuating range of the product/sum output line NO. Then, the neuron output values can be determined according to the probability. The effects obtained by changing the changing rate are similar to those obtained by changing the temperature T.

If the capacity of the memories is sufficient, as is apparent from the comparisons between FIG. 8(a) and FIGS. 20(a) and 20(b), various types of network can be realized by a common system merely by changing the addresses of the memory cells for storing the neuron output values and the connection weights. Thus, the present invention has a highly wide applicability.

Although the description thus far made is directed to the applications to the neural network data processing, the present invention should not be limited thereto but can naturally realize such a system in a high degree of integration as is used for the data processing by connecting a number of processing elements having similar processing functions in the form of a network.

In the embodiments thus far described, the description is directed mainly to the structure in which the arithmetic circuit performs the analog arithmetics. The analog arithmetic circuit is advantageous in that it has a high speed and a small circuit scale. Despite of this description, however, the present invention should not be limited thereto but can be used in a digital arithmetic circuit without departing from the gist thereof. In this case, the calculations can be highly accurately executed by the digital arithmetic circuit.

As has been described hereinbefore, according to the present invention, the system for executing the data processing by combining the memories and the arithmetic circuits and by performing the parallel arithmetics with the arithmetic circuits like the parallel distributed processing system such as the neural network, in which a number of arithmetic units for relatively simple arithmetics are connected in the network form, can be realized with a high degree of integration without sacrificing the speed.

It is further understood by those in the art that the foregoing description is preferred embodiment of the disclosed device and that various changes and modifications may be made in the invention without departing from the spirit and scope thereof.

What is claimed is:

1. A data processing system comprising:
   first memory means for storing first data;
   second memory means for storing first weight data and second weight data;
   input/output circuit means for writing said first data into said first memory means, reading said first data from said first memory means, writing said first and second weight data into said second memory means and reading said first and second weight data from said second memory means;
   register means for storing said first data read out from said first memory means;
   arithmetic circuit means for calculating calculation data from said first data stored in said register means and said first weight data read out from said second memory means; and,
   control circuitry means for controlling said first and second memory means, said register means, said arithmetic circuit means and said input/output circuit means to calculate next data from said first data read out from said register means and said second weight data read out from said second memory means while said calculation data calculated by said arithmetic circuit means is written into said first memory means.

2. The data processing system according to claim 1 wherein said first and second memory means are constructed of memory cells comprising a transistor and a capacitor.

3. The data processing system according to claim 1 wherein said first memory means includes a memory cell array having a plurality of data lines; a plurality of word lines arranged to intersect with said data lines; and memory cells each of which is arranged at desired intersections of said word and data lines, so that the data stored in the memory cells can be read out to the plurality of data lines intersecting with said word lines by selecting at least one of said word lines,
   wherein said arithmetic circuit means includes means for calculating an updated value to be written into said first memory by using the data read out from said first memory means, and
   wherein said input/output circuit means includes means for writing said updated value into said first memory means.

4. The data processing system according to claim 1 wherein said data processing system is formed on a single chip.

5. A method of calculating neuron output values of an $s^{th}$ ordinal layer of a multi-layered neural network having m ordered layers where $s \leq m$, on a processing apparatus having a first memory storing neuron output values, a second memory storing correction weights, a register, an arithmetic circuit for performing a calculation, and an input/output circuit connecting the first memory, second memory, register and the arithmetic circuit, the method comprising the steps of:
   a) reading neuron output values of the $(s-1)^{th}$ ordinal layer from the first memory;
   b) latching the read neuron output values of the $(s-1)^{th}$ layer into the register;
   c) reading a first connection weight between the neurons of the $(s-1)^{th}$ layer and a first neuron of the $s^{th}$ layer;
   d) calculating an output value of the first neuron of the $s^{th}$ layer with the arithmetic circuit using the first connection weight and the latched output values of the $(s-1)^{th}$ layer;
   e) simultaneously i) writing the calculated output value of the first neuron of the $s^{th}$ layer to the first memory and ii) reading a second connection weight between the neurons of the $(s-1)^{th}$ layer and a second neuron of the $s^{th}$ layer and calculating an output value of the second neuron of the $s^{th}$ layer with the arithmetic circuit using the second connection weight and the latched output values of the $(s-1)^{th}$ layer; and, f) repeating step e) for all neurons of the $s^{th}$ layer.

6. The method of calculating $s^{th}$ layer neuron output values according to claim 5 further comprising:

closing a plurality of connection switches between the first memory and the register;

transferring the neuron output values of the $(s-1)^{th}$ layer into the register through the closed switches; and, opening the plurality of connection switches between the first memory and the register.

7. The method of calculating $s^{th}$ layer neuron output values according to claim 6 wherein step a) includes changing the signal state of a word line of the first memory to read the neuron output values of the $(s-1)^{th}$ layer and step c) includes changing the signal state of a word line of the second memory to read the first connection weight.

8. A method of calculating neuron output values of a multi-layer neural network on a processing apparatus having a first memory storing neuron output values, a second memory storing correction weights, a register, an arithmetic circuit for performing a calculation, and an input/output circuit connecting the first memory, second memory, register and the arithmetic circuit, the method comprising the steps of:

a) reading neuron output values of a $(s-1)^{th}$ layer from the first memory;

b) latching the read neuron output values of the $(s-1)^{th}$ layer into the register;

c) reading a first connection weight between the neurons of the $(s-1)^{th}$ layer and a first neuron of the $s^{th}$ layer;

d) calculating an output value of the first neuron of the $s^{th}$ layer with the arithmetic circuit using the first connection weight and the latched output values of the $(s-1)^{th}$ layer;

e) simultaneously i) writing the calculated output value of the first neuron of the $s^{th}$ layer to the first memory and ii) reading a second connection weight between the neurons of the $(s-1)^{th}$ layer and a second neuron of the $s^{th}$ layer and calculating an output value of the second neuron of the $s^{th}$ layer with the arithmetic circuit using the second connection weight and the latched output values of the $(s-1)^{th}$ layer;

f) repeating step e) for all neurons of the $s^{th}$ layer; and, g) repeating steps a)-f) for each of the layers of the multi-layer neural network.

9. The method of calculating neuron output values according to claim 8 further comprising:

closing a plurality of connection switches between the first memory and the register;

transferring the neuron output values of the $(s-1)^{th}$ layer into the register through the closed switches; and, opening the plurality of connection switches between the first memory and the register.

10. The method of calculating neuron output values according to claim 9 wherein step a) includes changing the signal state of a word line of the first memory to read the neuron output values of the $(s-1)^{th}$ layer and step c) includes changing the signal state of a word line of the second memory to read the first connection weight.

* * * * *